United States Patent
Guan et al.

(10) Patent No.: US 12,433,845 B2
(45) Date of Patent: Oct. 7, 2025

(54) PEPTIDE-FUNCTIONALIZED BIODEGRADABLE POLYMERS FOR EFFICIENT DELIVERY OF VARIOUS RNAs

(71) Applicant: The Regents of the University of California, Oakland, CA (US)

(72) Inventors: Zhibin Guan, Irvine, CA (US); Dongchu Yang, Irvine, CA (US); Alexander Eldredge, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 1081 days.

(21) Appl. No.: 17/432,077

(22) PCT Filed: Feb. 21, 2020

(86) PCT No.: PCT/US2020/019375
§ 371 (c)(1),
(2) Date: Aug. 18, 2021

(87) PCT Pub. No.: WO2020/172642
PCT Pub. Date: Aug. 27, 2020

(65) Prior Publication Data
US 2022/0183990 A1  Jun. 16, 2022

Related U.S. Application Data

(60) Provisional application No. 62/809,550, filed on Feb. 22, 2019.

(51) Int. Cl.
*A61K 9/51* (2006.01)
*A61K 9/08* (2006.01)
(Continued)

(52) U.S. Cl.
CPC .............. *A61K 9/5146* (2013.01); *A61K 9/08* (2013.01); *A61K 9/4841* (2013.01);
(Continued)

(58) Field of Classification Search
CPC ...... A61K 9/5146; A61K 9/08; A61K 9/4841; A61K 31/7105; A61K 31/713;
(Continued)

(56) References Cited

U.S. PATENT DOCUMENTS 9,289,500 B2    3/2016  Guan et al.
9,745,421 B2 *  8/2017  Guan ............... C08G 75/14
(Continued)

FOREIGN PATENT DOCUMENTS

WO    2006018295 A2    2/2006
WO    2011116152 A3    9/2011
(Continued)

OTHER PUBLICATIONS

Vale et al., Amino Acids in the Development of Prodrugs. Molecules. Sep. 11, 2018;23(9):2318. doi: 10.3390/molecules23092318. PMID: 30208629; PMCID: PMC6225300 (Year: 2018).*
(Continued)

*Primary Examiner* — Randall L Beane
(74) *Attorney, Agent, or Firm* — Gavrilovich, Dodd & Lindsey LLP

(57) ABSTRACT

The disclosure provides for peptide-functionalized biodegradable polymers, and methods of using the polymers for efficiently delivering RNAs of various sizes, and secondary structures inside cells.

10 Claims, 15 Drawing Sheets

Specification includes a Sequence Listing.

(51) Int. Cl.
| | |
|---|---|
| *A61K 9/48* | (2006.01) |
| *A61K 31/7105* | (2006.01) |
| *A61K 31/713* | (2006.01) |
| *A61K 39/00* | (2006.01) |
| *A61K 47/59* | (2017.01) |
| *A61K 47/64* | (2017.01) |

(52) U.S. Cl.
CPC ........ *A61K 31/7105* (2013.01); *A61K 31/713* (2013.01); *A61K 47/59* (2017.08); *A61K 47/6455* (2017.08); *A61K 39/00* (2013.01)

(58) Field of Classification Search
CPC .... A61K 47/59; A61K 47/6455; A61K 39/00; A61K 2039/53; A61K 9/0014; A61K 9/0019; A61K 9/0031; A61K 9/006; A61K 9/0073; A61K 9/0095; A61K 9/10; A61K 9/2004; C07K 7/06; C12N 15/87
See application file for complete search history.

(56) References Cited

U.S. PATENT DOCUMENTS

| | | | |
|---|---|---|---|
| 9,867,845 B2 | 1/2018 | Guan et al. | |
| 10,179,837 B2 | 1/2019 | Guan et al. | |
| 10,610,566 B1* | 4/2020 | Georges | A23L 33/105 |
| 2014/0288150 A1* | 9/2014 | Guan | C08G 75/14 |
| | | | 435/375 |
| 2018/0371183 A1 | 12/2018 | Guan | |
| 2019/0070304 A1 | 3/2019 | Guan et al. | |
| 2019/0352469 A1 | 11/2019 | Guan et al. | |

FOREIGN PATENT DOCUMENTS

| | | |
|---|---|---|
| WO | 2005062947 A2 | 7/2015 |
| WO | 2017160662 A1 | 9/2017 |

OTHER PUBLICATIONS

Eldredge et al., Focused Library Approach to Discover Discrete Dipeptide Bolaamphiphiles for siRNA Delivery. Biomacromolecules. Oct. 10, 2016;17(10):3138-3144, and Supplemental Data. doi: 10.1021/acs.biomac.6b00635. Epub Sep. 7, 2016. PMID: 27563833; PMCID: PMC5612378 (Year: 2016).*
Hu et al., A mannosylated cell-penetrating peptide-graft-polyethylenimine as a gene delivery vector. Biomaterials. Apr. 2014;35(13):4236-46. doi: 10.1016/j.biomaterials.2014.01.065. Epub Feb. 14, 2014. PMID: 24529626; hereafter "Hu". (Year: 2014).*
Eldredge et al., Dendritic peptide bolaamphiphiles for siRNA delivery to primary adipocytes. Biomaterials. Sep. 2018;178:458-466. doi: 10.1016/j.biomaterials.2018.04.024. Epub Apr. 16, 2018. PMID: 29705001; PMCID: PMC6054800 (Year: 2018).*
Zeng et al., Multifunctional dendronized peptide polymer platform for safe and effective siRNA delivery. J Am Chem Soc. Apr. 3, 2013; 135(13):4962-5. doi: 10.1021/ja400986u. Epub Mar. 25, 2013. PMID: 23496091 (Year: 2013).*
Nguyen et al., Effects of cell-penetrating peptides and pegylation on transfection efficiency of polyethylenimine in mouse lungs. J Gene Med. Nov. 2008;10(11):1236-46. doi: 10.1002/jgm.1255. PMID: 18780309 (Year: 2008).*
Oldenhuis, (2017). Catalysts for C-N Bond Formation, Polymers for the Delivery of mRNA, and Metal-Ligand Mediated Mechanical Gradient Formation. Dissertation, UC Irvine, 197 pages. ProQuest ID: Oldenhuis_uci_0030D_14450. Merritt ID: ark:/13030/m5xw9d5b (Year: 2017).*
Yang, D., (2019), Development of Synthetic Materials for RNA Delivery, Dissertation, UC Irvine, 244 pages. ProQuest ID: Yang_uci_0030D_15914 (Year: 2019).*

Eldredge, A.C. (2019), Development of Synthetic Biomaterials for Nucleic Acid Delivery, Dissertation, UC Irvine, 221 pages (Year: 2019).*
Behr, J. P. "Synthetic Gene Transfer Vectors II: Back to the Future". Acc. Chem. Res. 45:980-984 (2012).
Bishop et al., "Exploring the role of polymer structure on intracellular nucleic acid delivery via polymeric hanoparticles." J. Controlled Release 219:488-499 (2015).
Byrne et al., "Molecular weight and architectural dependence of well defined star-shaped poly(lysine) as a gene delivery vector." Biomater. Sci. 1(12):1223-1234 (2013).
Castanotto et al., "The promises and pitfalls of RNA interference-based therapeutics." Nature 457:426-433 (2009).
Chuang et al., "Complexation of bioreducible cationic polymers with gold nanoparticles for improving stability in serum and application on nonviral gene delivery." ACS Appl. Mater. Interfaces 7(14):7724-7731 (2015).
Copolovici et al., "Cell-Penetrating Peptides: Design, Synthesis, and Applications." ACS Nano 8:1972-1994 (2014).
Davis et al., "Evidence of RNAi in humans from systemically administered siRNA via targeted nanoparticles." Nature 464(7291):1067-1070 (2010).
Demoulins et al., "Polyethylenimine-based polyplex delivery of self-replicating RNA vaccines." Nanomedicine 12(3):711-722 (2016).
Dowdy, S. F. "Overcoming cellular barriers for RNA therapeutics." Nat. Biotechnol. 35(3):222-229 (2017).
Eldredge et al., "Focused Library Approach to Discover Discrete Dipeptide Bolaamphiphiles for siRNA Delivery." Biomacromolecules 17(10):3138-3144 (2016).
Fenton et al. "Bioinspired Alkenyl Amino Alcohol Ionizable Lipid Materials for Highly Potent In Vivo mRNA Delivery." Adv. Mater. 28(15):2939-43 (2016).
Finn et al., "A Single Administration of CRISPR/Cas9 Lipid Nanoparticles Achieves Robust and Persistent In Vivo Genome Editing." Cell Rep. 22(9):2227-2235 (2018).
Fire et al., "Potent and sepecific genetic interference by doublestranded RNA in Caenorhabditis elegans." Nature 391:806-811 (1998).
Fougerolles et al., "Interfering with disease: a progress report on siRNA-based therapeutics." Nat. Rev. Drug Discovery 6:443-453 (2007).
Giljohann et al., "Gene Regulation with Polyvalent siRNA-Nanoparticle Conjugates." J. Am. Chem. Soc. 131:2072-2073 (2009).
Guidotti et al., "Cell-Penetrating Peptides: From Basic Research to Clinics." Trends Pharmacol. Sci. 38(4):406-424 (2017).
Harvie et al., "Use of Poly(ethylene glycol)-Lipid Conjugates to Regulate the Surface Attributes and Transfection Activity of Lipid-DNA Particles." J. Pharm. Sci. 89(5):652-663 (2000).
Hsu et al., "Development and Applications of CRISPR-Cas9 for Genome Engineering." Cell 157(6):1262-1278 (2014).
Jiang et al. "A non-viral CRISPR/Cas9 delivery system for therapeutically targeting HBV DNA and pcsk9 in vivo." Cell Res. 27(3):440-443 (2017).
Jobin et al., "The role of tryptophans on the cellular uptake and membrane interaction of arginine-rich cell penetrating peptides." Biochim. Biophys. Acta, Biomembr. 2015, 1848 (2), 593-602.
Johanning et al., "A sindbis virus mRNA polynucleotide vector achieves prolonged and high level heterologous gene expression in vivo." Nucleic Acids Res. 23:1495-1501 (1995).
Johansson et al., "Intradermal Electroporation of Naked Replicon RNA Elicits Strong Immune Responses" PLoS One 7:e29732 (2012).
Khandare et al., "Multifunctional dendritic polymers in nanomedicine: opportunities and challenges." Chem. Soc. Rev. 41(7):2824-2848 (2012).
Kim et al., "Dendronized Gold Nanoparticles for siRNA Delivery." Small 8:3253-3256 (2012).
Kormann et al., "Expression of therapeutic proteins after delivery of chemically modified mRNA in mice." Nat. Biotechnol. 29(2):154-157 (2011).
Kurniasih et al., "Dendritic nanocarriers based on hyperbranched polymers." Chem. Soc. Rev. 44(12):4145-4164 (2015).
Li et al., "Artificial Virus Delivers CRISPR-Cas9 System for Genome Editing of Cells in Mice." ACS Nano 11(1), 95-111 (2017).

(56) References Cited

OTHER PUBLICATIONS

Li et al., "Dynamic Changes in the Characteristics of Cationic Lipidic Vectors after Exposure to Mouse Serum: Implications for Intravenous Lipofection." Gene Ther. 6:585-594 (1999).
Manganiello et al., "Diblock copolymers with tunable pH transitions for gene delivery." Biomaterials 33(7):2301-2309 (2012).
Marin et al., "Critical evaluation of biodegradable polymers used in nanodrugs." Int. J.Nanomed. 8:3071-3090 (2013).
McCullough et al. "Self replicating Replicon-RNA Delivery to Dendritic Cells by Chitosan nanoparticles for Translation In Vitro and In Vivo." Mol. Ther.-Nucleic Acids 3:e173 (2014).
Midoux et al., "Chemical vectors for gene delivery: a current review on polymers, peptides and lipids containing histidine or imidazole as nucleic acids carriers." Br. J. Pharmacol. 157(2)166-178 (2009).
Miller et al., "Non-Viral CRISPR/Cas Gene Editing In Vitro and In Vivo Enabled by Synthetic Nanoparticle Co-Delivery of Cas9 mRNA and sgRNA." Angew. Chem.,Int. Ed. 56(4):1059-1063 (2017).
Mitragotri et al., "Overcoming the challenges in administering biopharmaceuticals: formulation and delivery strategies." Nat. Rev. Drug Discovery 13(9):655-672 (2014).
Mout et al., "Direct Cytosolic Delivery of CRISPR/Cas9-Ribonucleoprotein for Efficient Gene Editing." ACS Nano 11(3):2452-2458 (2017).
Nelson et al., "Balancing Cationic and Hydrophobic Content of PEGylated siRNA Polyplexes Enhances Endosome Escape, Stability, Blood Circulation Time, and Bioactivity in Vivo." ACS Nano 7:8870-8880 (2013).
Nguyen et al., "Nucleic Acid Delivery: The Missing Pieces of the Puzzle?" Acc. Chem. Res. 45:1153-1162 (2012).
Niu et al., "Generation of gene-modified cynomolgus monkey via Cas9/RNA-mediated gene targeting in one-cell embryos." Cell 156(4):836-843 (2014).
Heo, Joo Hyung. International Search Report for PCT/US2020/019375. (Jun. 19, 2019).
Heo, Joo Hyung. Written Opinion of the International Searching Authority for PCT/US2020/019375. (Jun. 24, 2020).
Yang et al. "Multivalent Peptide-Functionalized Bioreducible Polymers for Cellular Delivery of Various RNAs." Biomacromolecules 21:1613-1624 (Feb. 24, 2020).
Oldenhuis et al., "Biodegradable Dendronized Polymers for Efficient mRNA Delivery." Chemistry Select 1(15):4413-4417 (2016).
Oupicky et al., "Bioreducible polycations in nucleic acid delivery: past, present, and future trends." Macromol. Biosci. 14(7):908-922 (2014).
Pack et al., "Design and development of polymers for gene delivery." Nat. Rev. Drug Discovery 4(7):581-593 (2005).
Palomo, J. M. "Solid-phase peptide synthesis: an overview focused on the preparation of biologically relevant peptides." RSC Adv. 4(62):32658-32672 (2014).
Peng et al., "Potential pitfalls of CRISPR/Cas9-mediated genome editing." FEBS J. 283(7):1218-1231 (2016).
Platt et al., "CRISPR-Cas9 knock in mice for genome editing and cancer modeling." Cell 159(2):440-455 (2014).
Pujals et al., "Proline-rich, amphipathic cell-penetrating peptides." Adv. Drug Delivery Rev. 60(4-5):473-484 (2008).
Read et al., "A versatile reducible polycation based system for efficient delivery of a broad range of nucleic acids." Nucleic Acids Res. 33(9):e86 (2005).
Ross, J. mRNA Stability in Mammalian Cells. Microbiol. Rev. 59(3):423-450 (1995).
Sahin et al., "mRNA-based therapeutics-developing a new class of drugs." Nat. Rev. Drug Discovery 13(10):759-780 (2014).
Sanjana et al., "Improved vectors and genome-wide libraries for CRISPR screening." Nat. Methods 11:783-784 (2014).
Schaffer et al., "Molecular engineering of viral gene delivery vehicles." Annu. Rev. Biomed. Eng. 10:169-194 (2008).
Shu et al., "Stable RNA nanoparticles as potential new generation drugs for cancer therapy." Adv. Drug Delivery Rev. 66:74-89 (2014).
Sizovs et al., "Precisely Tunable Engineering of Sub-30 nm Monodisperse Oligonucleotide Nanoparticles." J. Am. Chem. Soc. 136:234-240 (2014).
Sommer et al. "The Size Distributions of Proteins, mRNA, and Nuclear RNA." J. Mol. Evol. 15:37-57 (1980).
Son et al., "Bioreducible Polymers for Gene Silencing and Delivery." Acc. Chem. Res. 45:1100-1112 (2012).
Sun et al., "Self assembled biodegradable micellar nanoparticles of amphiphilic and cationic block copolymer for siRNA delivery " Biomaterials 29(32), 4348-4355 (2008).
Uchida et al., "Synthetic Polyamines to Regulate mRNA Translation through the Preservative Binding of Eukaryotic Initiation Factor 4E to the Cap Structure." J. Am. Chem. Soc. 138:1478-1481 (2016).
Verhoef et al., "Questioning the Use of PEGylation for Drug Delivery." Drug Delivery Transl. Res. 3(6):499-503 (2013).
Weltzien et al., "Quantitative studies on lysolecithin-mediated hemolysis. Use of ether-deoxylysolecithin analogs with varying aliphatic chain-lengths." Biochim. Biophys. Acta, Biomembr. 466(3):411-421 (1977).
Werth et al., "A low molecular weight fraction of polyethylenimine (PEI) displays increased transfection efficiency of DNA and siRNA in fresh or lyophilized complexes." J.Controlled Release 112 (2), 257-270 (2006).
Yin et al., "Delivery technologies for genome editing." Nat. Rev. Drug Discovery 16(6):387-399 (2017).
Yin et al., "Structure-guided chemical modification of guide RNA enables potent non-viral in vivo genome editing." Nat. Biotechnol. 35(12): 1179-1187 (2017).
Yin et al., "Non-viral vectors for gene-based therapy." Nat. Rev. Genet. 15 (8), 541-555 (2014).
Yu et al., "An Amphiphilic Dendrimer for Effective Delivery of Small Interfering RNA and Gene Silencing In Vitro and In Vivo." Angew. Chem., Int. Ed. 51:8478-8484 (2012).
Zelphati et al., "Effect of Serum Components on the Physico-Chemical Properties of Cationic Lipid/oligonucleotide Complexes and on their Interactions with Cells." Biochim. Biophys. Acta, Lipids Lipid Metab. 1390:119-133 (1998).
Zeng et al., "Structure-Based Design of Dendritic Peptide Bolaamphiphiles for siRNA Delivery." ACS Cent. Sci. 1(6):303-312 (2015).
Zeng et al., "Multifunctional dendronized peptide polymer platform for safe and effective siRNA delivery." J. Am. Chem. Soc. 135(13):4962-4965 (2013).
Adams et al., "Patisiran, an RNAi Therapeutic, for Hereditary Transthyretin Amyloidosis." N. Engl. J. Med. 379:11-21 (Jul. 4, 2018).
Baylis et al., "First-in-human Phase 1 CRISPR Gene Editing Cancer Trials: Are We Ready?" Curr. Gene Ther. 17(4):309-319 (Aug. 1, 2017).
Chang et al., "Integrating Combinatorial Lipid Nanoparticle and Chemically Modified Protein for Intracellular Delivery and Genome Editing." Acc. Chem. Res. 52(3):665-675 (Dec. 16, 2018).
Crooke et al., "RNA-Targeted Therapeutics." Cell Metab. 27(4):714-739 (Apr. 3, 2018).
Dunbar et al., "Gene therapy comes of age." Science 359(6372):eaan4672 (Jan. 12, 2018).
Finn et al., "A Single Administration of CRISPR/Cas9 Lipid Nanoparticles Achieves Robust and Persistent In Vivo Genome Editing." Cell Rep. 22(9):2227-2235 (Feb. 27, 2018).
Glass et al., "Engineering the Delivery System for CRISPR-Based Genome Editing." Trends Biotechnol. 36(2):173-185 (Feb. 2018).
Kowalski et al., "Delivering the Messenger: Advances in Technologies for Therapeutic mRNA Delivery." Mol. Ther. 27(4):710-728 (Apr. 10, 2019).
Li et al., "Poly(amidoamine) (PAMAM) dendrimer mediated delivery of drug and pDNA/siRNA for cancer therapy." Int. J. Pharm. 546(1):215-225 (Jul. 30, 2018).
Lieberman, J. "Tapping the RNA world for therapeutics." Nat. Struct. Mol. Biol. 25(5):357-364 (Apr. 16, 2018).
Luther et al., "Delivery approaches for CRISPR/Cas9 therapeutics in vivo: advances and challenges." Expert Opin. Drug Delivery 15(9):905-913 (May 14, 2018).

(56) References Cited

OTHER PUBLICATIONS

McKinlay et al., "Enhanced mRNA delivery into lymphocytes enabled by lipid-varied libraries of charge altering releasable transporters." Proc. Natl. Acad. Sci. U. S. A. 115(26):E5859-E5866 (May 23, 2018).

Miller et al., "Design of synthetic materials for intracellular delivery of RNAs: From siRNA-mediated gene silencing to CRISPR/Cas gene editing." Nano Res. 11(10):5310-5337 (Aug. 7, 2018).

Patel et al., "Inhaled Nanoformulated mRNA Polyplexes for Protein Production in Lung Epithelium." Adv. Mater. 31(8):1805116 (Jan. 4, 2019).

Sago et al., "High-throughput in vivo screen of functional mRNA delivery identifies nanoparticles for endothelial cell gene editing." Proc. Natl. Acad. Sci. U. S. A. 115(42):E9944-E9952 (Oct. 1, 2018).

Van Bruggen et al., "Nonviral Gene Delivery with Cationic Glycopolymers." Acc. Chem. Res. 52(5):1347-1358 (Apr. 17, 2019).

Yang et al., "Multivalent Peptide-Functionalized Bioreducible Polymers for Cellular Delivery of Various RNAs." Biomacromolecules 21:1613-1624 (Feb. 4, 2020).

Zhong et al., "mRNA therapeutics deliver a hopeful message." Nano Today 23:16-39 (Dec. 2018).

\* cited by examiner

SEQUENCE LISTING

```
<160> NUMBER OF SEQ ID NOS: 57

<210> SEQ ID NO 1
<211> LENGTH: 16
<212> TYPE: PRT
<213> ORGANISM: Artificial Sequence
<220> FEATURE:
<223> OTHER INFORMATION: 16mer peptide from antennapedia

<400> SEQUENCE: 1

Arg Gln Ile Lys Ile Trp Phe Gln Asn Arg Arg Met Lys Trp Lys Lys
1               5                   10                  15

<210> SEQ ID NO 2
<211> LENGTH: 10
<212> TYPE: PRT
<213> ORGANISM: Artificial Sequence
<220> FEATURE:
<223> OTHER INFORMATION: 10mer peptide from HIV-1 Tat protein

<400> SEQUENCE: 2

Gly Arg Lys Lys Arg Arg Gln Arg Arg Arg
1               5                   10

<210> SEQ ID NO 3
<211> LENGTH: 11
```

```
<212> TYPE: PRT
<213> ORGANISM: Artificial Sequence
<220> FEATURE:
<223> OTHER INFORMATION: 11mer peptide from HIV-1 Tat protein

<400> SEQUENCE: 3

Tyr Gly Arg Lys Lys Arg Arg Gln Arg Arg Arg
1               5                   10

<210> SEQ ID NO 4
<211> LENGTH: 13
<212> TYPE: PRT
<213> ORGANISM: Artificial Sequence
<220> FEATURE:
<223> OTHER INFORMATION: 13 mer peptide from HIV-1 Tat protein

<400> SEQUENCE: 4

Gly Arg Lys Lys Arg Arg Gln Arg Arg Arg Pro Pro Gln
1               5                   10

<210> SEQ ID NO 5
<211> LENGTH: 27
<212> TYPE: PRT
<213> ORGANISM: Artificial Sequence
<220> FEATURE:
<223> OTHER INFORMATION: 27mer transportan peptide

<400> SEQUENCE: 5

Gly Trp Thr Leu Asn Ser Ala Gly Tyr Leu Leu Gly Lys Ile Asn Leu
1               5                   10                  15

Lys Ala Leu Ala Ala Leu Ala Lys Lys Ile Leu
            20                  25

<210> SEQ ID NO 6
<211> LENGTH: 9
<212> TYPE: PRT
<213> ORGANISM: Artificial Sequence
<220> FEATURE:
<223> OTHER INFORMATION: 9mer polyarginine peptide

<400> SEQUENCE: 6

Arg Arg Arg Arg Arg Arg Arg Arg Arg
1               5

<210> SEQ ID NO 7
<211> LENGTH: 27
<212> TYPE: PRT
<213> ORGANISM: Artificial Sequence
<220> FEATURE:
<223> OTHER INFORMATION: 27mer PMP(Pa) Peptide

<400> SEQUENCE: 7

Gly Ala Leu Phe Leu Ala Phe Leu Ala Ala Ala Leu Ser Leu Met Gly
1               5                   10                  15

Leu Trp Ser Gln Pro Lys Lys Lys Arg Arg Val
            20                  25

<210> SEQ ID NO 8
<211> LENGTH: 24
<212> TYPE: PRT
<213> ORGANISM: Artificial Sequence
<220> FEATURE:
<223> OTHER INFORMATION: 24mer MPG peptide

<400> SEQUENCE: 8

Gly Ala Leu Phe Leu Gly Trp Leu Gly Ala Ala Gly Ser Thr Met Gly
```

```
                1               5                  10                 15
Ala Pro Lys Lys Lys Arg Lys Val
            20

<210> SEQ ID NO 9
<211> LENGTH: 7
<212> TYPE: PRT
<213> ORGANISM: Artificial Sequence
<220> FEATURE:
<223> OTHER INFORMATION: 7mer NLS peptide

<400> SEQUENCE: 9

Pro Lys Lys Lys Arg Lys Val
1               5

<210> SEQ ID NO 10
<211> LENGTH: 30
<212> TYPE: PRT
<213> ORGANISM: Artificial Sequence
<220> FEATURE:
<223> OTHER INFORMATION: 30mer KALA peptide

<400> SEQUENCE: 10

Trp Glu Ala Lys Leu Ala Lys Ala Leu Ala Lys Ala Leu Ala Lys His
1               5                  10                  15

Leu Ala Lys Ala Leu Ala Lys Ala Leu Lys Ala Cys Glu Ala
            20                  25                  30

<210> SEQ ID NO 11
<211> LENGTH: 27
<212> TYPE: PRT
<213> ORGANISM: Artificial Sequence
<220> FEATURE:
<223> OTHER INFORMATION: 27 mer CBP peptide

<400> SEQUENCE: 11

Met Gly Leu Gly Leu His Leu Leu Val Leu Ala Ala Ala Leu Gln Gly
1               5                  10                  15

Ala Trp Ser Gln Pro Lys Lys Lys Arg Lys Val
            20                  25

<210> SEQ ID NO 12
<211> LENGTH: 13
<212> TYPE: PRT
<213> ORGANISM: Artificial Sequence
<220> FEATURE:
<223> OTHER INFORMATION: 13mer SV40 Large antigen NLS peptide

<400> SEQUENCE: 12

Cys Gly Gly Gly Pro Lys Lys Lys Arg Lys Val Glu Asp
1               5                  10

<210> SEQ ID NO 13
<211> LENGTH: 15
<212> TYPE: PRT
<213> ORGANISM: Artificial Sequence
<220> FEATURE:
<223> OTHER INFORMATION: 15mer Pep-7 peptide

<400> SEQUENCE: 13

Ser Asp Leu Trp Glu Met Met Met Val Ser Leu Ala Cys Gln Tyr
1               5                  10                  15

<210> SEQ ID NO 14
<211> LENGTH: 18
```

```
<212> TYPE: PRT
<213> ORGANISM: Artificial Sequence
<220> FEATURE:
<223> OTHER INFORMATION: 18mer SynB1 peptide

<400> SEQUENCE: 14

Arg Gly Gly Arg Leu Ser Tyr Ser Arg Arg Arg Phe Ser Thr Ser Thr
1               5                   10                  15

Gly Arg

<210> SEQ ID NO 15
<211> LENGTH: 10
<212> TYPE: PRT
<213> ORGANISM: Artificial Sequence
<220> FEATURE:
<223> OTHER INFORMATION: 10mer SynB3 peptide

<400> SEQUENCE: 15

Arg Arg Leu Ser Tyr Ser Arg Arg Arg Phe
1               5                   10

<210> SEQ ID NO 16
<211> LENGTH: 12
<212> TYPE: PRT
<213> ORGANISM: Artificial Sequence
<220> FEATURE:
<223> OTHER INFORMATION: 12mer PTD-4 peptide

<400> SEQUENCE: 16

Pro Ile Arg Arg Arg Lys Lys Leu Arg Arg Leu Lys
1               5                   10

<210> SEQ ID NO 17
<211> LENGTH: 12
<212> TYPE: PRT
<213> ORGANISM: Artificial Sequence
<220> FEATURE:
<223> OTHER INFORMATION: 12mer PTD-5 peptide

<400> SEQUENCE: 17

Arg Arg Gln Arg Arg Thr Ser Lys Leu Met Lys Arg
1               5                   10

<210> SEQ ID NO 18
<211> LENGTH: 13
<212> TYPE: PRT
<213> ORGANISM: Artificial Sequence
<220> FEATURE:
<223> OTHER INFORMATION: 13mer HTLV-II Rex peptide

<400> SEQUENCE: 18

Thr Arg Arg Gln Arg Thr Arg Arg Ala Arg Arg Asn Arg
1               5                   10

<210> SEQ ID NO 19
<211> LENGTH: 13
<212> TYPE: PRT
<213> ORGANISM: Artificial Sequence
<220> FEATURE:
<223> OTHER INFORMATION: 13mer TAT R9 peptide

<400> SEQUENCE: 19

Gly Arg Arg Arg Arg Arg Arg Arg Arg Arg Pro Pro Gln
1               5                   10

<210> SEQ ID NO 20
```

```
<211> LENGTH: 17
<212> TYPE: PRT
<213> ORGANISM: Artificial Sequence
<220> FEATURE:
<223> OTHER INFORMATION: 17mer MAP peptide

<400> SEQUENCE: 20

Lys Leu Ala Leu Lys Leu Ala Leu Lys Leu Ala Leu Ala Leu Lys Leu
1               5                   10                  15

Ala

<210> SEQ ID NO 21
<211> LENGTH: 8
<212> TYPE: PRT
<213> ORGANISM: Artificial Sequence
<220> FEATURE:
<223> OTHER INFORMATION: 8mer novel peptide sequence

<400> SEQUENCE: 21

Gly His Lys His Lys His Lys Trp
1               5

<210> SEQ ID NO 22
<211> LENGTH: 11
<212> TYPE: PRT
<213> ORGANISM: Artificial Sequence
<220> FEATURE:
<223> OTHER INFORMATION: 11mer BP100 peptide

<400> SEQUENCE: 22

Lys Lys Leu Phe Lys Lys Ile Leu Lys Tyr Leu
1               5                   10

<210> SEQ ID NO 23
<211> LENGTH: 22
<212> TYPE: PRT
<213> ORGANISM: Artificial Sequence
<220> FEATURE:
<223> OTHER INFORMATION: 22mer 2BP100 peptide

<400> SEQUENCE: 23

Lys Lys Leu Phe Lys Lys Ile Leu Lys Tyr Leu Lys Lys Leu Phe Lys
1               5                   10                  15

Lys Ile Leu Lys Tyr Leu
            20

<210> SEQ ID NO 24
<211> LENGTH: 17
<212> TYPE: PRT
<213> ORGANISM: Artificial Sequence
<220> FEATURE:
<223> OTHER INFORMATION: 17mer Rev(34-50) peptide

<400> SEQUENCE: 24

Thr Arg Gln Ala Arg Arg Asn Arg Arg Arg Arg Trp Arg Glu Arg Gln
1               5                   10                  15

Arg

<210> SEQ ID NO 25
<211> LENGTH: 18
<212> TYPE: PRT
<213> ORGANISM: Artificial Sequence
<220> FEATURE:
<223> OTHER INFORMATION: 18mer KH peptide

<400> SEQUENCE: 25
```

```
Lys His Lys His Lys His Lys His Lys His Lys His Lys His Lys His
1               5                   10                  15

Lys His

<210> SEQ ID NO 26
<211> LENGTH: 9
<212> TYPE: PRT
<213> ORGANISM: Artificial Sequence
<220> FEATURE:
<223> OTHER INFORMATION: 9mer polylysine peptide

<400> SEQUENCE: 26

Lys Lys Lys Lys Lys Lys Lys Lys Lys
1               5

<210> SEQ ID NO 27
<211> LENGTH: 16
<212> TYPE: PRT
<213> ORGANISM: Artificial Sequence
<220> FEATURE:
<223> OTHER INFORMATION: 16mer Pen2W2F peptide

<400> SEQUENCE: 27

Arg Gln Ile Lys Ile Phe Phe Gln Asn Arg Arg Met Lys Phe Lys Lys
1               5                   10                  15

<210> SEQ ID NO 28
<211> LENGTH: 16
<212> TYPE: PRT
<213> ORGANISM: Artificial Sequence
<220> FEATURE:
<223> OTHER INFORMATION: 16mer DPV3 peptide

<400> SEQUENCE: 28

Arg Lys Lys Arg Arg Arg Glu Ser Arg Lys Lys Arg Arg Arg Glu Ser
1               5                   10                  15

<210> SEQ ID NO 29
<211> LENGTH: 8
<212> TYPE: PRT
<213> ORGANISM: Artificial Sequence
<220> FEATURE:
<223> OTHER INFORMATION: 8mer 6-Oct peptide

<400> SEQUENCE: 29

Gly Arg Lys Arg Lys Lys Arg Thr
1               5

<210> SEQ ID NO 30
<211> LENGTH: 9
<212> TYPE: PRT
<213> ORGANISM: Artificial Sequence
<220> FEATURE:
<223> OTHER INFORMATION: 9mer retro-TAT peptide

<400> SEQUENCE: 30

Arg Arg Arg Gln Arg Arg Lys Lys Arg
1               5

<210> SEQ ID NO 31
<211> LENGTH: 16
<212> TYPE: PRT
<213> ORGANISM: Artificial Sequence
<220> FEATURE:
<223> OTHER INFORMATION: 16mer sc18 peptide
```

```
<400> SEQUENCE: 31

Gly Leu Arg Lys Arg Leu Arg Lys Phe Arg Asn Lys Ile Lys Glu Lys
1               5                   10                  15

<210> SEQ ID NO 32
<211> LENGTH: 18
<212> TYPE: PRT
<213> ORGANISM: Artificial Sequence
<220> FEATURE:
<223> OTHER INFORMATION: 18mer KLA10 peptide

<400> SEQUENCE: 32

Lys Ala Leu Lys Lys Leu Leu Ala Lys Trp Leu Ala Ala Ala Lys Ala
1               5                   10                  15

Leu Leu

<210> SEQ ID NO 33
<211> LENGTH: 18
<212> TYPE: PRT
<213> ORGANISM: Artificial Sequence
<220> FEATURE:
<223> OTHER INFORMATION: 18mer IX peptide

<400> SEQUENCE: 33

Gln Leu Ala Leu Gln Leu Ala Leu Gln Ala Leu Gln Ala Ala Leu Gln
1               5                   10                  15

Leu Ala

<210> SEQ ID NO 34
<211> LENGTH: 18
<212> TYPE: PRT
<213> ORGANISM: Artificial Sequence
<220> FEATURE:
<223> OTHER INFORMATION: 18mer XI peptide

<400> SEQUENCE: 34

Leu Lys Thr Leu Ala Thr Ala Leu Thr Lys Leu Ala Lys Thr Leu Thr
1               5                   10                  15

Thr Leu

<210> SEQ ID NO 35
<211> LENGTH: 18
<212> TYPE: PRT
<213> ORGANISM: Artificial Sequence
<220> FEATURE:
<223> OTHER INFORMATION: 18mer pVEC peptide

<400> SEQUENCE: 35

Leu Leu Ile Ile Leu Arg Arg Arg Ile Arg Lys Gln Ala His Ala His
1               5                   10                  15

Ser Lys

<210> SEQ ID NO 36
<211> LENGTH: 16
<212> TYPE: PRT
<213> ORGANISM: Artificial Sequence
<220> FEATURE:
<223> OTHER INFORMATION: 16mer PenArg peptide

<400> SEQUENCE: 36

Arg Gln Ile Arg Ile Trp Phe Gln Asn Arg Arg Met Arg Trp Arg Arg
1               5                   10                  15
```

```
<210> SEQ ID NO 37
<211> LENGTH: 22
<212> TYPE: PRT
<213> ORGANISM: Artificial Sequence
<220> FEATURE:
<223> OTHER INFORMATION: 22mer M918 peptide

<400> SEQUENCE: 37

Met Val Thr Val Leu Phe Arg Arg Leu Arg Ile Arg Arg Ala Cys Gly
1               5                   10                  15

Pro Pro Arg Val Arg Val
            20

<210> SEQ ID NO 38
<211> LENGTH: 16
<212> TYPE: PRT
<213> ORGANISM: Artificial Sequence
<220> FEATURE:
<223> OTHER INFORMATION: 16mer penetratin peptide

<400> SEQUENCE: 38

Arg Gln Ile Lys Ile Trp Phe Gln Asn Arg Arg Met Lys Trp Lys Lys
1               5                   10                  15

<210> SEQ ID NO 39
<211> LENGTH: 14
<212> TYPE: PRT
<213> ORGANISM: Artificial Sequence
<220> FEATURE:
<223> OTHER INFORMATION: 14mer dhvar5 peptide

<400> SEQUENCE: 39

Leu Leu Leu Phe Leu Leu Lys Lys Arg Lys Lys Arg Lys Tyr
1               5                   10

<210> SEQ ID NO 40
<211> LENGTH: 23
<212> TYPE: PRT
<213> ORGANISM: Artificial Sequence
<220> FEATURE:
<223> OTHER INFORMATION: 23mer HPV33L2-445/467 peptide

<400> SEQUENCE: 40

Ser Tyr Phe Ile Leu Arg Arg Arg Arg Lys Arg Phe Pro Tyr Phe Phe
1               5                   10                  15

Thr Asp Val Arg Val Ala Ala
            20

<210> SEQ ID NO 41
<211> LENGTH: 17
<212> TYPE: PRT
<213> ORGANISM: Artificial Sequence
<220> FEATURE:
<223> OTHER INFORMATION: 17mer buforin II peptide

<400> SEQUENCE: 41

Arg Ala Gly Leu Gln Phe Pro Val Gly Arg Val His Arg Leu Leu Arg
1               5                   10                  15

Lys

<210> SEQ ID NO 42
<211> LENGTH: 20
<212> TYPE: PRT
<213> ORGANISM: Artificial Sequence
<220> FEATURE:
<223> OTHER INFORMATION: 20mer ppTG1 peptide
```

```
<400> SEQUENCE: 42

Gly Leu Phe Lys Ala Leu Leu Lys Leu Leu Lys Ser Leu Trp Lys Leu
1               5                   10                  15

Leu Leu Lys Ala
            20

<210> SEQ ID NO 43
<211> LENGTH: 17
<212> TYPE: PRT
<213> ORGANISM: Artificial Sequence
<220> FEATURE:
<223> OTHER INFORMATION: 17mer Antitrypsin peptide

<400> SEQUENCE: 43

Cys Ser Ile Pro Pro Glu Val Lys Phe Asn Lys Pro Phe Val Tyr Leu
1               5                   10                  15

Ile

<210> SEQ ID NO 44
<211> LENGTH: 10
<212> TYPE: PRT
<213> ORGANISM: Artificial Sequence
<220> FEATURE:
<223> OTHER INFORMATION: 10mer BAC715-24 peptide

<400> SEQUENCE: 44

Pro Arg Pro Leu Pro Phe Pro Arg Pro Gly
1               5                   10

<210> SEQ ID NO 45
<211> LENGTH: 19
<212> TYPE: PRT
<213> ORGANISM: Artificial Sequence
<220> FEATURE:
<223> OTHER INFORMATION: 19mer BMV Gag petide

<400> SEQUENCE: 45

Lys Met Thr Arg Ala Gln Arg Arg Ala Ala Ala Arg Arg Asn Arg Trp
1               5                   10                  15

Thr Ala Arg

<210> SEQ ID NO 46
<211> LENGTH: 21
<212> TYPE: PRT
<213> ORGANISM: Artificial Sequence
<220> FEATURE:
<223> OTHER INFORMATION: 21mer buforin II peptide

<400> SEQUENCE: 46

Thr Arg Ser Ser Arg Ala Gly Leu Gln Phe Pro Val Gly Arg Val His
1               5                   10                  15

Arg Leu Leu Arg Lys
            20

<210> SEQ ID NO 47
<211> LENGTH: 20
<212> TYPE: PRT
<213> ORGANISM: Artificial Sequence
<220> FEATURE:
<223> OTHER INFORMATION: 20mer CCMV Gag peptide

<400> SEQUENCE: 47

Lys Leu Arg Thr Arg Ala Gln Arg Arg Ala Ala Ala Arg Lys Asn Lys
```

```
1               5                   10                  15
Arg Asn Thr Arg
            20

<210> SEQ ID NO 48
<211> LENGTH: 15
<212> TYPE: PRT
<213> ORGANISM: Artificial Sequence
<220> FEATURE:
<223> OTHER INFORMATION: 15mer FHV COAT peptide

<400> SEQUENCE: 48

Arg Arg Arg Arg Asn Arg Thr Arg Arg Asn Arg Arg Arg Val Arg
1               5                   10                  15

<210> SEQ ID NO 49
<211> LENGTH: 24
<212> TYPE: PRT
<213> ORGANISM: Artificial Sequence
<220> FEATURE:
<223> OTHER INFORMATION: 24mer hCT (9-32) Calcitonin peptide

<400> SEQUENCE: 49

Leu Gly Thr Tyr Thr Gln Asp Phe Asn Lys Phe His Thr Phe Pro Gln
1               5                   10                  15

Thr Ala Ile Gly Val Gly Ala Pro
            20

<210> SEQ ID NO 50
<211> LENGTH: 17
<212> TYPE: PRT
<213> ORGANISM: Artificial Sequence
<220> FEATURE:
<223> OTHER INFORMATION: 17mer HIV-1 Rev peptide

<400> SEQUENCE: 50

Thr Arg Gln Ala Arg Arg Asn Arg Arg Arg Arg Trp Arg Glu Arg Gln
1               5                   10                  15

Arg

<210> SEQ ID NO 51
<211> LENGTH: 12
<212> TYPE: PRT
<213> ORGANISM: Artificial Sequence
<220> FEATURE:
<223> OTHER INFORMATION: 12mer HN-1 peptide

<400> SEQUENCE: 51

Thr Ser Pro Leu Asn Ile His Asn Gly Gln Lys Leu
1               5                   10

<210> SEQ ID NO 52
<211> LENGTH: 27
<212> TYPE: PRT
<213> ORGANISM: Artificial Sequence
<220> FEATURE:
<223> OTHER INFORMATION: 27mer Human P1 peptide

<400> SEQUENCE: 52

Met Gly Leu Gly Leu His Leu Leu Val Leu Ala Ala Ala Leu Gln Gly
1               5                   10                  15

Ala Trp Ser Gln Pro Lys Lys Lys Arg Lys Val
            20                  25
```

```
<210> SEQ ID NO 53
<211> LENGTH: 16
<212> TYPE: PRT
<213> ORGANISM: Artificial Sequence
<220> FEATURE:
<223> OTHER INFORMATION: 16mer K-FGF peptide

<400> SEQUENCE: 53

Ala Ala Val Ala Leu Leu Pro Ala Val Leu Leu Ala Leu Leu Ala Pro
1               5                   10                  15

<210> SEQ ID NO 54
<211> LENGTH: 10
<212> TYPE: PRT
<213> ORGANISM: Artificial Sequence
<220> FEATURE:
<223> OTHER INFORMATION: 10mer Ku70 peptide

<400> SEQUENCE: 54

Val Pro Met Leu Lys Pro Met Leu Lys Glu
1               5                   10

<210> SEQ ID NO 55
<211> LENGTH: 18
<212> TYPE: PRT
<213> ORGANISM: Artificial Sequence
<220> FEATURE:
<223> OTHER INFORMATION: 18mer Penetratin peptide

<400> SEQUENCE: 55

Arg Gln Ile Lys Ile Trp Phe Gln Asn Arg Arg Met Lys Trp Lys Lys
1               5                   10                  15

Gly Gly

<210> SEQ ID NO 56
<211> LENGTH: 21
<212> TYPE: DNA
<213> ORGANISM: Artificial Sequence
<220> FEATURE:
<223> OTHER INFORMATION: anti-Luc siRNA sense primer

<400> SEQUENCE: 56
agacuauaag auucaaucut t                                            21

<210> SEQ ID NO 57
<211> LENGTH: 21
<212> TYPE: DNA
<213> ORGANISM: Artificial Sequence
<220> FEATURE:
<223> OTHER INFORMATION: anti-Luc siRNA antisense primer

<400> SEQUENCE: 57
agauugaauc uuauagucut g                                            21
```

PEPTIDE-FUNCTIONALIZED BIODEGRADABLE POLYMERS FOR EFFICIENT DELIVERY OF VARIOUS RNAs

CROSS REFERENCE TO RELATED APPLICATIONS

This application is a U.S. National Stage Application filed under 35 U.S.C. § 371 and claims priority to International Application No. PCT/US2020/019375, filed Feb. 21, 2020, which application claims priority under 35 U.S.C. § 119 from Provisional Application Ser. No. 62/809,550 filed Feb. 22, 2019, the disclosures of which are incorporated herein by reference in their entirety.

STATEMENT OF GOVERNMENT SUPPORT

This invention was made with Government support under Grant No. DMR 1609946, awarded by the National Science Foundation. The Government has certain rights in the invention.

SEQUENCE LISTING

The instant application contains a Sequence Listing which has been submitted electronically in ASCII format and is hereby incorporated by reference in its entirety. Said ASCII copy, created on Aug. 18, 2021, is named Sequence_ST25.txt and is 15,079 bytes in size.

TECHNICAL FIELD

The disclosure provides for peptide-functionalized biodegradable polymers, and methods of using the polymers for efficiently delivering RNAs of various sizes, and secondary structures inside cells.

BACKGROUND

Both viral and non-viral vectors have been intensively investigated over the past decade for RNA delivery. Viral vectors are very efficient for in vitro and in vivo RNA delivery, however, serious safety concerns related to their infectious nature and immunogenicity hamper their applicability in clinical trials. Therefore, a variety of non-viral synthetic delivery vectors have been developed, including cationic lipids, polymers, peptides, liposomes, dendrimers, and gold nanoparticles. Synthetic vectors have the advantage of being highly tunable, non-toxic, and scalable.

SUMMARY

Various RNAs, such as short interfering RNA (siRNA), microRNA, and messenger RNA (mRNA), play pivotal roles in biological functions and have great potential in a variety of therapeutic applications. A desired protein can be produced through the introduction of mRNA, whereas a target gene can be silenced through the delivery of specific siRNA. The ability to control gene expression holds great promise for improved vaccine development, cancer treatment, immunotherapy, and stem-cell therapy. However, the lack of safe and efficient delivery vehicles for RNA remains a major bottleneck for RNA-based therapeutics.

The disclosure provides for PFBPs that have been specifically designed to deliver RNAs of various sizes and structures into cells. The PFBPs disclosed herein are capable of forming stable and favorable complexes with RNA without forming aggregates. Moreover, the PFBPs allow for effective delivery of RNA, including siRNA, mRNA, RNA-based replicons, and ssRNA into cells.

In a particular embodiment, the disclosure provides a peptide-functionalized biodegradable polymer (PFBP) that is biocompatible and capable of forming a complex or polyplex with nucleic acids and releasing the nucleic acids within a cell, wherein the PFBP comprises short linear cell penetrating peptides (CPPs) and/or comprises branched peptide dendrons that are functionalized on the outer layer with short linear CPPs; and wherein the CPPs are either attached directly to the linear polymer via a covalent bond or attached indirectly to the linear polymer via a branched peptide dendron which is covalently attached to the linear polymer. In a further embodiment of the foregoing embodiment, each CPP or dendron is attached to a different point along the length of the linear polymer and wherein no dendron is attached to more than one point on the polymer. In yet a further embodiment of any of the foregoing embodiments, the linear polymer comprises a linear polymer backbone chain that comprises one or more disulfide bonds. In a further embodiment, the linear polymer comprises dicysteine monomers. In yet a further embodiment of any of the foregoing embodiments, the linear polymer is an L-lysine—dicysteine based peptide monomer. In yet a further embodiment of any of the foregoing embodiments, the dendrons and/or CPPs are attached to the linear polymer by a disulfide bond. In yet a further embodiment of any of the foregoing embodiments, the linear polymer further comprises a polyoxyalkylene polymer and/or a fatty acid, wherein the polyoxyalkylene polymer and/or a fatty acid may be directly attached to the linear polymer via a covalent bond or indirectly attached to the linear polymer via a branched peptide dendron which is covalently attached to the linear polymer, and wherein the branched peptide dendron comprises one or more a short linear CPP. In yet a further embodiment of any of the foregoing embodiments, the PFBP comprises the structure of Formula I:

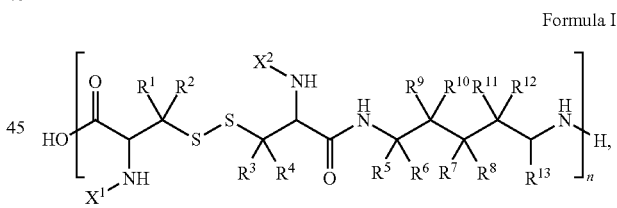

Formula I wherein, n is an integer greater than 5; $R^1$-$R^{12}$ are independently selected from the group consisting of H, optionally substituted ($C_1$-$C_6$)-alkyl, optionally substituted ($C_1$-$C_6$)-heteroalkyl, optionally substituted ($C_1$-$C_6$)-alkenyl, optionally substituted ($C_1$-$C_6$)-heteroalkenyl, optionally substituted ($C_1$-$C_6$)-alkynyl, optionally substituted ($C_1$-$C_6$)-heteroalkynyl, optionally substituted ($C_3$-$C_{12}$)cycloalkyl, optionally substituted ($C_4$-$C_{12}$)cycloalkenyl, optionally substituted aryl, optionally substituted heterocycle, halide, hydroxyl, carbonyl, aldehyde, carboxyl, ester, alkoxy, carboxamide, amine, imine, azide, cyano, nitro, nitroso, thiol, sulfide, sulfoxide, sulfone, and phosphate; $R^{13}$ is an ester; $X^1$-$X^2$ are independently selected from a short linear CPP, a polyoxyalkylene polymer, a fatty acid, or a branched peptide dendron functionalized with one or more short linear CPPs, wherein the branched peptide dendron may further be functionalized with a fatty acid and/or a polyoxyalkylene polymer, and wherein at least one of $X^1$ and $X^2$ is a short linear CPP, or a branched peptide dendron functionalized with one or more short linear CPPs. In yet a further embodiment of any of the foregoing embodiments, the PFBP comprises the structure of Formula I(a):

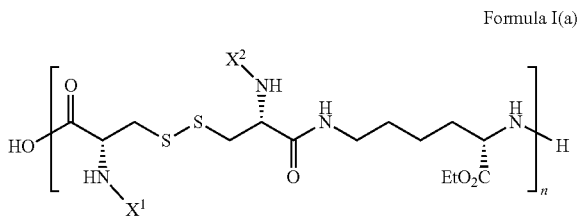

Formula I(a)

wherein, n is an integer greater than 10; $X^1$-$X^2$ are independently selected from a short linear CPP, a polyoxyalkylene polymer, a fatty acid, or a branched peptide dendron functionalized with one or more short linear CPPs, wherein the branched peptide dendron may further be functionalized with a fatty acid and/or a polyoxyalkylene polymer, and wherein at least one of $X^1$ and $X^2$ is a short linear CPP, or a branched peptide dendron functionalized with one or more short linear CPPs. In a particular embodiment, $X^1$ and $X^2$ are short linear CPPs. In another embodiment, the branched peptide dendron comprises the structure of Formula II:

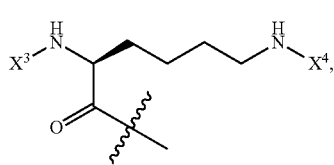

Formula II wherein, $X^3$ and $X^4$ are independently selected from a short linear CPP, a fatty acid, or a polyoxyalkylene polymer, wherein at least one of $X^3$ and $X^4$ is a short linear CPP. In yet a further embodiment of any of the foregoing embodiments, $X^3$ and $X^4$ are short linear CPPs. In yet a further embodiment of any of the foregoing embodiments, the branched peptide dendron comprises the structure of Formula III:

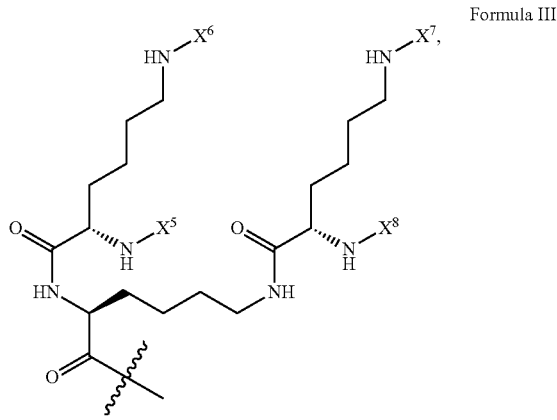

Formula III wherein, $X^5$-$X^8$ are independently selected from a short linear CPP, a fatty acid, or a polyoxyalkylene polymer, wherein at least one of $X^5$-$X^8$ is a short linear CPP. In yet a further embodiment of any of the foregoing embodiments, the polyoxyalkylene polymer is tetraethylene glycol. In yet a further embodiment of any of the foregoing embodiments, the fatty acid is selected from caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, and docosahexaenoic acid. In yet a further embodiment of any of the foregoing embodiments, the fatty acid is oleic acid or stearic acid. In yet a further embodiment of any of the foregoing embodiments, the short linear CPP has a sequence selected from SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, SEQ ID NO:33, SEQ ID NO:34, SEQ ID NO:35, SEQ ID NO:36, SEQ ID NO:37, SEQ ID NO:38, SEQ ID NO:39, SEQ ID NO:40, SEQ ID NO:41, SEQ ID NO:42, SEQ ID NO:43, SEQ ID NO:44, SEQ ID NO:45, SEQ ID NO:46, SEQ ID NO:47, SEQ ID NO:48, SEQ ID NO:49, SEQ ID NO:50, SEQ ID NO:51, SEQ ID NO:52, SEQ ID NO:53, SEQ ID NO:54, and SEQ ID NO:55. In yet a further embodiment of any of the foregoing embodiments, the short linear CPP comprises the sequence of SEQ ID NO:21.

In a certain embodiment, the disclosure also provides for a PFBP disclosed herein that further comprises complexed or polyplexed nucleic acids. In a further embodiment of the foregoing embodiment, the nucleic acids are RNA. In yet a further embodiment of any of the foregoing embodiments, the RNA is siRNA. In yet a further embodiment of any of the foregoing embodiments, the RNA is ssRNA and/or mRNA. In yet a further embodiment of any of the foregoing embodiments, the mRNA and/or ssRNA comprises at least 100 ribonucleotides. In yet a further embodiment of any of the foregoing embodiments, the mRNA and/or ssRNAs comprise from 100 to 20,000 ribonucleotides. In yet another alternate embodiment, the RNA is an RNA-based replicon. In yet a further embodiment of any of the foregoing embodiments, the RNA-based replicon is an RNA-based replicon vaccine. In yet a further embodiment of any of the foregoing embodiments, the molar ratio of protonated amines of the PFBP:phosphates of the RNA (N:P) is from 5 to 20. In a further embodiment, the N:P ratio is from 10 to 15.

In a particular embodiment, the disclosure further provides a method for delivering RNA into a cell comprising: contacting a cell with a PFBP of the disclosure that has been complexed or polyplexed with RNA. In a further embodiment of the foregoing embodiment, the cell is contacted in vitro. In yet a further embodiment of any of the foregoing embodiments, the cell is contacted in vivo. In yet a further embodiment of any of the foregoing embodiments, the cell is a human cell.

In a certain embodiment, the disclosure provides a method of vaccinating a subject comprising administering a PFBP of the disclosure that has been complexed or polyplexed with an RNA-based replicon vaccine, wherein the complex or polyplex is delivered ex vivo or in vivo. In a further embodiment, the subject is a human subject.

In another embodiment, the disclosure provides a pharmaceutical composition comprising a PFBP of the disclosure that has been complexed or polyplexed with an RNA-based replicon vaccine for use in the vaccination of a subject.

The details of one or more embodiments of the disclosure are set forth in the accompanying drawings and the description below. Other features, objects, and advantages will be apparent from the description and drawings, and from the claims.

DETAILED DESCRIPTION

Figure 1:
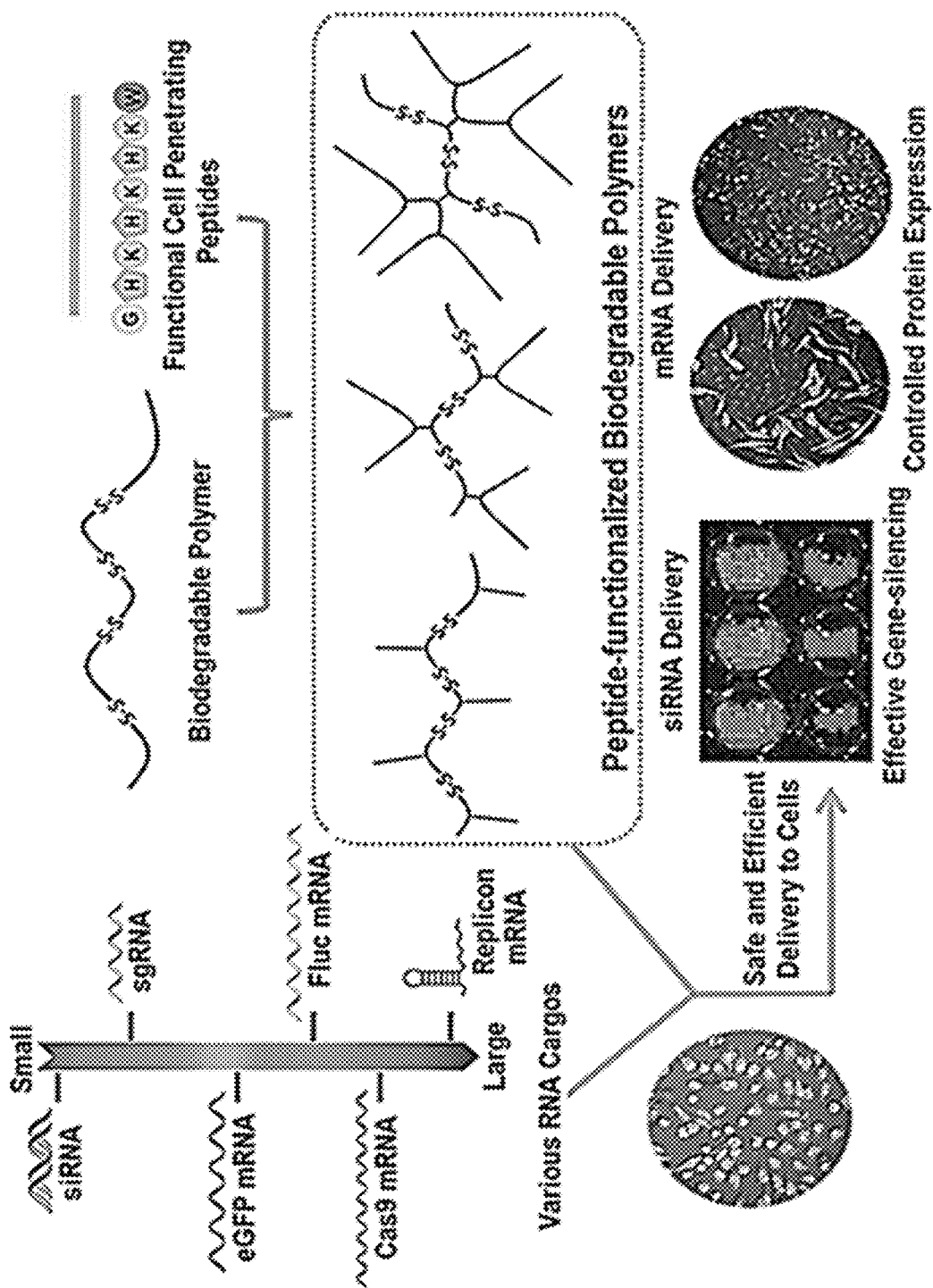
FIG. 1 presents the concept of using peptide-functionalized biodegradable polymers for various RNA delivery.

As used herein and in the appended claims, the singular forms "a," "an," and "the" include plural referents unless the context clearly dictates otherwise. Thus, for example, reference to "a vector" includes a plurality of such vectors and reference to "the amino acid" includes reference to one or more amino acids and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although many methods and reagents are similar or equivalent to those described herein, the exemplary methods and materials are disclosed herein.

All publications mentioned herein are incorporated herein by reference in full for the purpose of describing and disclosing the methodologies, which might be used in connection with the description herein. Moreover, with respect to any term that is presented in one or more publications that is similar to, or identical with, a term that has been expressly defined in this disclosure, the definition of the term as expressly provided in this disclosure will control in all respects.

The term "alkenyl", refers to an organic group that is comprised of carbon and hydrogen atoms that contains at least one double covalent bond between two carbons. Typically, an "alkenyl" as used in this disclosure, refers to organic group that contains 2, 3, 4, 5, 6, 7, 8, 9, 10, 11, 12, 13, 14, 15, 16, 17, 18, 19, 20, or 30 carbon atoms, or any range of carbon atoms between or including any two of the foregoing values. While a $C_2$-alkenyl can form a double bond to a carbon of a parent chain, an alkenyl group of three or more carbons can contain more than one double bond. It certain instances the alkenyl group will be conjugated, in other cases an alkenyl group will not be conjugated, and yet other cases the alkenyl group may have stretches of conjugation and stretches of nonconjugation. Additionally, if there is more than 2 carbon, the carbons may be connected in a linear manner, or alternatively if there are more than 3 carbons then the carbons may also be linked in a branched fashion so that the parent chain contains one or more secondary, tertiary, or quaternary carbons. An alkenyl may be substituted or unsubstituted, unless stated otherwise.

The term "alkyl", refers to an organic group that is comprised of carbon and hydrogen atoms that contains single covalent bonds between carbons. Typically, an "alkyl" as used in this disclosure, refers to an organic group that contains 1, 2, 3, 4, 5, 6, 7, 8, 9, 10, 11, 12, 13, 14, 15, 16, 17, 18, 19, 20, or 30 carbon atoms, or any range of carbon atoms between or including any two of the foregoing values. Where if there is more than 1 carbon, the carbons may be connected in a linear manner, or alternatively if there are more than 2 carbons then the carbons may also be linked in a branched fashion so that the parent chain contains one or more secondary, tertiary, or quaternary carbons. An alkyl may be substituted or unsubstituted, unless stated otherwise.

The term "alkynyl", refers to an organic group that is comprised of carbon and hydrogen atoms that contains a triple covalent bond between two carbons. Typically, an "alkynyl" as used in this disclosure, refers to organic group that contains that contains 2, 3, 4, 5, 6, 7, 8, 9, 10, 11, 12, 13, 14, 15, 16, 17, 18, 19, 20, or 30 carbon atoms, or any range of carbon atoms between or including any two of the foregoing values. While a $C_2$-alkynyl can form a triple bond to a carbon of a parent chain, an alkynyl group of three or more carbons can contain more than one triple bond. Where if there is more than 3 carbon, the carbons may be connected in a linear manner, or alternatively if there are more than 4 carbons then the carbons may also be linked in a branched fashion so that the parent chain contains one or more secondary, tertiary, or quaternary carbons. An alkynyl may be substituted or unsubstituted, unless stated otherwise.

The term "aryl", as used in this disclosure, refers to a conjugated planar ring system with delocalized pi electron clouds that contain only carbon as ring atoms. An "aryl" for the purposes of this disclosure encompass from 1 to 4 aryl rings wherein when the aryl is greater than 1 ring the aryl rings are joined so that they are linked, fused, or a combination thereof. An aryl may be substituted or unsubstituted, or in the case of more than one aryl ring, one or more rings may be unsubstituted, one or more rings may be substituted, or a combination thereof The term generally represented by the notation "$C_x$-$C_y$" (where x and y are whole integers and y>x) prior to a functional group, e.g., "$C_1$-$C_{12}$ alkyl" refers to a number range of carbon atoms. For the purposes of this disclosure any range specified by "$C_x$-$C_y$" (where x and y are whole integers and y>x) is not exclusive to the expressed range, but is inclusive of all possible ranges that include and fall within the range specified by "$C_x$-$C_y$" (where x and y are whole integers and y>x). For example, the term "$C_1$-$C_4$" provides express support for a range of 1 to 4 carbon atoms, but further provides implicit support for ranges encompassed by 1 to 4 carbon atoms, such as 1 to 2 carbon atoms, 1 to 3 carbon atoms, 2 to 3 carbon atoms, 2 to 4 carbon atoms, and 3 to 4 carbon atoms.

The term "cycloalkenyl", as used in this disclosure, refers to an alkene that contains at least 4 carbon atoms but no more than 12 carbon atoms connected so that it forms a ring. A "cycloalkenyl" for the purposes of this disclosure encompasses from 1 to 4 cycloalkenyl rings, wherein when the cycloalkenyl is greater than 1 ring, then the cycloalkenyl rings are joined so that they are linked, fused, or a combination thereof. A cycloalkenyl may be substituted or unsubstituted, or in the case of more than one cycloalkenyl ring, one or more rings may be unsubstituted, one or more rings may be substituted, or a combination thereof The term "cylcoalkyl", as used in this disclosure, refers to an alkyl that contains at least 3 carbon atoms but no more than 12 carbon atoms connected so that it forms a ring. A "cycloalkyl" for the purposes of this disclosure encompasses from 1 to 4 cycloalkyl rings, wherein when the cycloalkyl is greater than 1 ring, then the cycloalkyl rings are joined so that they are linked, fused, or a combination thereof. A cycloalkyl may be substituted or unsubstituted, or in the case of more than one cycloalkyl ring, one or more rings may be unsubstituted, one or more rings may be substituted, or a combination thereof.

The term "hetero-" when used as a prefix, such as, hetero-alkyl, hetero-alkenyl, hetero-alkynyl, or hetero-hydrocarbon, for the purpose of this disclosure refers to the specified hydrocarbon having one or more carbon atoms replaced by non-carbon atoms as part of the parent chain. Examples of such non-carbon atoms include, but are not limited to, N, O, S, Si, Al, B, and P. If there is more than one non-carbon atom in the hetero-based parent chain then this atom may be the same element or may be a combination of different elements, such as N and O. In a particular embodiment, a "hetero"-hydrocarbon (e.g., alkyl, alkenyl, alkynyl) refers to a hydrocarbon that has from 1 to 3 C, N and/or S atoms as part of the parent chain.

The term "disorder" as used herein is intended to be generally synonymous, and is used interchangeably with, the terms "disease," "syndrome," and "condition" (as in medical condition), in that all reflect an abnormal condition of the human or animal body or of one of its parts that impairs normal functioning, is typically manifested by distinguishing signs and symptoms.

The term "heterocycle," as used herein, refers to ring structures that contain at least 1 noncarbon ring atom. A "heterocycle" for the purposes of this disclosure encompass from 1 to 4 heterocycle rings, wherein when the heterocycle is greater than 1 ring the heterocycle rings are joined so that they are linked, fused, or a combination thereof. A heterocycle may be aromatic or nonaromatic, or in the case of more than one heterocycle ring, one or more rings may be nonaromatic, one or more rings may be aromatic, or a combination thereof. A heterocycle may be substituted or unsubstituted, or in the case of more than one heterocycle ring one or more rings may be unsubstituted, one or more rings may be substituted, or a combination thereof. Typically, the noncarbon ring atom is N, O, S, Si, Al, B, or P. In the case where there is more than one noncarbon ring atom, these noncarbon ring atoms can either be the same element, or combination of different elements, such as N and O. Examples of heterocycles include, but are not limited to: a monocyclic heterocycle such as, aziridine, oxirane, thiirane, azetidine, oxetane, thietane, pyrrolidine, pyrroline, imidazolidine, pyrazolidine, pyrazoline, dioxolane, sulfolane 2,3-dihydrofuran, 2,5-dihydrofuran tetrahydrofuran, thiophane, piperidine, 1,2,3,6-tetrahydro-pyridine, piperazine, morpholine, thiomorpholine, pyran, thiopyran, 2,3-dihydropyran, tetrahydropyran, 1,4-dihydropyridine, 1,4-dioxane, 1,3-dioxane, dioxane, homopiperidine, 2,3,4,7-tetrahydro-1H-azepine homopiperazine, 1,3-dioxepane, 4,7-dihydro-1,3-dioxepin, and hexamethylene oxide; and polycyclic heterocycles such as, indole, indoline, isoindoline, quinoline, tetrahydroquinoline, isoquinoline, tetrahydroisoquinoline, 1,4-benzodioxan, coumarin, dihydrocoumarin, benzofuran, 2,3-dihydrobenzofuran, isobenzofuran, chromene, chroman, isochroman, xanthene, phenoxathiin, thianthrene, indolizine, isoindole, indazole, purine, phthalazine, naphthyridine, quinoxaline, quinazoline, cinnoline, pteridine, phenanthridine, perimidine, phenanthroline, phenazine, phenothiazine, phenoxazine, 1,2-benzisoxazole, benzothiophene, benzoxazole, benzthiazole, benzimidazole, benztriazole, thioxanthine, carbazole, carboline, acridine, pyrolizidine, and quinolizidine. In addition to the polycyclic heterocycles described above, heterocycle includes polycyclic heterocycles wherein the ring fusion between two or more rings includes more than one bond common to both rings and more than two atoms common to both rings. Examples of such bridged heterocycles include quinuclidine, diazabicyclo[2.2.1]heptane and 7-oxabicyclo[2.2.1] heptane.

The terms "heterocyclic group", "heterocyclic moiety", "heterocyclic", or "heterocyclo" used alone or as a suffix or prefix, refers to a heterocycle that has had one or more hydrogens removed therefrom.

The term "hydrocarbons" refers to groups of atoms that contain only carbon and hydrogen. Examples of hydrocarbons that can be used in this disclosure include, but are not limited to, alkanes, alkenes, alkynes, arenes, and benzyls.

The term "mRNA", as used herein, includes modifications of the mRNA termini, including tagging the ends of mRNA with moieties such as cholesterol, folate, various peptides, and aptamers; fluorescent molecules; and 3'-biotin. Moreover, "mRNA", as used herein refers to a strand of ribonucleotides that can be of any length disclosed herein, and can further comprise modified ribonucleotides in addition to the naturally occurring ribonucleotides Specific examples of modified ribonucleotides include ribonucleotides which comprise pseudouridine 2-thiouridine, 5-methylcytidine (m5C), and N6-methyladenosine bases.

The term "non-release controlling excipient" as used herein, refers to an excipient whose primary function do not include modifying the duration or place of release of the active substance from a dosage form as compared with a conventional immediate release dosage form.

The term "optionally substituted" refers to a functional group, typically a hydrocarbon or heterocycle, where one or more hydrogen atoms may be replaced with a substituent. Accordingly, "optionally substituted" refers to a functional group that is substituted, in that one or more hydrogen atoms are replaced with a substituent, or unsubstituted, in that the hydrogen atoms are not replaced with a substituent. For example, an optionally substituted hydrocarbon group refers to an unsubstituted hydrocarbon group or a substituted hydrocarbon group.

The term "pharmaceutically acceptable carrier," "pharmaceutically acceptable excipient," "physiologically acceptable carrier," or "physiologically acceptable excipient" as used herein, refers to a pharmaceutically-acceptable material, composition, or vehicle, such as a liquid or solid filler, diluent, excipient, solvent, or encapsulating material. Each component should be "pharmaceutically acceptable" in the sense of being compatible with the other ingredients of a pharmaceutical formulation. It should also be suitable for use in contact with the tissue or organ of humans and animals without excessive toxicity, irritation, allergic response, immunogenicity, or other problems or complications, commensurate with a reasonable benefit/risk ratio. Examples of "pharmaceutically acceptable carriers" and "pharmaceutically acceptable excipients" can be found in the following, Remington: The Science and Practice of Pharmacy, 21st Edition; Lippincott Williams & Wilkins: Philadelphia, Pa., 2005; Handbook of Pharmaceutical Excipients, 5th Edition; Rowe et al., Eds., The Pharmaceutical Press and the American Pharmaceutical Association: 2005; and Handbook of Pharmaceutical Additives, 3rd Edition; Ash and Ash Eds., Gower Publishing Company: 2007; Pharmaceutical Preformulation and Formulation, Gibson Ed., CRC Press LLC: Boca Raton, Fla., 2004.

The term "release controlling excipient" as used herein, refers to an excipient whose primary function is to modify the duration or place of release of the active substance from a dosage form as compared with a conventional immediate release dosage form.

The term "therapeutically acceptable" refers to those compounds (or salts, prodrugs, tautomers, zwitterionic forms, etc.) which are suitable for use in contact with the tissues of patients without excessive toxicity, irritation, allergic response, immunogenicity, are commensurate with a reasonable benefit/risk ratio, and are effective for their intended use.

The terms "treat", "treating" and "treatment", as used herein, refers to ameliorating symptoms associated with a disease or disorder (e.g., multiple sclerosis), including preventing or delaying the onset of the disease or disorder symptoms, and/or lessening the severity or frequency of symptoms of the disease or disorder.

The term "ssRNA", as used herein, refers to a single strand of ribonucleotides that can be of any length disclosed herein, and can further comprise modified ribonucleotides in addition to the naturally occurring ribonucleotides. Specific examples of modified ribonucleotides include ribonucleotides which comprise pseudouridine, 5-methyluridine, 2-thiouridine, 5-methylcytidine (m5C), and N6-methyladenosine bases. The ends of the ssRNA may also be modified, including tagging the ends of the ssRNA with moieties such as cholesterol, folate, various peptides, and aptamers; fluorescent molecules; and 3'-biotin. For purposes of this disclosure, "ssRNA" includes single guide RNA (sgRNA), sgRNA, crRNA, and tracrRNA.

The term "subject" as used herein, refers to an animal, including, but not limited to, a primate (e.g., human, monkey, chimpanzee, gorilla, and the like), rodents (e.g., rats, mice, gerbils, hamsters, ferrets, and the like), lagomorphs, swine (e.g., pig, miniature pig), equine, canine, feline, and the like. The terms "subject" and "patient" are used interchangeably herein. For example, a mammalian subject can refer to a human patient.

The term "substituent" refers to an atom or group of atoms substituted in place of a hydrogen atom. For purposes of this invention, a substituent would include deuterium atoms.

The term "substituted" with respect to hydrocarbons, heterocycles, and the like, refers to structures wherein the parent chain contains one or more substituents.

The term "unsubstituted" with respect to hydrocarbons, heterocycles, and the like, refers to structures wherein the parent chain contains no substituents.

Various RNAs, such as short interfering RNA (siRNA), microRNA, and messenger RNA (mRNA), play pivotal roles in biological functions and have great potential in a variety of therapeutic applications. A desired protein can be produced through the introduction of mRNA, whereas a target gene can be silenced through the delivery of specific siRNA. The ability to control gene expression holds great promise for improved vaccine development, cancer treatment, immunotherapy, and stem-cell therapy. However, the lack of safe and efficient delivery vehicles for RNA remains a major bottleneck for RNA-based therapeutics.

To achieve successful RNA delivery, a delivery vehicle should fulfil multiple requirements. First, the vehicle should bind to the RNA via strong intermolecular interactions and assemble into stable nanoparticles. The nanoparticles should then induce high cellular uptake and efficient endosomal escape, while finally releasing the RNA cargos into the cytoplasm. Additionally, the delivery vectors should have high biocompatibility and low toxicity as well as demonstrate serum stability for in vivo applications.

The disclosure provides for peptide-functionalized biodegradable polymers (PFBPs) that have the advantages of being highly tunable, non-toxic, and scalable. In a certain embodiment, the PFBPs of the disclosure comprise cell-penetrating peptides (CPPs). CPPs can associate with RNA cargos through covalent bonds or non-covalent interactions and facilitate enhanced cellular uptake of the nanoparticle complexes. In another embodiment, the PFBPs of the disclosure comprise disulfide-containing biodegradable polymers. Disulfide-containing biodegradable polymers are advantageous in that they can mediate drug delivery due to their facile degradability of disulfide bonds in the reducing environment of the cytoplasm. In a further embodiment, the PFBPs disclosed herein comprise CPPs and disulfide-containing biodegradable polymers. Reported herein are studies with a series of PFBPs that comprise CPPs and/or disulfide-containing biodegradable polymers for safe and efficient delivery of RNA molecules of various lengths and structures. The PFBPs of the disclosure can deliver RNAs of differing structures and sizes, including: short double stranded RNA, such as siRNA (20-25 bp); both short and intermediate size single stranded mRNA (e.g., 996 nt for eGFP mRNA and 1996 nt for Fluc mRNA); and large single stranded self-replicating (Replicon) RNA ($>10^4$ nt) to multiple cell lines (e.g., se FIG. 1).

Figure 2:
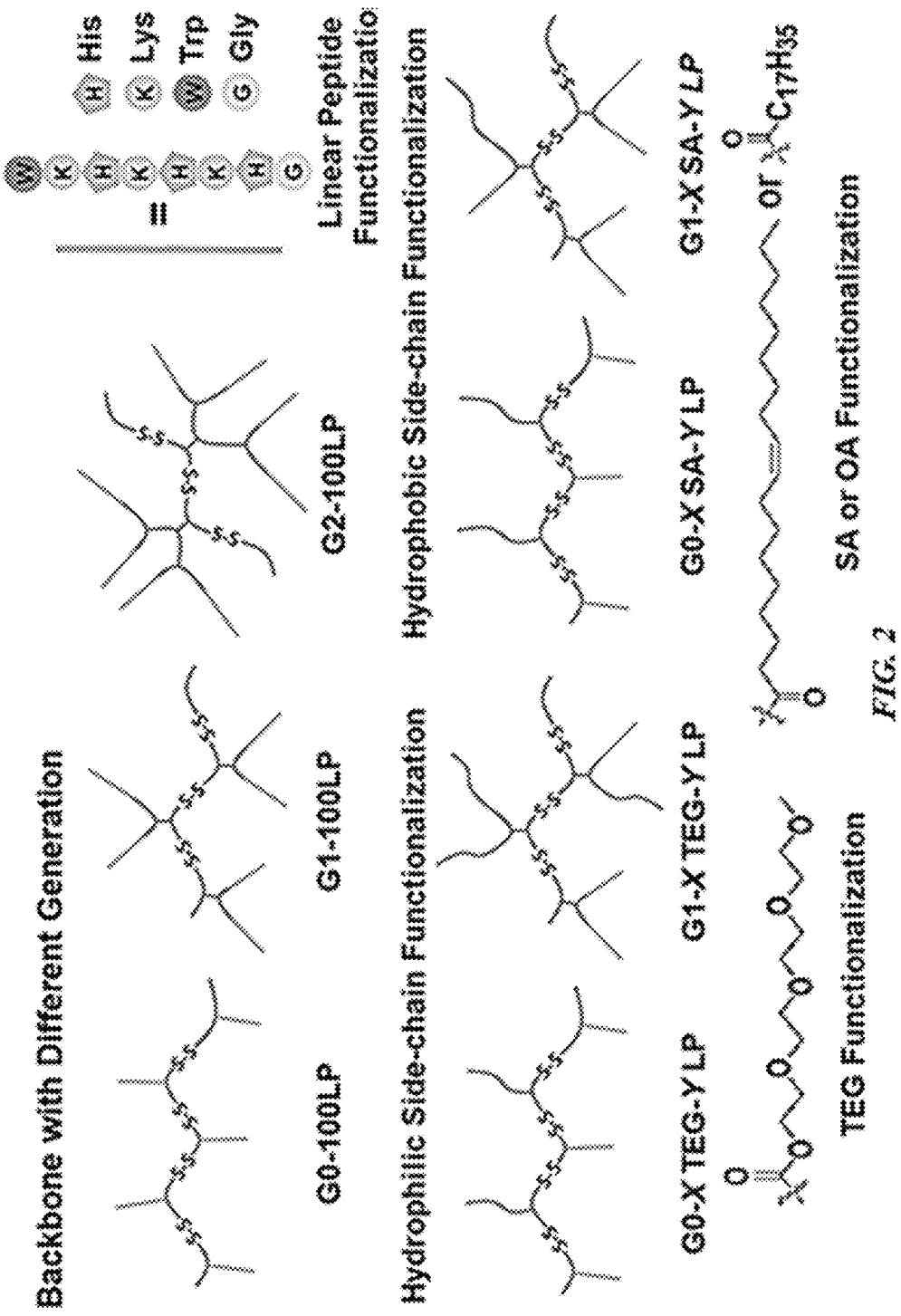
FIG. 2 presents a small library of PFBPs with different polymer architectures and side-chain functionalization.

Current synthetic vectors for nucleic acid delivery are generally designed for delivering one single type of RNA cargo, such as bolaamphiphilies for delivering siRNA or dendritic polymers for delivering mRNA. A universal biodegradable system which can efficiently deliver a variety of RNAs with different structures and sizes remains a challenge. Based on the dramatic structural differences of RNA molecules, a small library of PFBPs with different polymer architectures and side-chain functionalization were developed to discover a vector system which can deliver RNAs of varying sizes and structures with high efficacy and low toxicity (e.g., see FIG. 2).

Further provided herein are methods that utilize the PFBPs disclosed herein to deliver various RNAs of different sizes and structures safely and efficiently into cells. The PFBPs are highly tunable, scalable and biodegradable. It was found that the G0-PFBPs are efficient for siRNA delivery, while the G1 series of PFBPs were suitable for delivering mRNA of varying sizes and structure. It was further found that PFBPs that comprise TEG side chains increase colloidal stability at the expensive of decreasing cell internalization due to the increased hydrophilicity. Thus, a balance should be reached so that PFBPs comprise an appropriate amount of hydrophobic side-chains so as to promote particle assembly and cellular uptake, while avoiding the negative effects of excess aliphatic side-chains, including cell membrane insertion and toxicity. In view of the high delivery efficiency and low toxicity, PFBPs are a promising vector family for universal use in delivering RNAs of any size and/or secondary structure. The methodology presented herein for functionalizing biodegradable polymers with cell penetrating peptides and functional side chains is applicable to the design of other synthetic vectors for gene delivery.

The PFBPs of the disclosure are biodegradable and have low toxicity (i.e., biocompatible) which are further capable of forming stable colloidal non-aggregating complexes or polyplexes with nucleic acids. In particular, it was found that the PFBPs of the disclosure can form complexes or polyplexes with RNA of various sizes and structures and further can effectively release the RNA within a cell. The PFBPs disclosed herein are not limited to the exemplified structures presented herein, but include any structure characterized by the following structural and functional characteristics, including a non-toxic and non-immunogenic polymer that (1) comprises short linear CPPs; (2) has chain flexibility, and which is further capable of forming polyplexes with RNA of various sizes and structures and is then able to release the RNA within a cell. Accordingly, it should be understood, that the disclosure does not simply provide for PFBPs based only on exemplary structural Formulae presented herein, but also includes PFBPs that are comprised of different polymer backbones and which can contain other CPPs that have sequences that do not read on Gly-His-Lys-His-Lys-His-Lys-Trp (SEQ ID NO: 21).

In a certain embodiment, the disclosure provides for a PFBP that is biocompatible and capable of forming a complex or polyplex with nucleic acids and releasing the nucleic acids within a cell, wherein the PFBP comprises short linear cell penetrating peptides (CPPs) and/or comprises branched peptide dendrons that are functionalized on the outer layer with short linear CPPs; wherein the CPPs are either attached directly to the linear polymer via a covalent bond or attached indirectly to the linear polymer via a branched peptide dendron which is covalently attached to the linear polymer; wherein each CPP or dendron is attached to a different point along the length of the linear polymer and wherein no dendron is attached to more than one point on the polymer. In a further embodiment, the linear polymer comprises a linear polymer backbone chain that comprises one or more disulfide bonds. In yet a further embodiment, the linear polymer comprises dicysteine monomers. In a particular embodiment, the linear polymer is an L-lysine—dicysteine based peptide monomer. In an alternate embodiment, the dendrons are attached to the linear polymer by a disulfide bond.

In a certain embodiment, the disclosure further provides that the PFBPs may further comprise a polyoxyalkylene polymer and/or a fatty acid. In another embodiment, the polyoxyalkylene polymer and/or a fatty acid may be directly attached to the linear polymer via a covalent bond or indirectly attached to the linear polymer via a branched peptide dendron which is covalently attached to the linear polymer, and wherein the branched peptide dendron comprises one or more a short linear CPP. Examples of polyoxyalkylene polymers, include but are not limited to: triethylene glycol (TEG); polyethylene glycol (PEG); PEG which has been functionalized with various functional groups or organic molecules, including: halides, acetylenes, amines, azides, hydroxyls, thiols, methacrylates, acrylates, carboxylic acids, maleimides, mesylates, NHS esters, RAFT groups, tosylates, biotin or any combination of the foregoing; PEG diblock copolymers, including PEG-PLA, PEG-PLGA, PEG-PCL, PEG-PE, and PEG-PS; PEG triblock copolymers, including PEG-PPG-PEG, PPG-PEG-PPG, PLA-PEG-PLA, PLGA-PEG-PLGA, and PLCL-PEG-PLCL; poly(ethylene glycol-ran-propylene glycol); and poly (ethylene glycol-ran-propylene glycol) monobutyl ether. Most if not all of these polyoxyalkylene polymers are commercially available from various vendors, such as Sigma-Aldrich (St. Louis, Mo.). Furthermore, a person of ordinary skill in the art would recognize that these polymers can readily be incorporated into synthesis methods presented herein (e.g., SCHEMES 1-2) to produce a PFBP of the disclosure (e.g., a PFBP comprising TEG). Additionally, these polyoxyalkylene polymers come in various molecular weights and it is fully contemplated by this disclosure that any molecular size polyoxyalkylene polymer can be used to make a dendronized polymer of the disclosure. For example, PEG having an average molecular weight of about 200, about 300, about 400, about 600, about 1000, about 1450, about 1500, about 2000, about 3000, about 3350, about 4000, about 4600, about 5000, about 6000, about 8000, about 10000, about 12,000, about 20,000, about 35,000, or any range of molecular weights between or including any two of the foregoing values, can be used in the synthesis of a PFBP of the disclosure. Examples of fatty acids, include but are not limited to: caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, a-linolenic acid, arachidonic acid, eicosapentaenoic acid, erucic acid, and docosahexaenoic acid. In a particular embodiment, wherein the fatty acid is oleic acid or stearic acid.

In a certain embodiment, the PFBP of the disclosure comprise short linear cell penetrating peptides (CPPs). CPPs are short peptides that facilitate cellular intake/uptake of various molecular cargos, such as nucleic acids. The "cargo" is associated with the peptides either through chemical linkage via covalent bonds or through non-covalent interactions. CPPs typically have an amino acid composition that either contains a high relative abundance of positively charged amino acids such as lysine or arginine or has sequences that contain an alternating pattern of polar/ charged amino acids and non-polar, hydrophobic amino acids. These two types of structures are referred to as polycationic or amphipathic, respectively. A third class of CPPs are the hydrophobic peptides, containing only apolar residues, with low net charge or have hydrophobic amino acid groups that are important for cellular uptake. Cell-penetrating peptides are of different sizes, amino acid sequences, and charges but all CPPs have one distinct characteristic, which is the ability to translocate the plasma membrane and facilitate the delivery of various molecular cargoes to the cytoplasm or an organelle. Examples of sequences for CPPs, include but are not limited to, RQIKIWFQNRRMKWKK (SEQ ID NO:1), GRKKRRQRRR (SEQ ID NO:2), YGRKKRRQRRR (SEQ ID NO:3), GRKKRRQRRRPPQ (SEQ ID NO:4), GWTLN-SAGYLLGKINLKALAALAKKIL (SEQ ID NO:5), RRRRRRRRR (SEQ ID NO:6), GALFLAF-LAAALSLMGLWSQPKKKRRV (SEQ ID NO:7), GALFLGWLGAAGSTMGAPKKKRKV (SEQ ID NO:8), PKKKRKV (SEQ ID NO:9), WEAKLAKALAKA-LAKHLAKALAKALKACEA (SEQ ID NO:10), MGLGLHLLVLAAALQGAWSQPKKKRKV (SEQ ID NO:11), CGGGPKKKRKVED (SEQ ID NO:12), SDLWEMMMVSLACQY (SEQ ID NO:13), RGGRLSYS-RRRFSTSTGR (SEQ ID NO:14), RRLSYSRRRF (SEQ ID NO:15), PIRRRKKLRRLK (SEQ ID NO:16), RRQRRTSKLMKR (SEQ ID NO:17), TRRQRTR-RARRNR (SEQ ID NO:18), GRRRRRRRRRPPQ (SEQ ID NO:19), KLALKLALKLALALKLA (SEQ ID NO:20), GHKHKHKW (SEQ ID NO:21), KKLFKKILKYL (SEQ ID NO:22), KKLFKKILKYLKKLFKKILKYL (SEQ ID NO:23), TRQARRNRRRRWRERQR (SEQ ID NO:24), KHKHKHKHKHKHKHKHKH (SEQ ID NO:25), KKKKKKKKK (SEQ ID NO:26), RQIKI FFQNRRMKFKK (SEQ ID NO:27), RKKRR-RESRKKRRRES (SEQ ID NO:28), GRKRKKRT (SEQ ID NO:29), RRRQRRKKR (SEQ ID NO:30), GLRKRLRKFR NKIKEK (SEQ ID NO:31), KALKKLLAKWLAAAKALL (SEQ ID NO:32), QLALQLALQALQAALQLA (SEQ ID NO:33), LKTLATALTKLAKTLTTL (SEQ ID NO:34), LLIILRRRIRKQAHAHSK (SEQ ID NO:35), RQIRIWFQNRRMRWRR (SEQ ID NO:36), MVTVL-FRRLRIRRACGPPRVRV (SEQ ID NO:37), RQIKIWFQNRRMKWKK (SEQ ID NO:38), LLL-FLLKKRKKRKY (SEQ ID NO:39), SYFILRRRRKRFPYFFTDVRVAA (SEQ ID NO:40), RAGLQFPVGRVHRLLRK (SEQ ID NO:41), GLFKALLKLLKSLWKLLLKA (SEQ ID NO:42), CSIPPEVKFNKPFVYLI (SEQ ID NO:43), PRPLPFPRPG (SEQ ID NO:44), KMTRAQRRAAARRNRWTAR (SEQ ID NO:45), TRSSRAGLQFPVGRVHRLLRK (SEQ ID NO:46), KLRTRAQRRAAARKNKRNTR (SEQ ID NO:47), RRRRNRTRRNRRRVR (SEQ ID NO:48), LGTYTQDFNKFHTFPQTAIGVGAP (SEQ ID NO:49), TRQARRNRRRRWRERQR (SEQ ID NO:50), TSPLNIHNGQKL (SEQ ID NO:51), MGLGLHLLV-LAAALQGAWSQPKKKRKV (SEQ ID NO:52), AAVALLPAVLLALLAP (SEQ ID NO:53), VPMLKPMLKE (SEQ ID NO:54), and RQIKIWFQNRRMKWKKGG (SEQ ID NO:55). Many more examples of short, linear CPPs are known in the art and can be used with the PFBPs of the disclosure. Such CPPs can be found in various publicly accessible databases, and are incorporated herein (e.g., see (http://)-(crdd.osdd.net/rag-hava/cppsite/index.html). Further, the CPPs are available for purchase from a variety of vendors, including Lifetein. The disclosure further provides that the CPPs may be directly attached to a linear polymer backbone of the PFBP, such PFBP as described herein are indicated as having a G0 backbone (e.g., see SCHEME 2A). In a similar manner, fatty acids and polyoxyalkylene polymers may also be directly attached to a G0 backbone via a covalent bond (e.g., see SCHEME 2B-C). The disclosure also provides for a class of PFBPs which comprise branched peptide dendrons which are functionalized by CPPs as well as fatty acids and polyoxyalkylene polymers (e.g., see SCHEME 2A-C). While not shown in the figures presented herein, the dendrons may be attached to the linear polymer via disulfide bonds. In such a case, the linear polymer lacks disulfide bonds.

In a particular embodiment, the disclosure provides for a PFBP comprising the structure of Formula I:

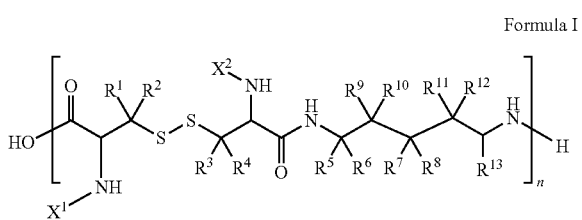

Formula I wherein, n is an integer greater than 1, 2, 3, 4, 5, 6, 7, 8, 9, 10, 15, 20, 25, 50, 100, 200, 300, 400, 500, 1000, 500, 10000, 20000, or 50000; $R^1$-$R^{12}$ are independently selected from the group comprising H, D, optionally substituted ($C_1$-$C_{12}$)-alkyl, optionally substituted ($C_1$-$C_{12}$)-heteroalkyl, optionally substituted ($C_2$-$C_{12}$)-alkenyl, optionally substituted ($C_{2-12}$)-heteroalkenyl, optionally substituted ($C_{2-12}$)-alkynyl, optionally substituted ($C_2$-$C_{12}$)-heteroalkynyl, optionally substituted ($C_3$-$C_{12}$)-cycloalkyl, optionally substituted ($C_4$-$C_{12}$)-cycloalkenyl, halo (e.g., F, Cl, Br or I), optionally substituted oxygen containing functional group (e.g., alcohol, ketone, aldehyde, acyl halide, carbonate, carboxylic acid, ester, and ether), optionally substituted nitrogen containing functional group (e.g., amide, amine, imine, azide, cyanate, azo, nitrate, nitrile, nitro, and nitroso), optionally substituted sulfur containing functional group (e.g., thiol, sulfide, disulfide, sulfoxide, sulfone, sulfinic acid, sulfonic acid, thiocyanate, thione, and thial), optionally substituted phosphorous containing functional group (e.g., phosphine, phosphonic acid, phosphate, phosphodiester), optionally substituted boron containing functional group (e.g., boronic acid, boronic ester, borinic acid, and borinic ester), optionally substituted aryl, optionally substituted heterocycle; alternatively, $R^1$-$R^{12}$ are independently selected from the group consisting of optionally substituted ($C_1$-$C_6$)-alkyl, optionally substituted ($C_1$-$C_6$)-heteroalkyl, optionally substituted ($C_2$-$C_6$)-alkenyl, optionally substituted ($C_2$-$C_6$)-heteroalkenyl, optionally substituted ($C_2$-$C_6$)-alkynyl, optionally substituted ($C_2$-$C_6$)-heteroalkynyl, optionally substituted ($C_3$-$C_{12}$)-cycloalkyl, optionally substituted ($C_4$-$C_{12}$)-cycloalkenyl, halo, hydroxyl, carboxyl, ester, alkoxy, amino, cyano, azido, cyanato, nitro, amide, carboxyimido, nitroso, thiol, sulfinyl, sulfonyl, thial, phosphate, phosphono, boronic acid, optionally substituted aryl, and optionally substituted heterocycle; alternatively, $R^1$-$R^{12}$ are independently selected from the group consisting of optionally substituted ($C_1$-$C_3$)-alkyl, optionally substituted ($C_1$-$C_3$)-heteroalkyl, optionally substituted halo, hydroxyl, carboxyl, ester, alkoxy, amino, cyano, azido, nitro, and amide; $R^{13}$ is an H, D, optionally substituted ($C_1$-$C_6$)-alkyl, alkoxy, cyano, hydroxyl, halo, or ester; alternatively, $R^{13}$ is an H, alkoxy, cyano, hydroxyl, halo, or ester; alternatively, $R^{13}$ is an H, hydroxyl or an ester; alternatively, $R^{13}$ is an ester; $X^1$-$X^2$ are independently selected from a short linear CPP, a polyoxyalkylene polymer, a fatty acid, or a branched peptide dendron functionalized with one or more short linear CPPs, wherein the branched peptide dendron comprising the CPP may further be functionalized with a fatty acid and/or a polyoxyalkylene polymer, and wherein at least one of $X^1$ and $X^2$ is a short linear CPP, or a branched peptide dendron functionalized with one or more short linear CPPs.

In a further embodiment, the disclosure provides for a PFBP comprising the structure of Formula I(a):

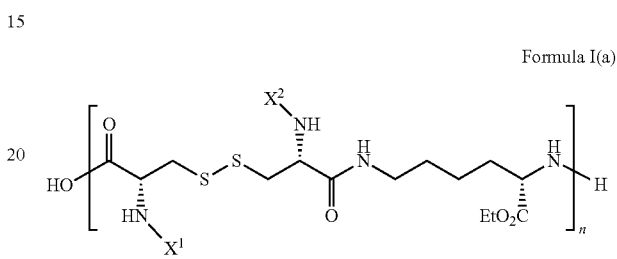

Formula I(a)

wherein, n is an integer greater than 5, 10, 50, 100, 200, 300, 400, 500, 1000, 500, 10000, 20000, or 50000; $X^1$-$X^2$ are independently selected from a short linear CPP, a polyoxyalkylene polymer, a fatty acid, or a branched peptide dendron functionalized with one or more short linear CPPs, wherein the branched peptide dendron comprising the CPP may further be functionalized with a fatty acid and/or a polyoxyalkylene polymer, and wherein at least one of $X^1$ and $X^2$ is a short linear CPP, or a branched peptide dendron functionalized with one or more short linear CPPs.

In a particular embodiment, the PFBP disclosed herein has an N:P ratio between 5 to 45 (wherein the N:P ratio refers to the molar ratio of protonated amines of the PFBP: phosphates of the mRNA). In further embodiment, the N:P ratio is 5, 6, 7, 8, 9, 10, 11, 12, 13, 14, 15, 16, 17, 18, 19, 20, 25, 30, 35, 40, 45, or any range of N:P ratios between or including any two of the foregoing values. In a particular embodiment, the N:P ratio is 10.

The disclosure further provides that a "graft-from" approach can be used to produce the PFBPs of the disclosure. For example, PFBPs can be made by following the generalized "graft from" method of SCHEME 3:

SCHEME 3

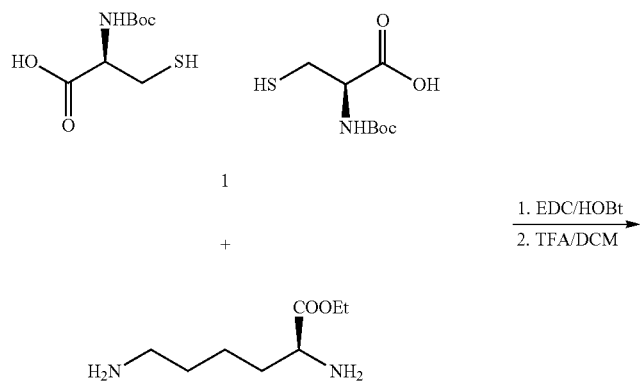

17

-continued

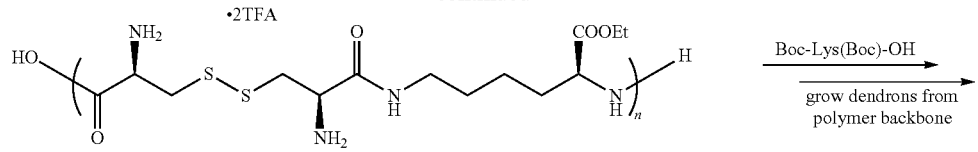

3
GPC $M_n \sim 15$ kDA, PDI $\sim 1.8$

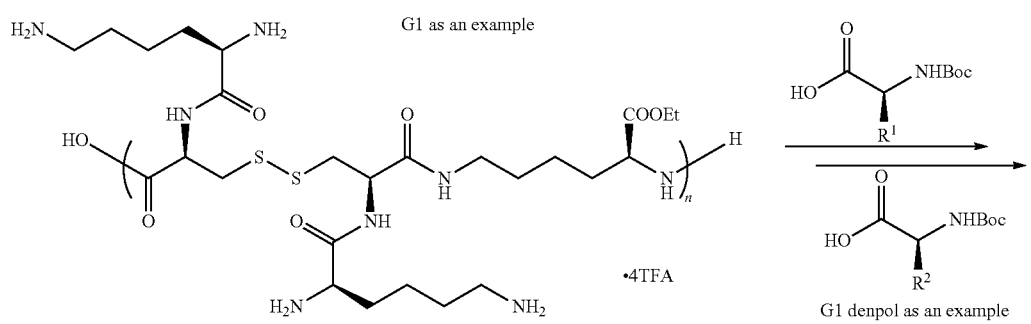

4

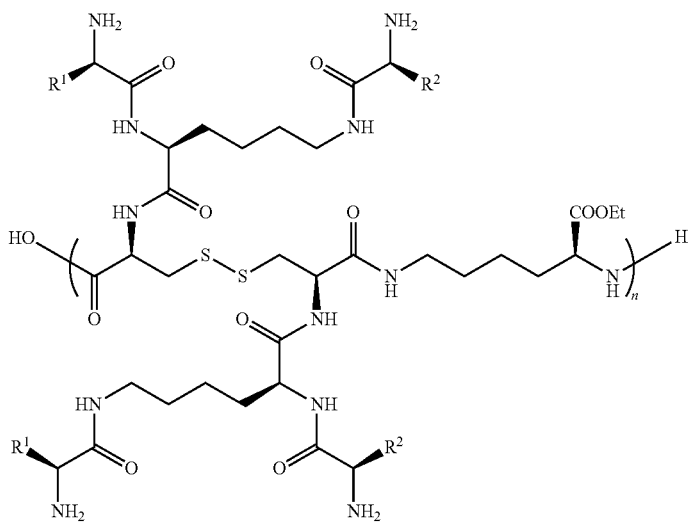

5

$R^1$ = a CPP
$R^2$ = a CPP, a fatty acid, or a polyoxylalkylene polymer

18

The backbone of the PFBP is prepared by simple in situ peptide coupling polymerization between a dicysteine monomer 1 and a lysine monomer 2 (polymer Mn~15 KD, PDI~1.8 by GPC). The disulfide linkages on the polymer backbone are introduced to be biodegradable under a reducing environment in the cytoplasm so as to facilitate nucleic acid decomplexation. After Boc deprotection, lysine-based dendrons were grown from the polymer backbone 4 generation by generation through solution phase peptide coupling.

In an alternate embodiment, the disclosure provides a "combinatorial" approach can be used to produce the PFBPs of the disclosure. For example, PFBPs can be made by following the generalized "combinatorial" method of SCHEME 4:

SCHEME 4

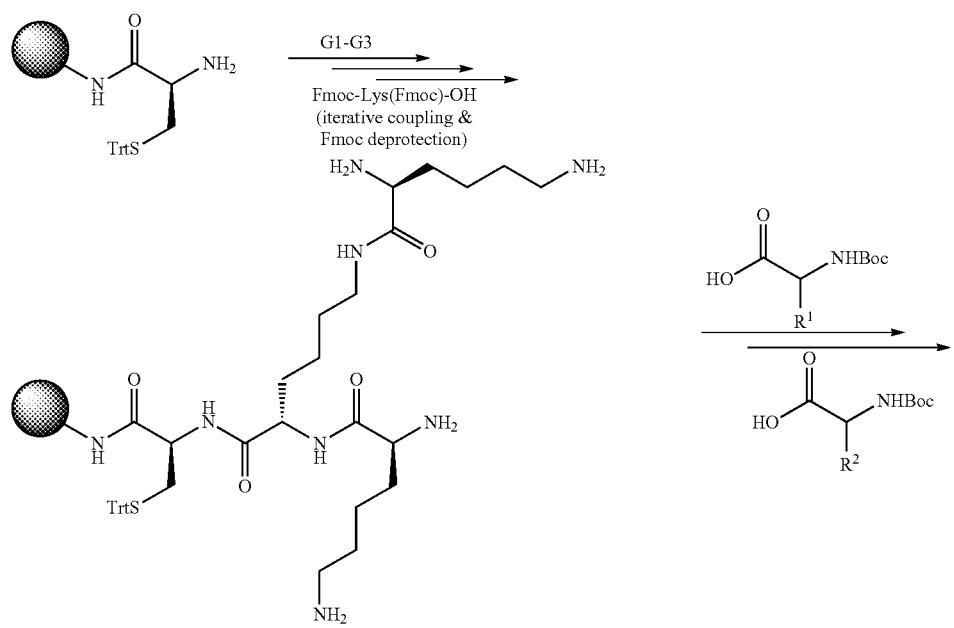

(G2 synthesis is shown as an example)

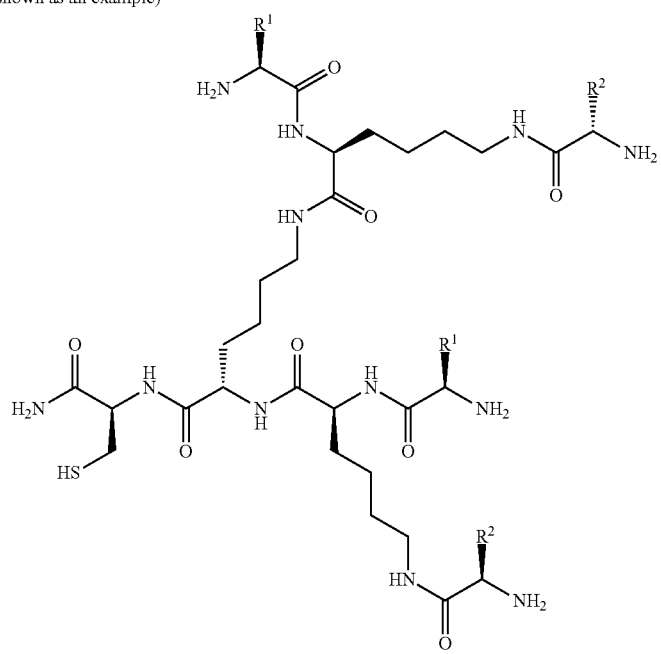

(G2-dendron shown as an example)

G1-G3 dendrons:  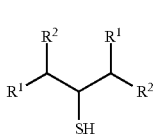 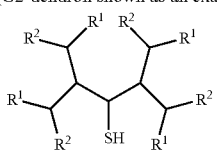

$R^1$ = a CPP
$R^2$ = a CPP, a fatty acid, or a polyoxylalkylene polymer

Oligolysine can be used to construct the polymer backbone. Oligolysine can easily be made by SPPS. Following procedure of Kantchev et al. (*Org Biomol Chem* 6 (8):1377-85 (2008)), a library of dendrons with controlled size and functionalities are synthesized by automated SPPS (SCHEME 4). Briefly, Rink Amide Resin is first coupled with cysteine, which is then used as an anchoring group for grafting to the polymer backbone through a disulfide linkage. Lysine dendron is grown step by step until reaching the desired generation. Finally, the out layer is functionalized with a CPP ($R_1$); and a CPP, a fatty acid or a polyoxyalkylene polymer ($R_2$). Depending on the coupling protocol, the spatial placement of different functional groups on the dendrons can be precisely controlled. After acid cleavage, each individual dendron is purified and characterized. SPPS is ideally suited because it provides expedient access to a large library of dendrons.

In another embodiment, the disclosure provides a "graft-to" approach can be used to produce the PFBPs of the disclosure. For example, PFBPs can be made by following the generalized "graft-to" method of SCHEME 5:

SCHEME 5

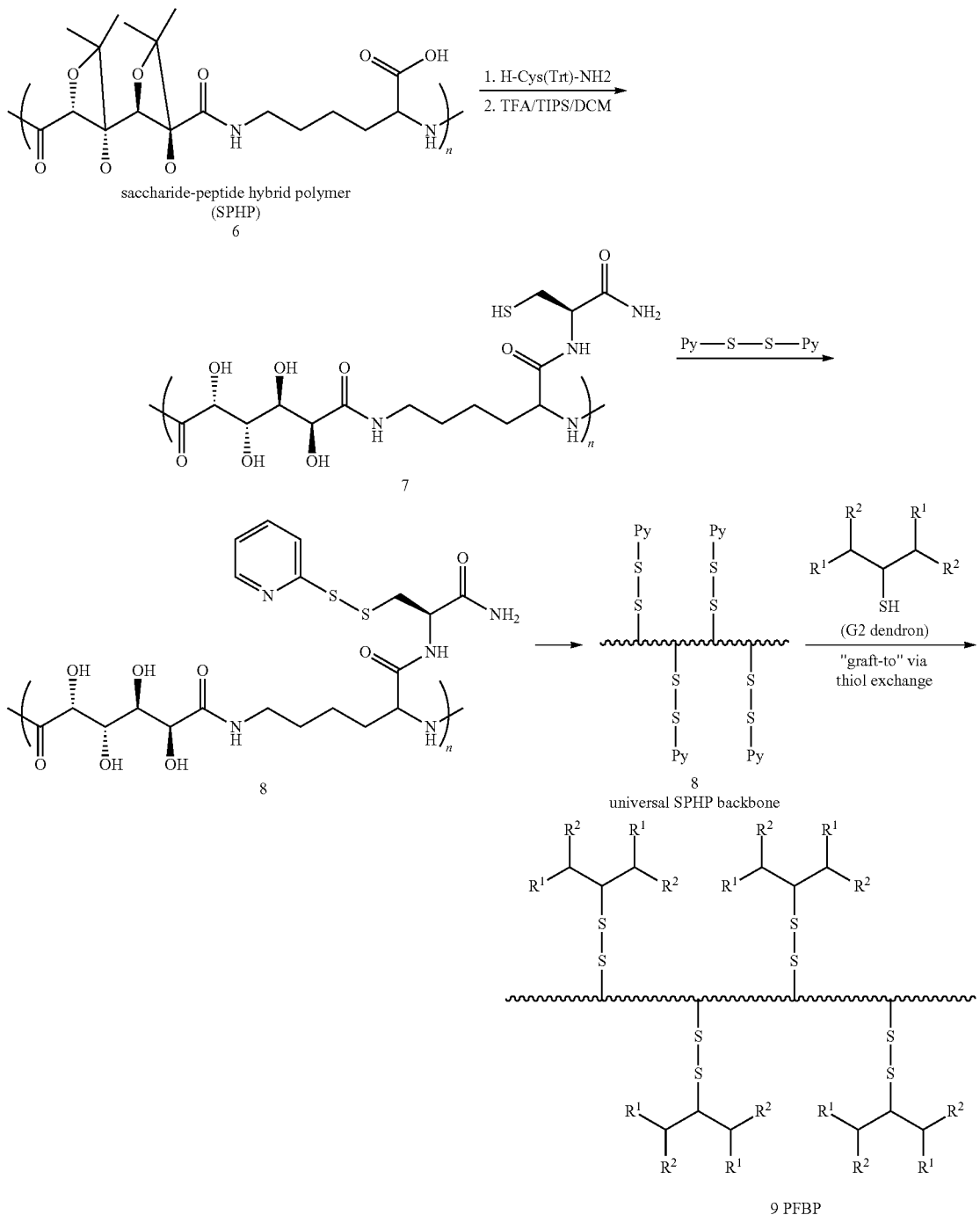

$R^1$ = a CPP
$R^2$ = a CPP, a fatty acid, or a polyoxylalkylene polymer

In a further embodiment, the PFBP disclosed herein further comprises targeting ligands. Examples of targeting ligands, include but are not limited to, antibodies, aptamers, cholesterol and its derivatives, folate compounds or folate conjugates, transferrin, and saccharides (e.g., mono-, di-, oligo-saccharides). These targeting ligands can be conjugated to the dendronized polymers by using the techniques presented in Shu et al. (Annual Review of Physical Chemistry 64:631-657 (2013)), Gauthier et al. (Chem. Commun 23:2591-2611 (2008)), Menzel (*Advances in Polymer Science* 253:1-36 (2013)), Mero et al. (*Methods Mol Biol.* 751:95-129 (2011)), Roberts et al. (*Advanced Drug Delivery Reviews* 54:459-476 (2002)), Steenis et al. (*Journal of Controlled Release* 87:167-176 (2003)), which are incorporated herein in-full, including the references cited therein.

In any of embodiment disclosed herein, the PFBPs of the disclosure further comprise complexed or polyplexed RNA, such as siRNA, ssRNA, mRNA, or RNA-based replicons. In a particular embodiment, the disclosure provides methods for delivering RNA to a cell in vitro or in vivo comprising contacting the cell with a PFBP that further comprises complexed RNA.

In the experiments presented herein, the PFBPs of the disclosure can form complexes preferentially with nucleic acids, are stable in serum, allow for nucleic acid diffusion across the plasma membrane, and provide for endosomal escape. Accordingly, the PFBPs disclosed herein are particularly suited for delivering RNA and other nucleic acids into cells. It should be noted that the ability of the PFBPs to complex with nucleic acids is based upon electrostatic and other forms of chemical interactions (intercalation) and is not based upon specific base pairing between the PFBP and the nucleic acid. Accordingly, the PFBPs of the disclosure can be used with nucleic acids in general, and is not limited to nucleic acids having a specific sequence (e.g., the specific mRNAs used in the examples). Thus, the PFBPs of the disclosure have general utility as being able to effectively deliver nucleic acids of any length or sequence into cells. Any number of nucleic acids are useful for diagnostics, therapeutics, vaccines and research can be used in the methods and compositions of the disclosure. Particularly, the nucleic acids e.g., DNA, cDNA, ssRNA, mRNA, RNA-based replicons, etc.) can be any length or having any structure. For example, the PFBPS disclosed herein can be complexed or polyplexed with RNA, having a length of about 100 ribonucleotides, about 200 ribonucleotides, about 300 ribonucleotides, about 400 ribonucleotides, about 500 ribonucleotides, about 600 ribonucleotides, about 700 ribonucleotides, about 800 ribonucleotides, about 900 ribonucleotides, about 1000 ribonucleotides, about 1100 ribonucleotides, about 1200 ribonucleotides, about 1300 ribonucleotides, about 1400 ribonucleotides, about 1500 ribonucleotides, about 1600 ribonucleotides, about 1700 ribonucleotides, about 1800 ribonucleotides, about 1900 ribonucleotides, about 2000 ribonucleotides, about 2100 ribonucleotides, about 2200 ribonucleotides, about 2300 ribonucleotides, about 2400 ribonucleotides, about 2500 ribonucleotides, about 2600 ribonucleotides, about 2700 ribonucleotides, about 2800 ribonucleotides, about 2900 ribonucleotides, about 3000 ribonucleotides, about 4000 ribonucleotides, about 5000 ribonucleotides, about 6000 ribonucleotides, about 7000 ribonucleotides, about 8000 ribonucleotides, about 9000 ribonucleotides, about 10,000 ribonucleotides, about 15,000 ribonucleotides, about 18,000 ribonucleotides, about 20,000 ribonucleotides, about 30,000 ribonucleotides, about 40,000 ribonucleotides, about 50,000 ribonucleotides, about 60,000 ribonucleotides, about 70,000 ribonucleotides, about 80,000 ribonucleotides, about 90,000 ribonucleotides, about 100,000 ribonucleotides or about 120,000 ribonucleotides, or any range of ribonucleotides between or including any two of the foregoing values. Moreover, PFBPs described herein can be used to deliver multiple types of nucleic acids. For example, the PFBPs disclosed herein can be complexed with 1, 2, 3, 4, 5, 6, 7, 8, 9, 10, 15, 20, 30, 40, 100 or more different types of nucleic acids (e.g., difference sequences, different lengths, RNA and DNA, mRNA and siRNA, etc.), or any range of different nucleic acids between or including any two of the foregoing values.

In a certain embodiment, the disclosure provides for a pharmaceutical composition which comprises a PFBP disclosed herein. Moreover, the pharmaceutical composition can be formulated into a form suitable for administration to a subject including the use of carriers, excipients, additives or auxiliaries. Frequently used carriers or auxiliaries include magnesium carbonate, titanium dioxide, lactose, mannitol and other sugars, talc, milk protein, gelatin, starch, vitamins, cellulose and its derivatives, animal and vegetable oils, polyethylene glycols and solvents, such as sterile water, alcohols, glycerol, and polyhydric alcohols. Intravenous vehicles include fluid and nutrient replenishers. Preservatives include antimicrobial, anti-oxidants, chelating agents, and inert gases. Other pharmaceutically acceptable carriers include aqueous solutions, non-toxic excipients, including salts, preservatives, buffers and the like, as described, for instance, in Remington's Pharmaceutical Sciences, 15th ed., Easton: Mack Publishing Co., 1405-1412, 1461-1487 (1975), and The National Formulary XIV., 14th ed., Washington: American Pharmaceutical Association (1975), the contents of which are hereby incorporated by reference. The pH and exact concentration of the various components of the pharmaceutical composition are adjusted according to routine skills in the art. See Goodman and Gilman's, The Pharmacological Basis for Therapeutics (7th ed.).

The pharmaceutical compositions according to the disclosure may be administered at a therapeutically effective amount either locally or systemically. As used herein, "administering a therapeutically effective amount" is intended to include methods of giving or applying a pharmaceutical composition of the disclosure to a subject that allow the composition to perform its intended therapeutic function. The therapeutically effective amounts will vary according to factors, such as the degree of infection in a subject, the age, sex, and weight of the individual. Dosage regime can be adjusted to provide the optimum therapeutic response. For example, several divided doses can be administered daily or the dose can be proportionally reduced as indicated by the exigencies of the therapeutic situation.

The pharmaceutical composition can be administered in a convenient manner, such as by injection (e.g., subcutaneous, intravenous, and the like), oral administration, inhalation, transdermal application, or rectal administration. Depending on the route of administration, the pharmaceutical composition can be coated with a material to protect the pharmaceutical composition from the action of enzymes, acids, and other natural conditions that may inactivate the pharmaceutical composition. The pharmaceutical composition can also be administered parenterally or intraperitoneally. Dispersions can also be prepared in glycerol, liquid polyethylene glycols, and mixtures thereof, and in oils. Under ordinary conditions of storage and use, these preparations may contain a preservative to prevent the growth of microorganisms.

Pharmaceutical compositions suitable for injectable use include sterile aqueous solutions (where water soluble) or dispersions and sterile powders for the extemporaneous preparation of sterile injectable solutions or dispersions. The composition will typically be sterile and fluid to the extent that easy syringability exists. Typically the composition will be stable under the conditions of manufacture and storage and preserved against the contaminating action of microorganisms, such as bacteria and fungi. The carrier can be a solvent or dispersion medium containing, for example, water, ethanol, polyol (for example, glycerol, propylene glycol, and liquid polyetheylene glycol, and the like), suitable mixtures thereof, and vegetable oils. The proper fluidity can be maintained, for example, by the use of a coating, such as lecithin, by the maintenance of the required particle size, in the case of dispersion, and by the use of surfactants. Prevention of the action of microorganisms can be achieved by various antibacterial and antifungal agents, for example, parabens, chlorobutanol, phenol, ascorbic acid, thimerosal, and the like. In many cases, isotonic agents, for example, sugars, polyalcohols, such as mannitol, sorbitol, or sodium chloride are used in the composition. Prolonged absorption of the injectable compositions can be brought about by including in the composition an agent that delays absorption, for example, aluminum monostearate and gelatin.

Sterile injectable solutions can be prepared by incorporating the pharmaceutical composition in the required amount in an appropriate solvent with one or a combination of ingredients enumerated above, as required, followed by filtered sterilization. Generally, dispersions are prepared by incorporating the pharmaceutical composition into a sterile vehicle that contains a basic dispersion medium and the required other ingredients from those enumerated above.

The pharmaceutical composition can be orally administered, for example, with an inert diluent or an assimilable edible carrier. The pharmaceutical composition and other ingredients can also be enclosed in a hard or soft-shell gelatin capsule, compressed into tablets, or incorporated directly into the subject's diet. For oral therapeutic administration, the pharmaceutical composition can be incorporated with excipients and used in the form of ingestible tablets, buccal tablets, troches, capsules, elixirs, suspensions, syrups, wafers, and the like. Such compositions and preparations should contain at least 1% by weight of active compound. The percentage of the compositions and preparations can, of course, be varied and can conveniently be between about 5% to about 80% of the weight of the unit.

The tablets, troches, pills, capsules, and the like can also contain the following: a binder, such as gum gragacanth, acacia, corn starch, or gelatin; excipients such as dicalcium phosphate; a disintegrating agent, such as corn starch, potato starch, alginic acid, and the like; a lubricant, such as magnesium stearate; and a sweetening agent, such as sucrose, lactose or saccharin, or a flavoring agent such as peppermint, oil of wintergreen, or cherry flavoring. When the dosage unit form is a capsule, it can contain, in addition to materials of the above type, a liquid carrier. Various other materials can be present as coatings or to otherwise modify the physical form of the dosage unit. For instance, tablets, pills, or capsules can be coated with shellac, sugar, or both. A syrup or elixir can contain the agent, sucrose as a sweetening agent, methyl and propylparabens as preservatives, a dye, and flavoring, such as cherry or orange flavor. Of course, any material used in preparing any dosage unit form should be pharmaceutically pure and substantially non-toxic in the amounts employed. In addition, the pharmaceutical composition can be incorporated into sustained-release preparations and formulations.

Thus, a "pharmaceutically acceptable carrier" is intended to include solvents, dispersion media, coatings, antibacterial and antifungal agents, isotonic and absorption delaying agents, and the like. The use of such media and agents for pharmaceutically active substances is well known in the art. Except insofar as any conventional media or agent is incompatible with the pharmaceutical composition, use thereof in the therapeutic compositions and methods of treatment is contemplated. Supplementary active compounds can also be incorporated into the compositions.

It is especially advantageous to formulate parenteral compositions in dosage unit form for ease of administration and uniformity of dosage. "Dosage unit form" as used herein, refers to physically discrete units suited as unitary dosages for the subject to be treated; each unit containing a predetermined quantity of pharmaceutical composition is calculated to produce the desired therapeutic effect in association with the required pharmaceutical carrier. The specification for the dosage unit forms of the disclosure are related to the characteristics of the pharmaceutical composition and the particular therapeutic effect to be achieve.

The principal pharmaceutical composition is compounded for convenient and effective administration in effective amounts with a suitable pharmaceutically acceptable carrier in an acceptable dosage unit. In the case of compositions containing supplementary active ingredients, the dosages are determined by reference to the usual dose and manner of administration of the said ingredients.

In further embodiments disclosed herein, the PFBPs can be used with mRNAs in a variety of mRNA-based therapies, including to induce an immune response and potentiation, to replace or supplement proteins, to generate pluripotent stem cells, to genome engineer by using mRNA-encoded meganucleases, etc. In considering the advantages and disadvantages of mRNA-based therapy, there are several conceptual advantages compared to other nucleic acid-based approaches. Unlike DNA based therapy, mRNA does not have the risk of integration into the chromosomes, which can lead to insertional mutagenesis with potentially disastrous results. mRNA delivered therapeutically only results in transient translation that can be controlled by both changes in the UTRs or coding sequence and is completely degraded through physiologic pathways. This is considered both an advantage and a disadvantage depending on therapeutic needs. In principle, mRNA-based therapies appear to be much safer than DNA or viral and are applicable to a broad spectrum of disorders both acute and chronic. While DNA and RNA are both protein-encoding molecules that utilize cellular systems to produce the protein of interest, there are many differences in the use of mRNA versus DNA. The first involves the site of initial activity, which is the nucleus for plasmid DNA and the cytoplasm for mRNA. This represents a major difference between DNA and RNA, as DNA requires nuclear envelope breakdown during cell division to reach the nucleus and produce encoded protein, while mRNA only needs to reach the cytoplasm for translation. For mRNA to be translated into protein, it should survive in the extracellular space that contains high levels of ubiquitous RNases; it should reach or be targeted to the cells of interest for translation, and finally, it should cross the cell membrane. The cell membrane hinders passive diffusion of large negatively charged mRNA molecules. Although, it has been demonstrated that eukaryotic cells can actively engulf naked mRNA through a receptor mediated mechanism, in most cell types, the rate of uptake with transfer to the cytoplasm is extremely low, and naked mRNA has a very short half-life in tissues and fluids containing high levels of RNase activity.

The PFBPs disclosed herein overcome these obstacles by providing for the effective delivery of mRNA to cells. In particular, the PFBPs complex with mRNA and protect the mRNA from degradation by extracellular RNases and increase cellular uptake of the mRNA, and further, by use of targeting peptides, the mRNA/PFBP complexes can be targeted to specific tissues and cell types. Therapeutically, mRNA/PFBP complexes may be directly conveyed into a subject's cells, ex vivo, to allow for more precise control of mRNA delivery, and then the transfected cells can be administered back to the patient. Alternatively, the mRNA/PFBP complex may be used in a suitable pharmaceutical composition disclosed herein and be directly administered in vivo to a subject.

The intrinsic immunogenicity of in vitro transcribed snRNA is viewed as advantageous in vaccine therapeutics due to its adjuvant activity that results in potent antigen-specific humoral and cellular immune responses. RNA has a distinctive pattern of immune stimulation, but this can be partially modulated by altering the characteristics (type and size) of the particle used to deliver it. The observation that naturally occurring RNAs differed in their immune activating potential and the level of immune activation correlated with the number of modified ribonucleotides contained in the RNA led to the finding that naturally occurring modified ribonucleotides that are modified to comprise pseudouridine, 5-methyluridine, 2-thiouridine, 5-methylcytidine (m5C), and N6-methyladenosine bases suppressed RNAs immunostimulatory effect by avoiding activation of TLR3, TLR7 and TLR8. The absence of the activation of RNA sensors led to mRNA that was translated at much greater levels (>1000-fold) in vivo without inducing proinflammatory cytokines, Type I interferons or adverse events and led to the current resurgence of nonvaccine mRNA therapeutics. Accordingly, it certain embodiments described herein, the PFBPss disclosed herein can be used with mRNAs that contain modified ribonucleotides so as to increase the translation of the mRNAs in vitro. For example, mRNAs disclosed herein can comprise any number of ribonucleotides that comprise modified bases such as pseudouridine, 5-methyluridine, 2-thiouridine, 5-methylcytidine (m5C), and/or N6-methyladenosine.

Direct addition of mRNA derived from tumor cells or encoding tumor specific antigens to dendritic cells (DCs) ex vivo followed by administration of DCs back to the host, followed this first demonstration of efficacy and led to extensive development leading to clinical trials. Multiple enhancements to this approach to therapy were attempted, including the addition of mRNAs encoding co-stimulators and cytokines. Some spectacular results have been reported, including the use of dendritic cells electroporated with melanoma-associated antigen fused to a HLA-class II targeting signal (DC-LAMP), adjuvanted with mRNAs encoding CD40 ligand, a constitutively active Toll-like receptor 4, and CD70, in treated melanoma patients where antitumor activity with durable disease control was observed. Tumor-derived mRNA loaded DCs have entered a Phase III clinical trial for patients with advanced renal cell cancer. Accordingly, the PFBPs disclosed herein can be used to transfect dendritic or other cells ex vivo from a subject with one or more tumor-derived mRNAs or other carcinoembryonic antigen mRNAs so as to induce an immune protective response against cancer cells in the subject. Additionally, the PFBPs disclosed herein can be used to transfect dendritic or other cells ex vivo from a subject with one or more infectious agent-derived mRNAs (e.g., mRNAs from viruses, bacteria, protozoa, or fungi) so as to induce an immune protective response by the subject against the infectious agent.

Environmental allergic diseases are a hypersensitivity disorder of the immune system mediated by IgE antibodies. Current treatments involve immunization with graded dosing of the allergen to modulate the type of T cell response and induce IgG antibodies that compete and inhibit IgE binding to allergens. New and effective, but very costly, alternatives involve the injection of anti-IgE monoclonal antibody. The molecular identification of the most common antigens leading to hypersensitivity has allowed the development of recombinant vaccine methods. mRNA encoding allergen vaccination prompted long-lasting allergen specific Th1 immune responses that protected mice from allergen exposure-mediated inflammation of the lung. Accordingly, the PFBPs disclosed herein can be used to transfect dendritic or other cells ex vivo from a subject with mRNAs encoding one or more allergenic antigens (e.g., antigens associated with peanuts, milk, latex, ragweed, shellfish, mold, dust mites, grasses, pollen, etc.) so as to promote long-lasting allergen specific Th1 immune responses in the subject.

In 2010, mRNAs coding for the Yamanaka stem cell factors (Oct3/4, Sox2, K1f4, c-Myc) containing pseudouridine and 5-methylcytydine were used to efficiently reprogram cells to pluripotency (iPS cells) without any integration events. A number of variants using the nucleoside modified mRNA approach have been described that claim a more effective induction of pluripotent stem cells or cell fate conversion. Prior to the use of nucleoside modified mRNA with its lack of innate immune signaling, mRNA was already being used to induce iPS cells, because of its high in vitro transfection efficiency and transient expression with lack of genomic integration. The transient expression of iPS factors makes the use of nucleoside-modified mRNA for creating iPS cells attractive for different fields, including disease modeling and therapy for a variety of diseases with potential application to treatment. Accordingly, the PFBPs disclosed herein can be used to re-program somatic cells to iPS cells by efficiently delivering mRNAs encoding re-programming factors into the somatic cells. Examples of re-programming factors, include but are not limited to, Oct3/4, Sox1, Sox2, Sox3, Sox15, Sox18, K1f1, K1f2, K1f4, K1f5, n-Myc, 1-Myc, c-Myc, Nanog, LIN28, and Glis 1. The mRNA sequences for all of the foregoing factors are publicly accessible and viewable via GenBank.

mRNA therapeutics can be viewed as a form of transient gene therapy without the potential complications of long-term gene therapy, including insertional mutagenesis, vector immunity and effects of viral replication on cell function. The delivery of therapeutic proteins by mRNA is an obvious therapeutic objective. The delivery of such encoded proteins can be initially divided between extracellular acting and systemic proteins versus intracellular acting proteins and then further divided based on; short-term delivery to treat deficient or non-functional proteins; long-term replacement of deficient or non-functional proteins; delivery of exogenous therapeutic proteins (monoclonal antibodies), and acute site-specific or systemic delivery of a protein during a medical emergency or therapeutic procedure. Accordingly, the PFBPs described herein can be used to deliver one or more mRNAs that encode therapeutic protein(s) (e.g., insulin, Factor IX) for protein replacement.

Early forms of gene therapy for the repair of inborn errors of a particular gene sought to replace the defective gene by delivering a functional copy containing its own promoter and regulatory regions and inserting it into the chromosomes using a viral vector. Genome editing has emerged as a potential alternative for gene therapy. Zinc finger nucleases and transcription activator-like effector nucleases use meganucleases linked to protein sequences that bind to specific DNA sequences that allows site specific cutting of DNA in chromatin. The CRISPR/cas9 system is derived from the acquired immune system of certain bacteria that uses RNA tags linked to a protein with nuclease activity called cas9. The RNA tags identify the site for cutting. The major adverse event encountered in all forms of gene editing is the risk of nonspecific editing. The amount of off-site effects associates with increasing duration of functional enzyme as mediated by plasmid or viral delivery systems. All three of the gene editing technologies only require the nucleases to be present for a short duration, thus, their transient expression from encoding mRNA would meet this criterion and likely minimize the potential for nonspecific effects. mRNAs encoding cas9, transcription activator-like effector nucleases and zinc finger nucleases and ZFNa have been successfully used to edit genomes ex vivo in embryonic cells from different species and in vivo in rodents and zebrafish. For all three gene editing approaches, the use of mRNA either by direct injection in vivo or ex vivo treatment would allow the fine tuning of dosing that cannot be achieved with plasmid and viral delivery. The additional advantages of high transfection efficiency without cell toxicity would be beneficial for the generation of transgenic animals and the treatment of human genetic diseases with potential application to other types of diseases, including cancer. Accordingly, the PFBPs disclosed herein can complexed or polyplexed with one or more mRNA that encode engineered nucleases, such as mRNAs that encode cas9, transcription activator-like effector nucleases, zinc finger nucleases and ZFNa. The mRNA sequences for all of the foregoing engineered nucleases are publicly accessible and viewable via GenBank.

Single-stranded RNA viruses of both positive and negative polarity have been used as vectors for vaccine development. In this context, alphaviruses, flaviviruses, measles virus and rhabdoviruses have been engineered for expression of surface protein genes and antigens. Administration of replicon RNA vectors has resulted in strong immune responses and generation of neutralizing antibodies in various animal models. Immunization of mice, chicken, pigs and primates with virus-like particles, naked RNA or layered DNA/RNA plasmids has provided protection against challenges with lethal doses of infectious agents and administered tumor cells. Both prophylactic and therapeutic efficacy has been achieved in cancer immunotherapy. Moreover, recombinant particles and replicon RNAs have been encapsulated by liposomes to improve delivery and targeting. Replicon RNA vectors have also been subjected to clinical trials. Overall, immunization with self-replicating RNA viruses provides high transient expression levels of antigens resulting in generation of neutralizing antibody responses and protection against lethal challenges under safe conditions. Accordingly, the PFBPs disclosed herein can complexed or polyplexed with one or more RNA-based replicons for use as vaccines. Sequences for RNA-based replicons for use of vaccines are known in the art and are publicly accessible and viewable via GenBank.

It should be further understood, that the PFBPs described herein can be used in vitro to effectively deliver/transfect cells with nucleic acids. Thus, the PFBPs can be used in any biological or diagnostic assay that may require a step of transfecting a cell with a nucleic acid.

For use in the therapeutic or biological applications described herein, kits and articles of manufacture are also described herein. Such kits can comprise a carrier, package, or container that is compartmentalized to receive one or more containers such as vials, tubes, and the like, each of the container(s) comprising one of the separate elements to be used in a method described herein. Suitable containers include, for example, bottles, vials, syringes, and test tubes. The containers can be formed from a variety of materials such as glass or plastic.

For example, the container(s) can comprise one or more PFBPs described herein, optionally in a composition or in combination with another agent (e.g., mRNA and/or ssRNA) as disclosed herein. The container(s) optionally have a sterile access port (for example the container can be an intravenous solution bag or a vial having a stopper pierceable by a hypodermic injection needle). Such kits optionally comprise an identifying description or label or instructions relating to its use in the methods described herein.

A kit will typically comprise one or more additional containers, each with one or more of various materials (such as reagents, optionally in concentrated form, and/or devices) desirable from a commercial and user standpoint for use of a compound described herein. Non-limiting examples of such materials include, but are not limited to, buffers, diluents, filters, needles, syringes; carrier, package, container, vial and/or tube labels listing contents and/or instructions for use, and package inserts with instructions for use. A set of instructions will also typically be included.

A label can be on or associated with the container. A label can be on a container when letters, numbers or other characters forming the label are attached, molded or etched into the container itself, a label can be associated with a container when it is present within a receptacle or carrier that also holds the container, e.g., as a package insert. A label can be used to indicate that the contents are to be used for a specific therapeutic application. The label can also indicate directions for use of the contents, such as in the methods described herein. These other therapeutic agents may be used, for example, in the amounts indicated in the Physicians' Desk Reference (PDR) or as otherwise determined by one of ordinary skill in the art.

The disclosure further provides that the methods and compositions described herein can be further defined by the following aspects (aspects 1 to 34):

1. A peptide-functionalized biodegradable polymer (PFBP) that is biocompatible and can form a complex or polyplex with nucleic acids and releasing the nucleic acids within a cell,
   wherein the PFBP comprises short linear peptides, preferably cell penetrating peptides (CPPs), and/or comprises branched peptide dendrons that are functionalized on the outer layer with short linear peptide, preferably CPPs; and
   wherein the peptides or CPPs are either attached directly to the linear polymer via a covalent bond or attached indirectly to the linear polymer via a branched peptide dendron which is covalently attached to the linear polymer.

2. The PFBP of aspect 1, wherein the linear polymer further comprises a polyoxyalkylene polymer, preferably PEG or TEG, and/or a fatty acid,
   wherein the polyoxyalkylene polymer and/or a fatty acid may be directly attached to the linear polymer via a covalent bond or indirectly attached to the linear polymer via a branched peptide dendron which is covalently attached to the linear polymer, and wherein the branched peptide dendron comprises one or more a short linear CPP.

3. The PFBP of aspect 1 or aspect 2, wherein each CPP or dendron is attached to a different point along the length of the linear polymer and wherein no dendron is attached to more than one point on the polymer.
4. The PFBP of any one of aspects 1 to 3, wherein the linear polymer comprises a linear polymer backbone chain that comprises one or more disulfide bonds (i.e., R-S-S-R).
5. The PFBP of any one of aspects 1 to 4, wherein the linear polymer comprises dicysteine monomers.
6. The PFBP of any one of aspects 1 to 5, wherein the linear polymer is an L-lysine—dicysteine based peptide monomer.
7. The PFBP of any one of aspects 1 to 6, wherein the dendrons and/or peptides or CPPs are attached to the linear polymer by a disulfide bond.
8. The PFBP of any one of aspects 1 to 7, wherein the PFBP comprises the structure of Formula I:

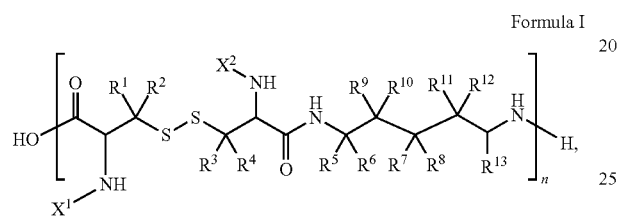

Formula I wherein,
n is an integer greater than 5;
$R^1$-$R^{12}$ are independently selected from the group consisting of H, optionally substituted ($C_1$-$C_6$)-alkyl, optionally substituted ($C_1$-$C_6$)-heteroalkyl, optionally substituted ($C_1$-$C_6$)-alkenyl, optionally substituted ($C_1$-$C_6$)-heteroalkenyl, optionally substituted ($C_1$-$C_6$)-alkynyl, optionally substituted ($C_1$-$C_6$)-heteroalkynyl, optionally substituted ($C_3$-$C_{12}$)cycloalkyl, optionally substituted ($C_4$-$C_{12}$)cycloalkenyl, optionally substituted aryl, optionally substituted heterocycle, halide, hydroxyl, carbonyl, aldehyde, carboxyl, ester, alkoxy, carboxamide, amine, imine, azide, cyano, nitro, nitroso, thiol, sulfide, sulfoxide, sulfone, and phosphate, preferably where the groups that are indicated as being optionally substituted are substituted with halides, hydroxyls, and/or amines;
$R^{13}$ is an ester;
$X^1$-$X^2$ are independently selected from a short linear CPP, a polyoxyalkylene polymer, a fatty acid, or a branched peptide dendron functionalized with one or more short linear CPPs, wherein the branched peptide dendron may further be functionalized with a fatty acid and/or a polyoxyalkylene polymer,
and wherein at least one of $X^1$ and $X^2$ is a short linear CPP, or a branched peptide dendron functionalized with one or more short linear CPPs.
9. The PFBP of any one of aspects 1 to 8, wherein the PFBP comprises the structure of Formula I(a):

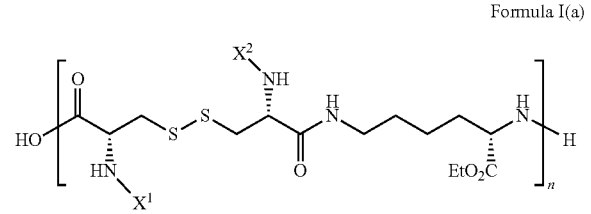

Formula I(a)

wherein,
n is an integer greater than 10;
$X^1$-$X^2$ are independently selected from a short linear CPP, a polyoxyalkylene polymer, a fatty acid, or a branched peptide dendron functionalized with one or more short linear CPPs, wherein the branched peptide dendron may further be functionalized with a fatty acid and/or a polyoxyalkylene polymer,
and wherein at least one of $X^1$ and $X^2$ is a short linear CPP, or a branched peptide dendron functionalized with one or more short linear CPPs.
10. The PFBP of aspect 9, wherein $X^1$ and $X^2$ are short linear CPPs.
11. The PFBP of any one of aspects 1 to 10, wherein the branched peptide dendron comprises the structure of Formula II:

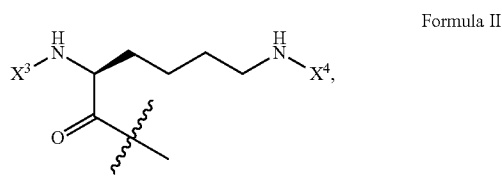

Formula II wherein,
$X^3$ and $X^4$ are independently selected from a short linear CPP, a fatty acid, or a polyoxyalkylene polymer, wherein at least one of $X^3$ and $X^4$ is a short linear CPP.
12. The PFBP of aspect 11, wherein $X^3$ and $X^4$ are short linear CPPs.
13. The PFBP of any one of aspects 1 to 12, wherein the branched peptide dendron comprises the structure of Formula III:

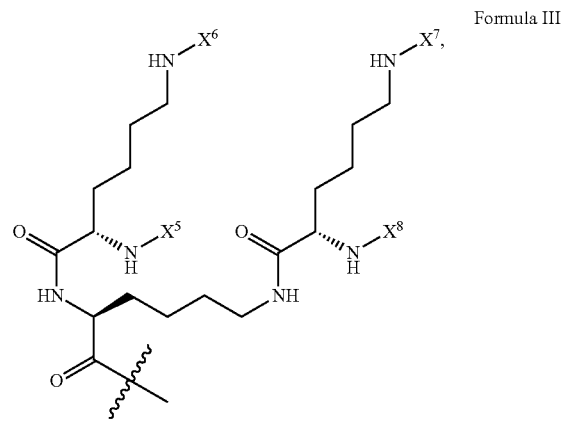

Formula III wherein,
$X^5$-$X^8$ are independently selected from a short linear CPP, a fatty acid, or a polyoxyalkylene polymer, wherein at least one of $X^5$-$X^8$ is a short linear CPP.
14. The PFBP of any one of aspects 1 to 13, wherein the polyoxyalkylene polymer is tetraethylene glycol.
15. The PFBP of any one of aspects 1 to 14, wherein the fatty acid is selected from caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, a-linolenic acid, arachidonic acid, eicosapentaenoic acid, erucic acid, and docosahexaenoic acid.

16. The PFBP of any one of aspects 1 to 15, wherein the fatty acid is oleic acid or stearic acid.

17. The PFBP of any one of aspects 1 to 16, wherein the short linear CPP has a sequence selected from SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, SEQ ID NO:33, SEQ ID NO:34, SEQ ID NO:35, SEQ ID NO:36, SEQ ID NO:37, SEQ ID NO:38, SEQ ID NO:39, SEQ ID NO:40, SEQ ID NO:41, SEQ ID NO:42, SEQ ID NO:43, SEQ ID NO:44, SEQ ID NO:45, SEQ ID NO:46, SEQ ID NO:47, SEQ ID NO:48, SEQ ID NO:49, SEQ ID NO:50, SEQ ID NO:51, SEQ ID NO:52, SEQ ID NO:53, SEQ ID NO:54, and SEQ ID NO:55.

18. The PFBP of any one of aspects 1 to 17, wherein the short linear CPP has the sequence of SEQ ID NO:21.

19. The PFBP of any one of aspects 1 to 18, wherein the PFBP further comprises complexed or polyplexed nucleic acids.

20. The PFBP of aspect 19, wherein the nucleic acids are RNA.

21. The PFBP of aspect 20, wherein the RNA is siRNA.

22. The PFBP of aspect 20, wherein the RNA is ssRNA and/or mRNA.

23. The PFBP of aspect 22, wherein the mRNA and/or ssRNA comprises at least 100 ribonucleotides.

24. The PFBP of aspect 23, wherein the mRNA and/or ssRNAs comprise from 100 to 20,000 ribonucleotides.

25. The PFBP of aspect 20, wherein the RNA is an RNA-based replicon.

26. The PFBP of aspect 25, wherein the RNA-based replicon is an RNA-based replicon vaccine.

27. The PFBP of aspect 20, wherein the molar ratio of protonated amines of the PFBP:phosphates of the RNA (N:P) is from 5 to 20.

28. The PFBP of claim 27, wherein the N:P ratio is from 10 to 15.

29. A method for delivering RNA into a cell comprising: contacting a cell with the PFBP of claim 20.

30. The method of aspect 29, wherein the cell is contacted in vitro.

31. The method of aspect 29, wherein the cell is contacted in vivo.

32. The method of aspect 29, wherein the cell is a human cell.

33. A pharmaceutical composition comprising the PFBP of aspect 26 for the vaccination of a subject.

34. The pharmaceutical composition of aspect 33, wherein the subject is a human subject.

The following examples are intended to illustrate but not limit the disclosure. While they are typical of those that might be used, other procedures known to those skilled in the art may alternatively be used.

EXAMPLES

Materials. All commercially available chemicals were used without further purification unless otherwise noted. Protected amino acids were purchased from Advanced ChemTech (Loiusville, Ky.) and Aroz Technologies, LLC. (Cincinnati, Ohio). Coupling reagents were purchased from GL Biochem Ltd. (Shanghai, China). All siRNA used in the disclosure was purchased from Thermofischer Life technologies with Silencer® Select negative control siRNA and Silencer® Select Custom siRNA used for gel assays, DLS measurements, and transfection studies. The sequences for the anti-Luc siRNA are: 5'-AGACUAUAAGAUU-CAAUCUTT-3' (sense) (SEQ ID NO:56) and 5'-AGAUUGAAUCUUAUAGUCUTG-3' (anti-sense) (SEQ ID NO:57). FLuc mRNA (5 meC, Ψ), Cyanine 5 FLuc mRNA (5 meC, Ψ), and Cyanine 5 EGFP mRNA (5 meC, Ψ) were obtained from TriLink Biotechnologies (Sorrento Mesa, Calif.). Lipofectamine RNAiMAX and Lipofectamine MessengerMAX were purchased from Invitrogen (Carlsbad, Calif.) and used as a positive control following the manufacturer's protocol. Pierce™ LDH Cytotoxicity Assay Kit was purchased from ThermoFisher (San Jose, Calif.). All reactions were performed using HPLC grade solvents unless otherwise noted. All water used in biological experiments was nanopure water obtained from Barnstead Nanopure Diamond (Waltham, Mass.). Unmodified NIH 3T3 cells were a generous gift from Professor Young Jik Kwon (Department of Chemical Engineering, UC Irvine, Calif.). Firefly luciferase-expressing HEK cells were generously provided by Professor Jennifer Prescher (Department of Chemistry, UC Irvine, Calif.). Dulbecco's modified Eagle's medium (DMEM), fetal bovine serum (FBS), and OptiMEM were purchased from Invitrogen (Carlsbad, Calif.).

Instruments. Nuclear Magnetic Resonance (NMR) spectra were recorded on 500 MHz or 600 MHz Bruker spectrometers. Chemical shifts were reported in ppm. Coupling constants (J values) were reported in Hertz. $^1$H NMR chemical shifts were referenced to $D_2O$ ($\delta$=4.79 ppm). The molecular weight and molecular weight distribution of the Denpol backbone was measured by gel permeation chromatography (GPC). GPC was performed on an Agilent 1100 SEC system using an OHpak SB-803 HQ column from Shodex. The molecular weight was determined with respect to poly(ethylene glycol) (PEG) S3 standards purchased from Aldrich. DMF with 0.1% LiBr (wt/v) was used as the eluent at a flow rate of 1.0 mL/min with column temperature at 45° C. The size and zeta potential of denpol/mRNA polyplexes were measured at 633 nm using Zetasizer (NanoZS) dynamic light scattering instrument (Malvern Instruments, Malvern, UK) at 25° C. with detection angle of 173°. Confocal images were obtained using a Zeiss LSM 700 (Carl Zeiss AG, Oberkochen, Germany). Flow cytometry was performed on a BD ACCURI C6 flow cytometer (BD Biosciences, San Jose). Peptide synthesis was performed on a Protein Technologies PS3 synthesizer.

PFBP Synthesis and Characterization

SCHEME 1A-B. Synthetic schemes for making polymer backbones for the PFBPs: (A) G0, G1 and G2 polymer backbones; and (B) G0-X TEG and G1-X TEG polymer backbones. Amounts of TEG are specified in the procedures.

SCHEME 2A-C. Synthetic schemes for making the PFBPs: (A) G0-100LP 6, G1-100LP 7, and G2-100LP 8 PFBPs; (B) G0-X TEG-Y LP9 and G1-X TEG-Y LP10 PFBPs; and (C) G0-X SA-Y LP11 and G1-X SA or OA-Y LP12 PFBPs. Amounts of TEG, SA, OA, and linear peptide functionalization are specified in the procedures:

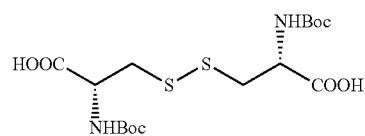 + 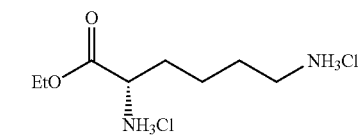 →
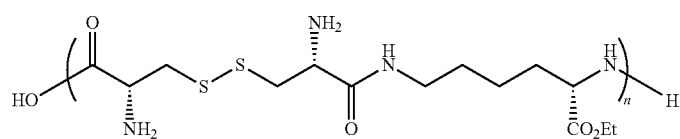
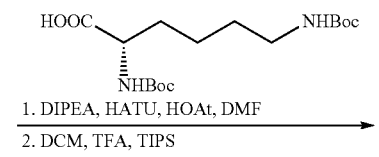
G0 Polymer Backbone 1
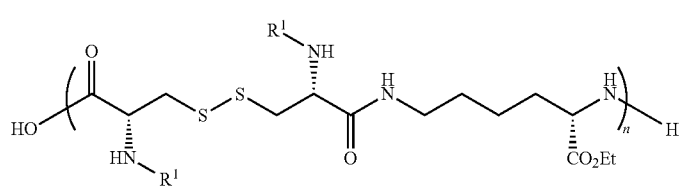
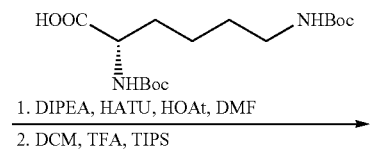
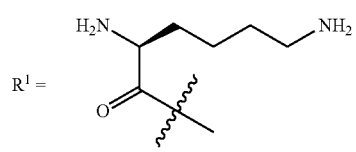
G1 Polymer Backbone 2
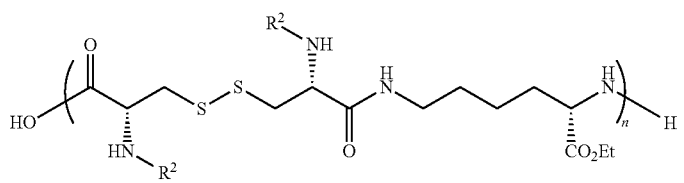
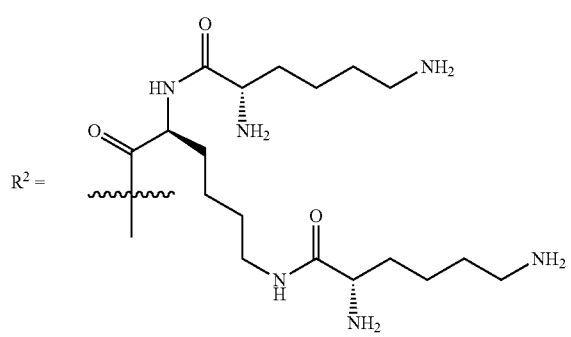
G2 Polymer Backbone 3

SCHEME 1B
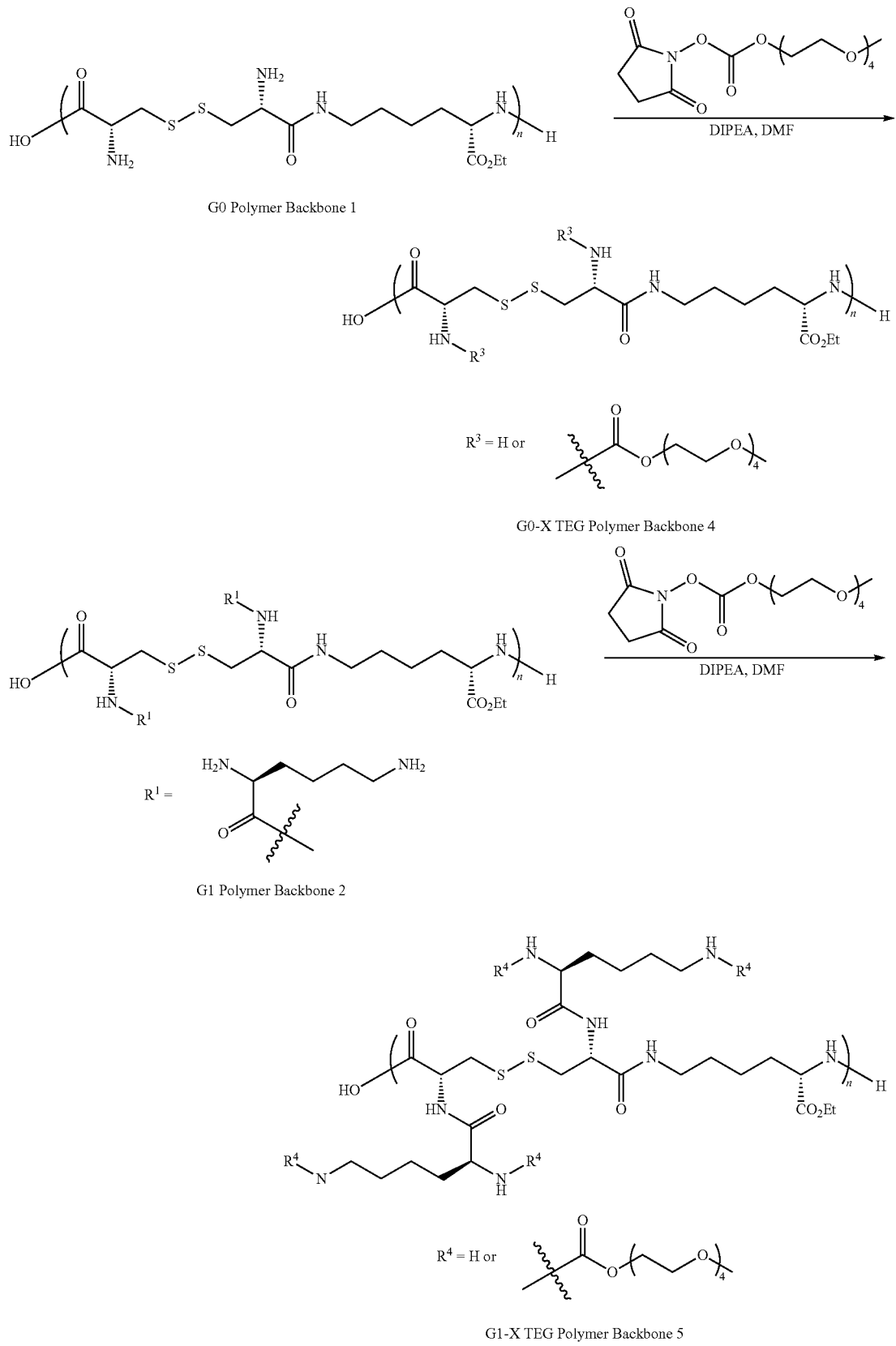

SCHEME 2A
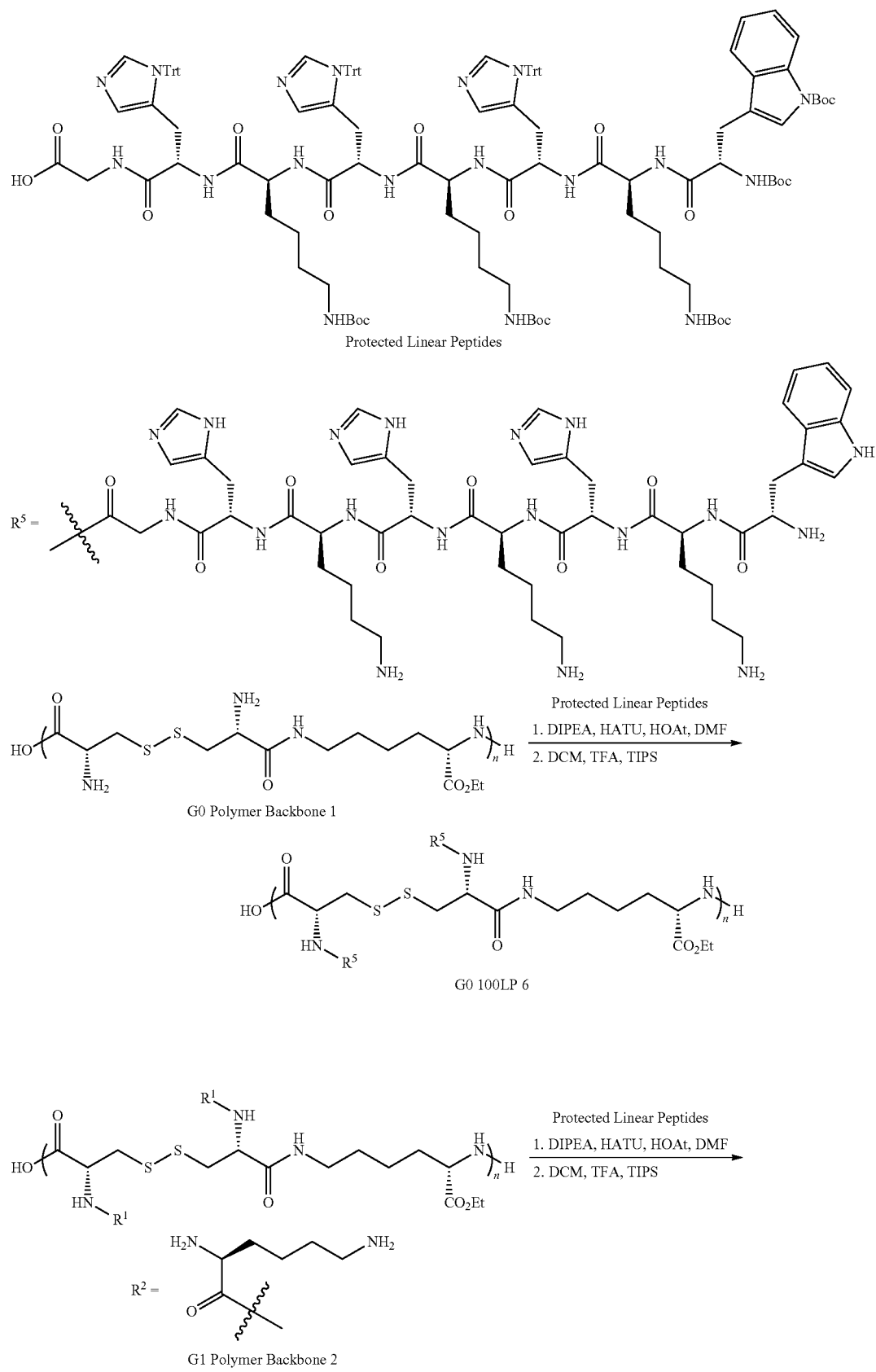

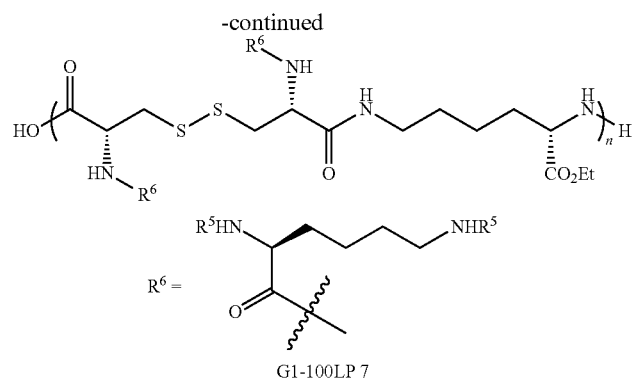
G1-100LP 7
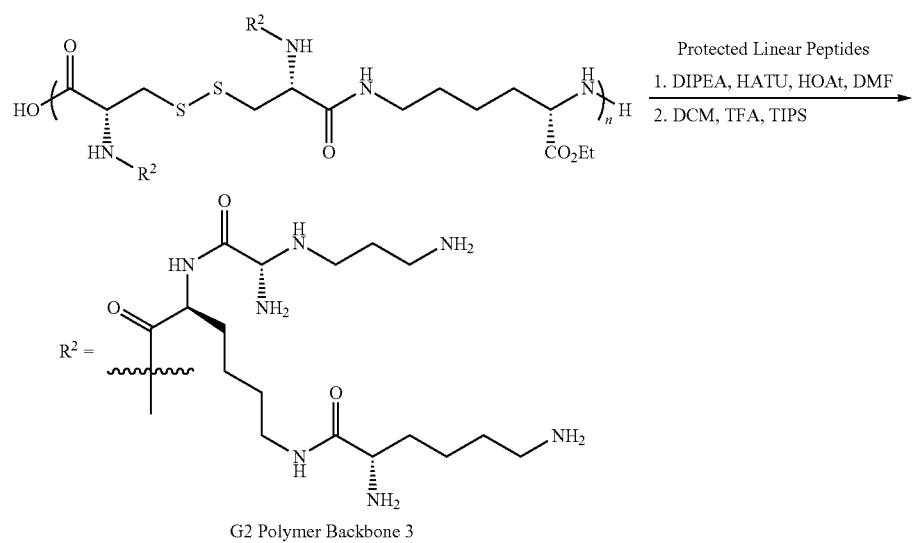
G2 Polymer Backbone 3
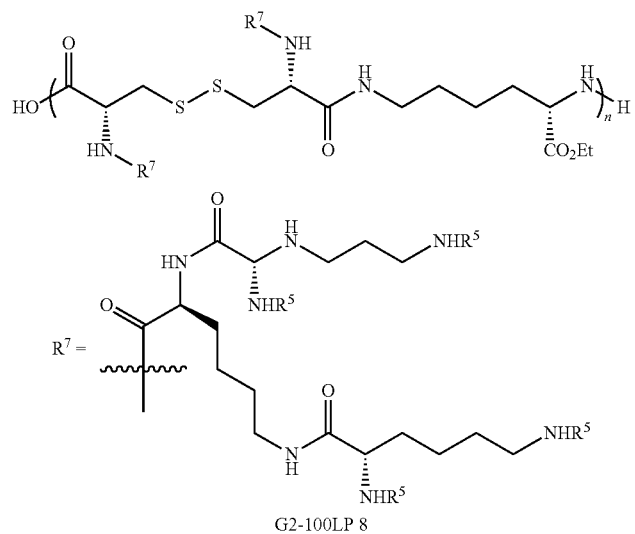
G2-100LP 8

SCHEME 2B
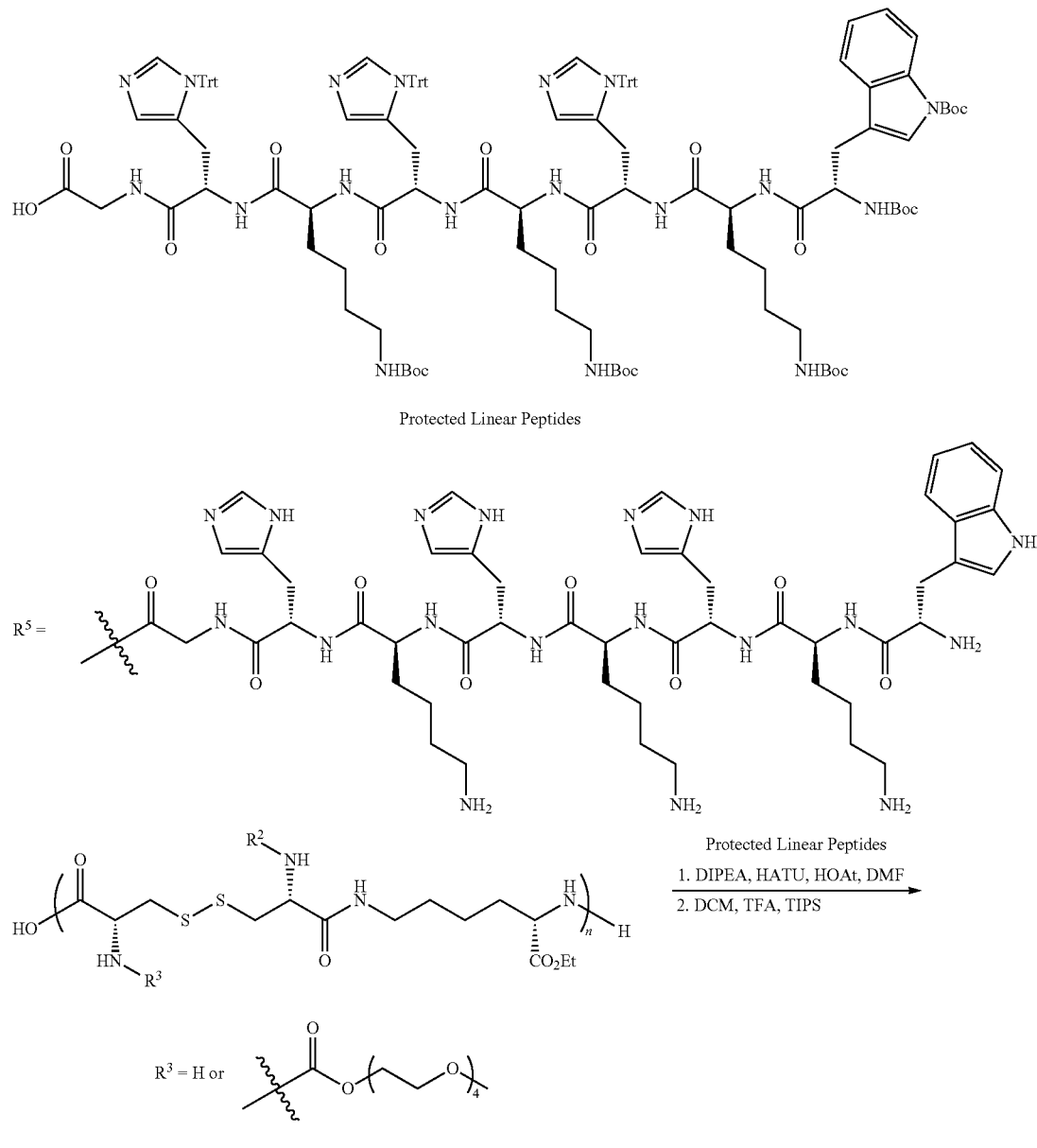
Protected Linear Peptides
G0 X TEG Polymer Backbone 4
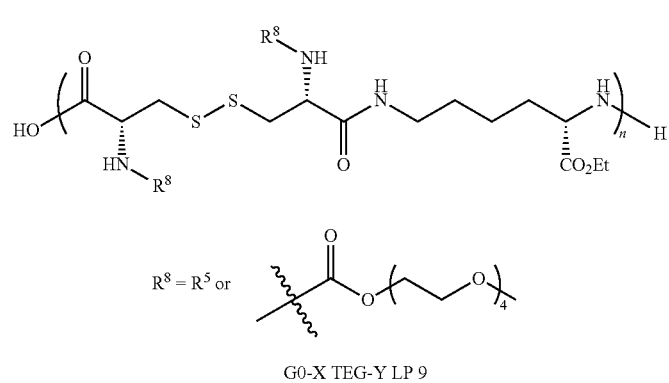
G0-X TEG-Y LP 9

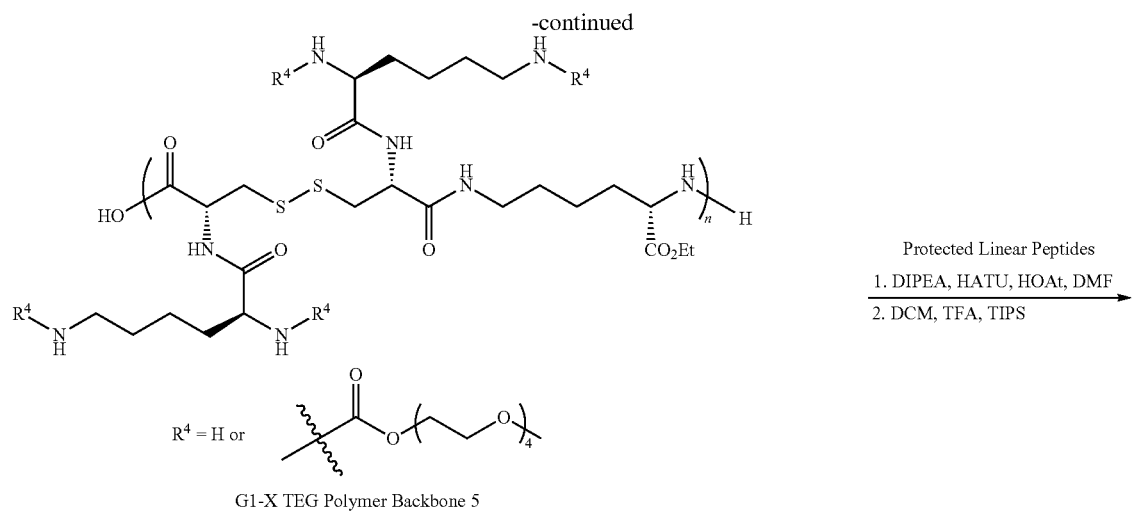
G1-X TEG Polymer Backbone 5
Protected Linear Peptides
1. DIPEA, HATU, HOAt, DMF
2. DCM, TFA, TIPS
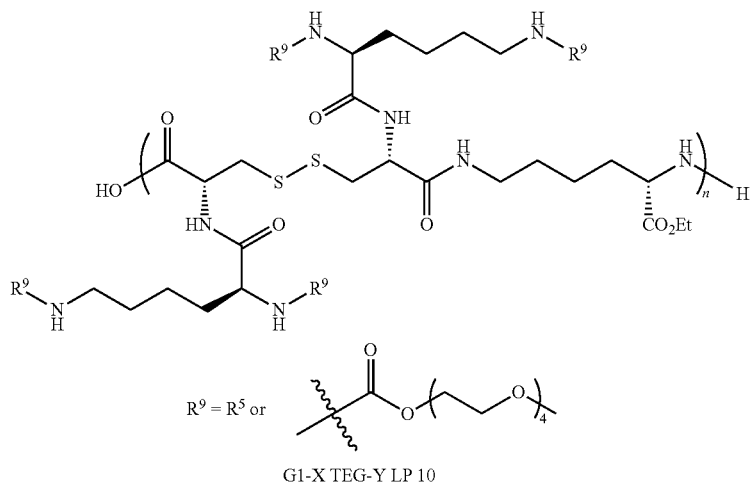
G1-X TEG-Y LP 10
SCHEME 2C
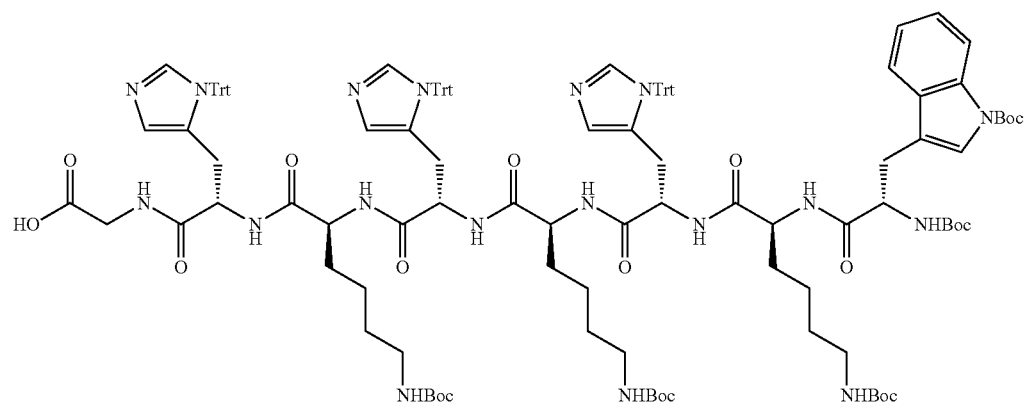
Protected Linear Peptides $R^5 =$ 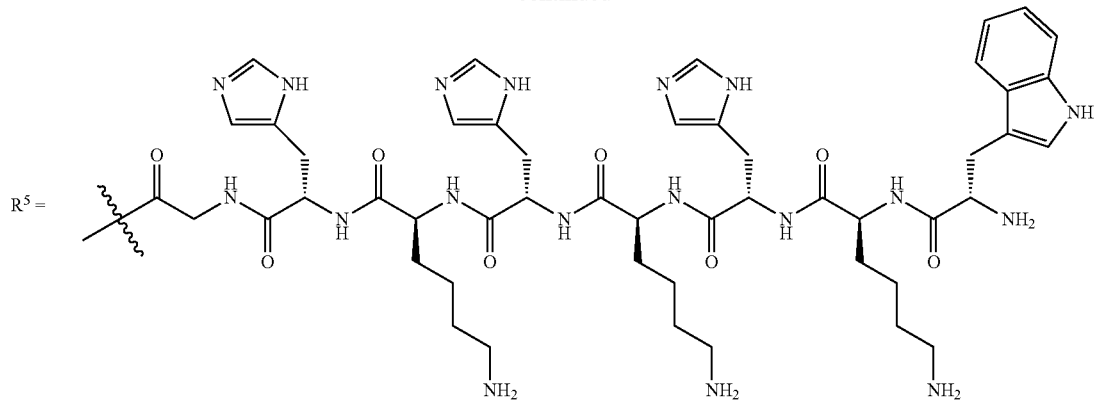
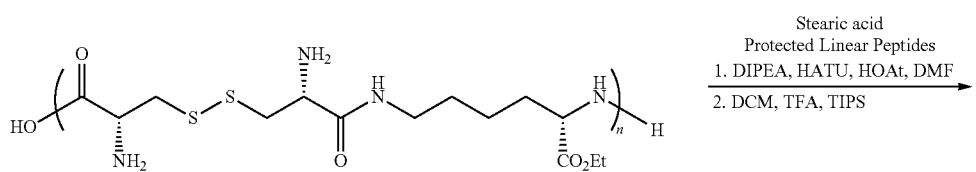
G0 Polymer Backbone 1
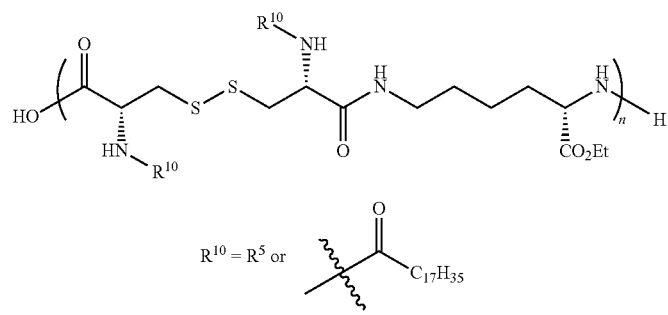
$R^{10} = R^5$ or ⸺C(O)C$_{17}$H$_{35}$
G0-X SA-YLP 11
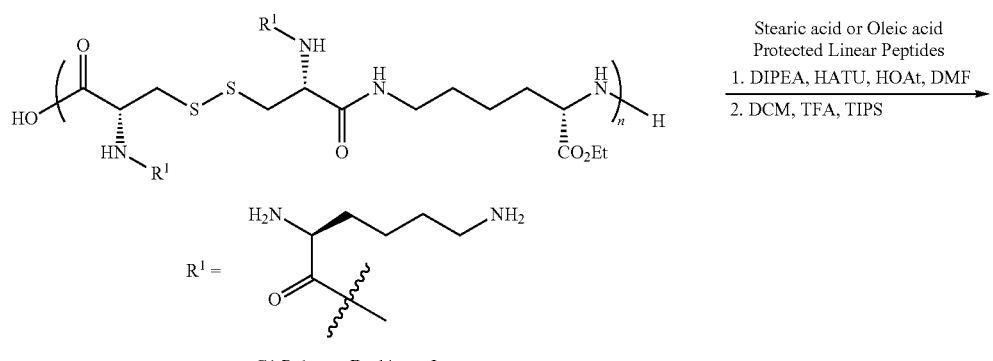
G1 Polymer Backbone 2

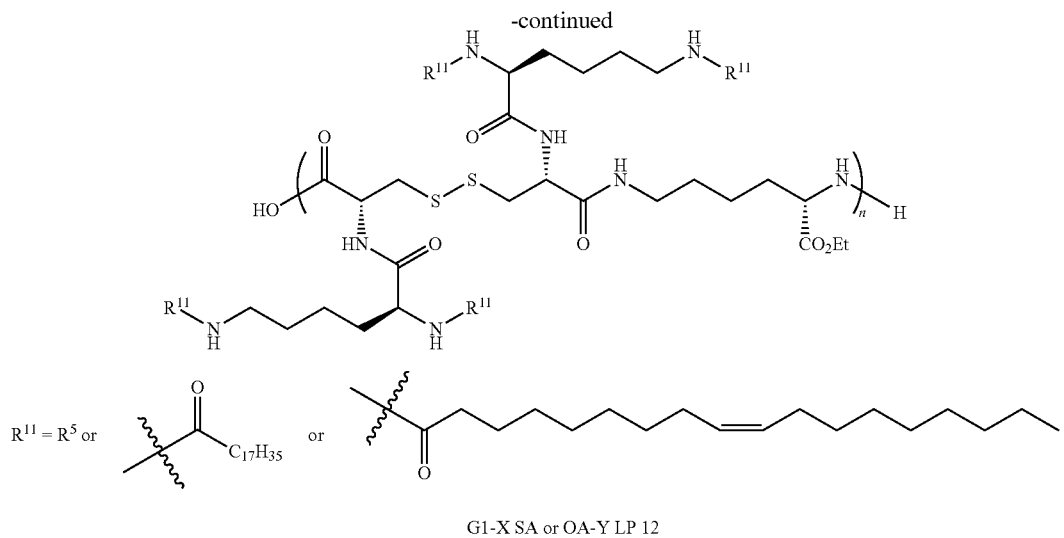

G1-X SA or OA-Y LP 12

Figure 3:
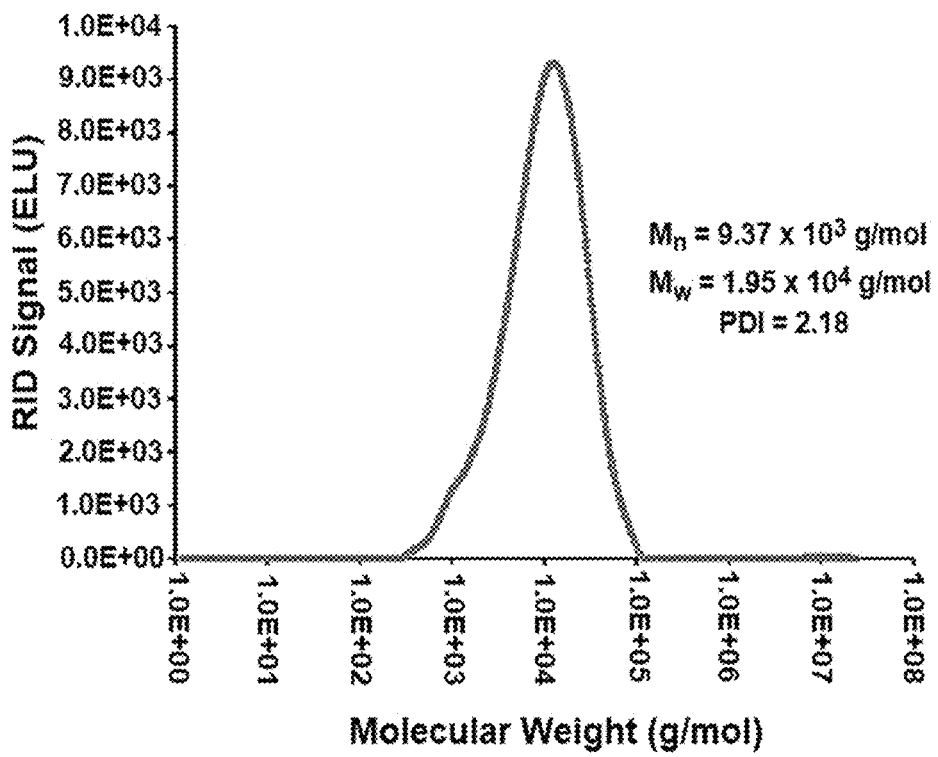
FIG. 3 provides for the characterization of deprotected G0 polymer backbone 1 by analytical GPC with 0.1% LiBr in DMF as the eluent and poly(ethylene glycol) (PEG) standards being used as the reference. A 3 second relaxation time was used in the $^1$HNMR of the polymer samples to ensure chain relaxation and to help with resolution. Methanol and water were unable to be completely removed from the polymer samples. The integration ratios of $^1$H NMR peaks were determined based on each repeating unit of the polymers. The integration of some peaks was not totally accurate due to the overlapping between sample signals and solvent signals.
Figure 4:
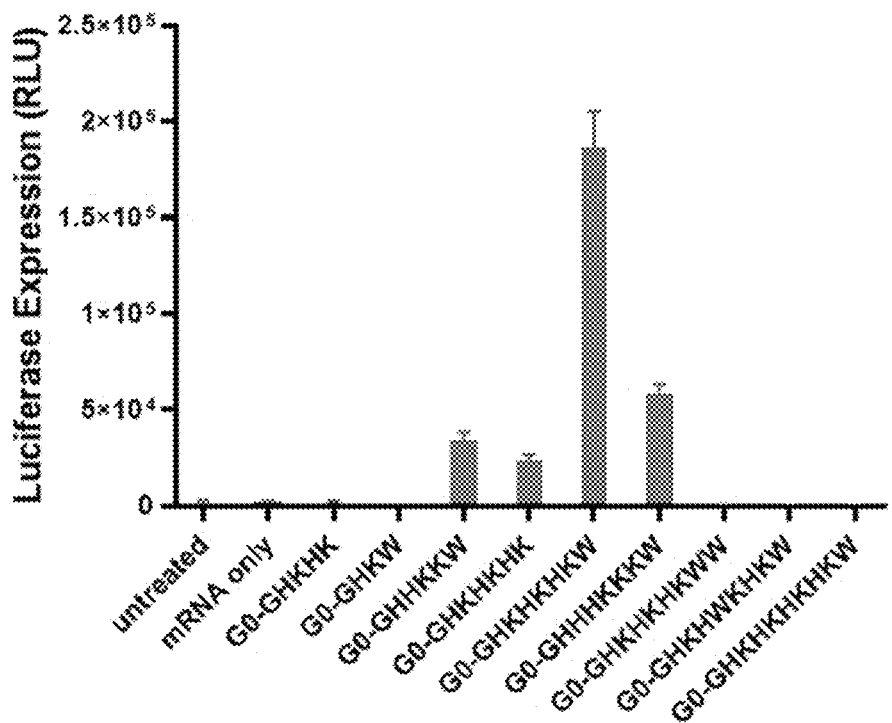
FIG. 4 demonstrates Fluc mRNA delivery with a series of G0-PFBPs functionalized by different cell penetrating peptides in NIH 3T3 cells. (N/P=10, 150 ng mRNA per well).

G0 polymer backbone 1, G1 polymer backbone 2, G2 polymer backbone 3, and NHS-TEG-OMe were prepared as described herein. The functionalization percentage X and Y were determined based on the total amount of primary amines on different polymers. All yields given refer to isolated yields. The deprotected G0 polymer backbone 1 was characterized by analytical GPC with 0.1% LiBr in DMF as the eluent and poly(ethylene glycol) (PEG) standards being used as the reference (e.g., see FIG. 3).

Typical procedure for the synthesis of G0-X TEG polymer backbone 4: In a 25 mL round bottom flask equipped with a stir bar, DIPEA (2.0 equiv.) was added to a G0 polymer backbone 1 (1.0 equiv.) dissolved in 5 mL of anhydrous DMF. The reaction was cooled to 0° C. and NHS-TEG-OMe was added in the corresponding amount to give a functionalization ratio X: 0.4 equiv. for 20%, and 1.0 equiv. for 50%. After 30 minutes, the ice bath was removed and the reaction mixture was stirred under nitrogen at room temperature for overnight. After removal of the solvent in vacuo, the residue was dissolved in MeOH and purified via dialysis (MWCO=6-8 kD) against MeOH for 12 h. MeOH was then removed in vacuo to afford G0-X TEG polymer backbone 4 as a colorless oil.

G0-20TEG polymer backbone (70% isolated yield): $^1$H NMR (600 MHz, D$_2$O, 298 K, ppm): δ 4.43-4.16 (m, 6 H), 3.78-3.63 (m, 6 H), 3.39 (s, 1 H), 3.29-3.02 (m, 6 H), 1.90-1.41 (m, 6 H), 1.29-1.27 (m, 3 H).

G0-50TEG polymer backbone (65% isolated yield): $^1$H NMR (600 MHz, D$_2$O, 298 K, ppm): δ 4.54-4.22 (m, 7 H), 3.77-3.63 (m, 14 H), 3.39 (s, 3 H), 3.22-3.02 (m, 6 H), 1.90-1.40 (m, 6 H), 1.29-1.26 (m, 3 H).

Typical procedure for synthesis of G1-X TEG polymer backbone 5: In a 25 mL round bottom flask equipped with a stir bar, DIPEA (4.0 equiv.) was added to a G1 polymer backbone 2 (1.0 equiv.) dissolved in 5 mL of anhydrous DMF. The reaction was cooled to 0° C. and the NHS-TEG-OMe was added in the corresponding amount to give a functionalization ratio X: 0.8 equiv. for 20% and 2.0 equiv. for 50%. After 30 minutes, the ice bath was removed and the reaction mixture was stirred under nitrogen at room temperature overnight. After removal of the solvent under reduced pressure, the residue was dissolved in MeOH and purified via dialysis (MWCO=6-8 kD) against MeOH for 12 h. Then MeOH was removed in vacuo to give G1-X TEG polymer backbone 5 as a colorless oil.

G1-20TEG polymer backbone (70% isolated yield): $^1$H NMR (600 MHz, D$_2$O, 298 K, ppm): δ 4.64-4.03 (m, 9 H), 3.76-3.63 (m, 11 H), 3.39 (s, 2.4 H), 3.21-3.00 (m, 10 H), 1.92-1.34 (m, 18 H), 1.27 (m, 3 H).

G1-50TEG polymer backbone (68% isolated yield): $^1$H NMR (600 MHz, D$_2$O, 298 K, ppm): δ 4.66-4.06 (m, 11 H), 3.76-3.63 (m, 28 H), 3.39 (s, 6 H), 3.20-3.02 (m, 10 H), 2.01-1.39 (m, 18 H), 1.27 (m, 3 H).

Protected linear peptide (GHKHKHKW) (SEQ ID NO:21) 2-chlorotrityl chloride resin was first loaded with Fmoc-Gly-OH at the loading density of 0.484 mmol/g. Following the sequence of HKHKHKW, Gly-loaded resin (400 mg, 1.0 equiv., 0.194 mmol) was coupled with 3 different side-chain protected amino acids on a PS3 solid-phase peptide synthesizer. For each coupling step, one amino acid was added for reaction: Fmoc-His(Trt)-OH (601 mg, 5.0 equiv., 0.97 mmol), Fmoc-Lys(Boc)-OH (455 mg, 5.0 equiv., 0.97 mmol), or Boc-Trp(Boc)-OH (392 mg, 5.0 equiv., 0.97 mmol). HATU (332 mg, 4.5 equiv., 0.873 mmol) was utilized as a coupling reagent and HOAt (119 mg, 4.5 equiv., 0.873 mmol) was included to suppress possible epimerization. 20% collidine in DMF was used in the coupling reaction and 20% piperidine in DMF was used to deprotect the Fmoc group. After the synthesis was finished, the protected linear peptide was cleaved from the resin by using 20% hexafluoroisopropanol in anhydrous CH$_2$Cl$_2$. After removal of the solvent under reduced pressure, the residue was obtained as a white solid to give 350 mg (79%) of protected linear peptide (GHKHKHKW) (SEQ ID NO:21). The synthesized linear peptide was directly utilized in the next coupling reactions without further purification. MALDI-TOF MS m/z: 2284.2156 [M+H]$^+$.

G0-100LP 6: In a 20 mL scintillation vial, G0 polymer backbone 1 (5.0 mg, 0.016 mmol), protected linear peptide (56 mg, 0.024 mmol), HATU (12.5 mg, 0.032 mmol) and HOAt (4.5 mg, 0.032 mmol) were dissolved in 2 mL anhydrous DMF. After DIPEA (14 µL, 0.08 mmol) was added, the yellow colored reaction mixture was left to stir at ambient temperature for overnight. The reaction mixture was then precipitated by pouring the reaction solution into water. After centrifugation, the water was removed and the polymer was dissolved in a mixture of TFA (3.0 mL), CH$_2$Cl$_2$ (1.5 mL), anisole (1.5 mL) and TIPS (0.2 mL). The deprotection reaction mixture was stirred at ambient temperature for 6 h under nitrogen. After removal of the solvents in vacuo, the residue was dissolved in MeOH and then precipitated in diethyl ether. After centrifugation, the supernatant was discarded and the white precipitate was dissolved in MeOH and purified via dialysis (MWCO=6-8 kD) against MeOH for 24 h. Then MeOH was removed in vacuo to give 44 mg (82%) of G0-100LP 6 (TFA salt) as a white solid. $^1$H NMR (600 MHz, D$_2$O, 298 K, ppm): δ 8.63-8.58 (m, 6 H), 7.54-7.50 (m, 4 H), 7.30-7.13 (m, 12 H), 4.59-4.02 (m, 21 H), 3.80-3.74 (m, 2 H), 3.23-3.14 (m, 17 H), 3.06-2.94 (m, 17 H), 1.83-1.24 (m, 45 H).

G1-100LP 7: In a 20 mL scintillation vial, G1 polymer backbone 2 (10.0 mg, 9.17×10$^{-3}$ mmol), protected linear peptide (126 mg, 0.055 mmol), HATU (20.9 mg, 0.055 mmol) and HOAt (7.5 mg, 0.055 mmol) was dissolved in 2.5 mL anhydrous DMF. After DIPEA (34 µL, 0.19 mmol) was added, the reaction mixture was left to stir at ambient temperature for overnight. The reaction mixture was then precipitated by adding the reaction solution into water. After centrifugation, the water was removed and the polymer was dissolved in a mixture of TFA (3.0 mL), CH$_2$Cl$_2$ (1.5 mL), anisole (1.5 mL) and TIPS (0.2 mL). The deprotection reaction mixture was stirred at room temperature for 6 h under nitrogen. After removal of the solvents in vacuo, the residue was dissolved in MeOH and then precipitated in diethyl ether. After centrifugation, the supernatant was discarded and the white precipitate was dissolved in MeOH and purified via dialysis (MWCO=6-8 kD) against MeOH for 24 h. MeOH was then removed in vacuo to afford 47 mg (78%) of G1-100LP 7 (TFA salt) as a white solid. $^1$H NMR (600 MHz, D$_2$O, 298 K, ppm): δ 8.56-8.41 (m, 12 H), 7.52-7.05 (m, 32 H), 4.33-3.72 (m, 43 H), 3.40-2.94 (m, 66 H), 1.96-1.17 (m, 93 H).

G2-100LP 8: In a 20 mL scintillation vial, G2 polymer backbone 3 (10.0 mg, 4.85×10$^{-3}$ mmol), protected linear peptide (124 mg, 0.054 mmol), HATU (20.0 mg, 0.052 mmol) and HOAt (7.1 mg, 0.052 mmol) were dissolved in 2.5 mL anhydrous DMF. After DIPEA (14 µL, 0.08 mmol) was added, the reaction mixture was left to stir at ambient temperature for overnight. The reaction mixture was then precipitated by adding the reaction solution into water. After centrifugation, the water was removed and the polymer was dissolved in a mixture of TFA (3.0 mL), CH$_2$Cl$_2$ (1.5 mL), anisole (1.5 mL) and TIPS (0.2 mL). The deprotection reaction mixture was stirred at ambient temperature for 6 h under nitrogen. After removal of the solvents in vacuo, the residue was dissolved in MeOH and then precipitated in diethyl ether. After centrifugation, the supernatant was discarded and the white precipitate was dissolved in MeOH and purified via dialysis (MWCO=6-8 kD) against MeOH for 24 h. MeOH was then removed in vacuo to give 39 mg (61%) of G2-100LP 8 (TFA salt) as a white solid. $^1$H NMR (600 MHz, D$_2$O, 298 K, ppm): δ 8.57-8.43 (m, 24 H), 7.53-7.06 (m, 64 H), 4.33-3.65 (m, 83 H), 3.24-2.94 (m, 130 H), 1.72-1.26 (m, 189 H).

Typical procedure for synthesis of G0-X TEG-YLP9: In a 20 mL scintillation vial, G0-X TEG polymer backbone 4 (1.0 equiv.), protected linear peptide (quantity determined by the functionalization ratio Y, 1.6 equiv. for 80% and 1.0 equiv. for 50%), HATU (1.6 equiv. for 80% and 1.0 equiv. for 50%) and HOAt (1.6 equiv. for 80% and 1.0 equiv. for 50%) were dissolved in 2 mL anhydrous DMF. After DIPEA (3.2 equiv. for 80% and 2.0 equiv. for 50%) was added, the yellow reaction mixture was left to stir at ambient temperature for overnight. The reaction mixture was then precipitated by adding the reaction solution into water. After centrifugation, the water was removed and the polymer was dissolved in a mixture of TFA (3.0 mL), CH$_2$Cl$_2$ (1.5 mL), anisole (1.5 mL) and TIPS (0.2 mL). The deprotection reaction mixture was stirred at ambient temperature for 6 h under nitrogen. After removal of the solvents under in vacuo, the residue was dissolved in MeOH and then precipitated in diethyl ether. After centrifugation, the supernatant was discarded and the white precipitate was dissolved in MeOH and purified via dialysis (MWCO=6-8 kD) against MeOH for 24 h. Then MeOH was removed in vacuo to give G0-X TEG-Y LP 9 (TFA salt) as a white solid.

G0-20TEG-80LP (75% isolated yield): $^1$H NMR (600 MHz, D$_2$O, 298 K, ppm): δ 8.58-8.39 (m, 5 H), 7.55-7.06 (m, 13 H), 4.68-4.61 (m, 2 H), 4.35-3.99 (m, 11 H), 3.83-3.59 (m, 6 H), 3.41-2.96 (m, 30 H), 1.75-1.17 (m, 38 H).

G0-50TEG-50LP (71% isolated yield): $^1$H NMR (600 MHz, D$_2$O, 298 K, ppm): δ 8.46-8.12 (m, 3 H), 7.54-7.06 (m, 8 H), 4.64-3.98 (m, 20 H), 3.73-3.59 (m, 13 H), 3.20-2.94 (m, 23 H), 1.72-1.21 (m, 27 H).

Typical procedure for synthesis of G1-XTEG-YLP 10: In a 20 mL scintillation vial, G1-X TEG polymer backbone 5 (1.0 equiv.), protected linear peptide (quantity determined by the functionalization ratio Y, 3.2 equiv. for 80% and 2.0 equiv. for 50%), HATU (3.2 equiv. for 80% and 2.0 equiv. for 50%) and HOAt (3.2 equiv. for 80% and 2.0 equiv. for 50%) was dissolved in 2 mL anhydrous DMF. After DIPEA (6.4 equiv. for 80% and 4.0 equiv. for 50%) was added, the yellow reaction mixture was left to stir at ambient temperature for overnight. The reaction mixture was then precipitated by pouring the reaction solution into water. After centrifugation, the water was removed and the polymer was dissolved in a mixture of TFA (3.0 mL), CH$_2$Cl$_2$ (1.5 mL), anisole (1.5 mL) and TIPS (0.2 mL). The deprotection reaction mixture was stirred at room temperature for 6 h under nitrogen. After removal of the solvents in vacuo, the residue was dissolved in MeOH and then precipitated in diethyl ether. After centrifugation, the supernatant was discarded and the white precipitate was dissolved in MeOH and purified via dialysis (MWCO=6-8 kD) against MeOH for 24 h. Then MeOH was removed in vacuo to give G1-X TEG-Y LP 10 (TFA salt) as a white solid.

G1-20TEG-80LP (72% isolated yield): $^1$H NMR (600 MHz, D$_2$O, 298 K, ppm): δ 8.54-8.24 (m, 10 H), 7.53-7.06 (m, 26 H), 4.66-4.60 (m, 2 H), 4.33-4.13 (m, 22 H), 4.01-3.64 (m, 24 H), 3.40-2.94 (m, 57 H), 1.86-1.20 (m, 73 H).

G1-50TEG-50LP (68% isolated yield): $^1$H NMR (600 MHz, D$_2$O, 298 K, ppm): δ 8.52-8.28 (m, 6 H), 7.54-7.05 (m, 16 H), 4.67-4.60 (m, 1 H), 4.33-3.86 (m, 17 H), 3.74-3.59 (m, 34 H), 3.41-2.95 (m, 40 H), 1.74-1.23 (m, 60 H).

G0-50TEG-G1 backbone: In a 20 mL scintillation vial, G0-50 TEG polymer backbone (50.0 mg, 0.08 mmol), Boc-Lys(Boc)-OH.DCHA (56.0 mg, 0.11 mmol), HATU (40.0 mg, 0.11 mmol) and HOAt (14.4 mg, 0.11 mmol) were dissolved in 5 mL anhydrous DMF. After DIPEA (43 µL) the mixture was left to stir at ambient temperature for overnight. DMF was then removed in vacuo and the residue was re-dissolved in MeOH. The mixture was purified via dialysis (MWCO=6-8 kD) against MeOH for 12 h. After removal of the solvents in vacuo, the polymer was dissolved in a mixture of TFA (3.0 mL), CH$_2$Cl$_2$ (1.5 mL), anisole (1.5 mL) and TIPS (0.2 mL). The deprotection reaction mixture was stirred at ambient temperature for 6 h under nitrogen. Then the solvents were removed in vacuo and the residue was dissolved in MeOH again. The mixture was purified via dialysis (MWCO=6-8 kD) against MeOH for 24 h. MeOH was then removed in vacuo to afford 45 mg (74%) of G0-50 TEG-G1 backbone (TFA salt) as a colorless oil. $^1$H NMR (600 MHz, D$_2$O, 298 K, ppm): δ 4.65f-4.06 (m, 8 H), 3.77-3.63 (m, 14 H), 3.39 (s, 3 H), 3.22-3.02 (m, 8 H), 1.93-1.73 (m, 6 H), 1.55-1.39 (m, 6 H), 1.27 (m, 3 H).

G0-50TEG-G1 LP: In a 20 mL scintillation vial, G0-50 TEG-G1 backbone (5.0 mg, 6.75×10$^{-3}$ mmol), protected linear peptide (37.0 mg, 0.016 mmol), HATU (6.0 mg, 0.016 mmol) and HOAt (2.0 mg, 0.016 mmol) were dissolved in 2 mL anhydrous DMF. After DIPEA (8.0 μL, 0.046 mmol) was added, the yellow reaction mixture was left to stir at ambient temperature overnight. The reaction mixture was then precipitated by pouring the reaction solution into water. After centrifugation, the water was removed and the polymer was dissolved in a mixture of TFA (3.0 mL), CH$_2$Cl$_2$ (1.5 mL), anisole (1.5 mL) and TIPS (0.2 mL). The deprotection reaction mixture was stirred at ambient temperature for 6 h under nitrogen. After removal of the solvents in vacuo, the residue was dissolved in MeOH and then precipitated in diethyl ether. After centrifugation, the supernatant was discarded and the white precipitate was dissolved in MeOH and purified via dialysis (MWCO=6-8 kD) against MeOH for 24 h. Then MeOH was removed in vacuo to give 16 mg (62%) of G0-50TEG-G1 LP (TFA salt) as a white solid. $^1$H NMR (600 MHz, D$_2$O, 298 K, ppm): δ 8.54-8.09 (m, 6 H), 7.54-7.04 (m, 16 H), 4.66-4.15 (m, 26 H), 3.92-3.65 (m, 14 H), 3.35-2.94 (m, 39 H), 1.73-1.22 (m, 51 H).

Typical procedure for synthesis of G0-X SA-Y LP 11: In a 20 mL scintillation vial, G0 polymer backbone 1 (1.0 equiv.), stearic acid (quantity determined by the functionalization ratio X, 0.4 equiv. for 20% and 1.0 equiv. for 50%), protected linear peptide (quantity determined by the functionalization ratio Y, 1.6 equiv. for 80% and 1.0 equiv. for 50%), HATU (2.0 equiv.) and HOAt (2.0 equiv.) were dissolved in 2 mL anhydrous DMF. After DIPEA (4.0 equiv.) was added, the yellow reaction mixture was left to stir at ambient temperature for overnight. The reaction mixture was then precipitated by adding the reaction solution into water. After centrifugation, the water was removed and the polymer was dissolved in a mixture of TFA (3.0 mL), CH$_2$Cl$_2$ (1.5 mL), anisole (1.5 mL) and TIPS (0.2 mL). The deprotection reaction mixture was stirred at ambient temperature for 6 h under nitrogen. After removal of the solvents under reduced pressure, the residue was dissolved in MeOH and then precipitated in diethyl ether. After centrifugation, the supernatant was discarded and the white precipitate was dissolved in MeOH and purified via dialysis (MWCO=6-8 kD) against MeOH for 24 h. MeOH was then removed in vacuo to afford G0-X SA-Y LP 11 (TFA salt) as a white solid.

G0-20SA-80LP (63% isolated yield): $^1$H NMR (600 MHz, D$_2$O, 298 K, ppm): δ 8.49-8.14 (m, 5 H), 7.55-7.06 (m, 13 H), 4.66-4.58 (m, 3 H), 4.32-3.98 (m, 10 H), 3.81-3.71 (m, 2 H), 3.41-2.94 (m, 29 H), 2.03-1.23 (m, 50 H).

G0-50SA-50LP (52% isolated yield): $^1$H NMR (600 MHz, D$_2$O, 298 K, ppm): δ 8.44-8.00 (m, 3 H), 7.55-7.01 (m, 8 H), 4.66-4.57 (m, 2 H), 4.35-3.96 (m, 8 H), 3.81-3.69 (m, 1 H), 3.39-2.94 (m, 20 H), 2.04-1.23 (m, 40 H).

Typical procedure for synthesis of G1-X SA/OA-Y LP 12: In a 20 mL scintillation vial, G1 polymer backbone 2 (1.0 equiv.), stearic acid or oleic acid (quantity determined by the functionalization ratio X, 0.8 equiv. for 20% and 2.0 equiv. for 50%), protected linear peptide (quantity determined by the functionalization ratio Y, 3.2 equiv. for 80% and 2.0 equiv. for 50%), HATU (4.0 equiv.) and HOAt (4.0 equiv.) were dissolved in 2 mL anhydrous DMF. After DIPEA (8.0 equiv.) was added, the yellow reaction mixture was left to stir at ambient temperature for overnight. The reaction mixture was then precipitated by pouring the reaction solution into water. After centrifugation, the water was removed and the polymer was dissolved in a mixture of TFA (3.0 mL), CH$_2$Cl$_2$ (1.5 mL), anisole (1.5 mL) and TIPS (0.2 mL). The deprotection reaction mixture was stirred at ambient temperature for 6 h under nitrogen. After removal of the solvents in vacuo, the residue was dissolved in MeOH and then precipitated in diethyl ether. After centrifugation, the supernatant was discarded and the white precipitate was dissolved in MeOH and purified via dialysis (MWCO=6-8 kD) against MeOH for 24 h. MeOH was then removed in vacuo to give G1-X SA-Y LP 12 (TFA salt) as a white solid.

G1-20SA-80LP (64% isolated yield): $^1$H NMR (600 MHz, D$_2$O, 298 K, ppm): δ 8.51-8.04 (m, 10 H), 7.55-7.01 (m, 26 H), 4.66-4.54 (m, 6 H), 4.33-4.25 (m, 28 H), 3.81-3.66 (m, 2 H), 3.40-2.95 (m, 55 H), 1.93-1.27 (m, 104 H).

G1-200A-80LP (60% isolated yield): $^1$H NMR (600 MHz, D$_2$O, 298 K, ppm): δ 8.54-8.10 (m, 10 H), 7.54-7.05 (m, 26 H), 5.24 (s, 1 H), 4.66-4.56 (m, 5 H), 4.33-4.25 (m, 26 H), 4.06-3.68 (m, 5 H), 3.40-2.94 (m, 55 H), 1.88-1.17 (m, 95 H).

PFBP/RNA Binding Study

Figure 5:
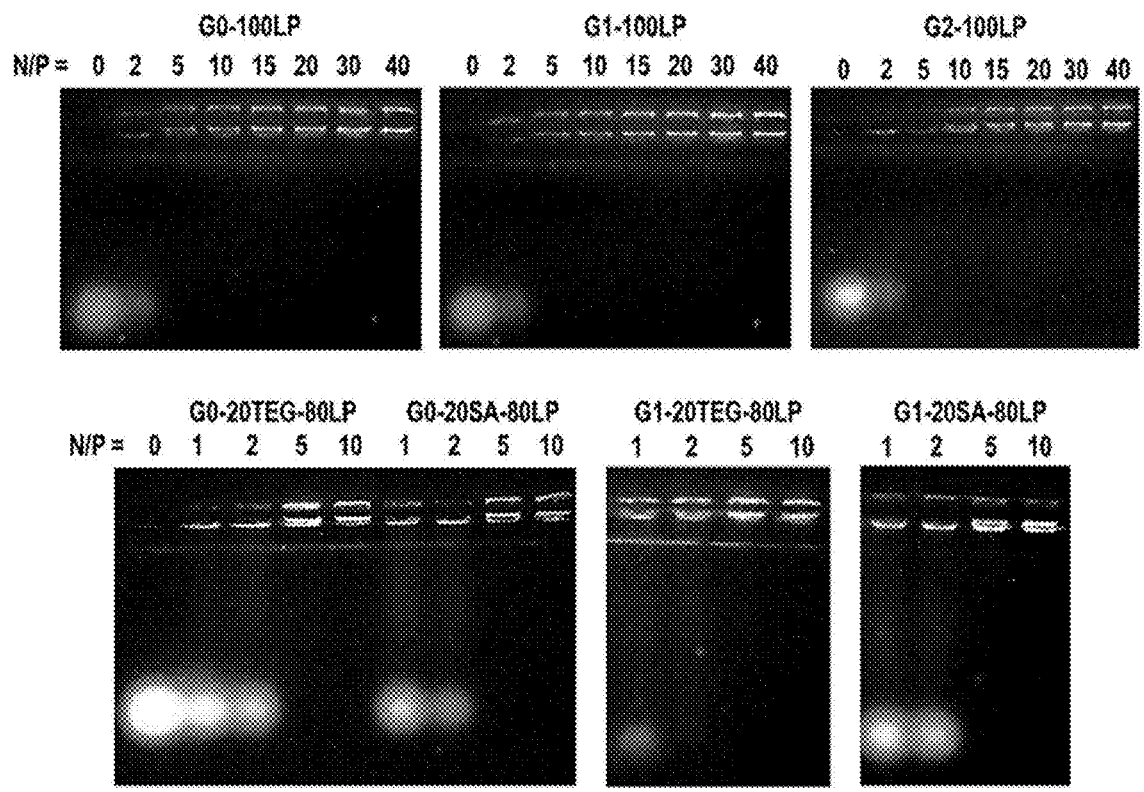
FIG. 5 presents a gel electrophoresis study of PFBP/siRNA complexation. All PFBPs surveyed bound siRNA by N/P=5.
Figure 6:
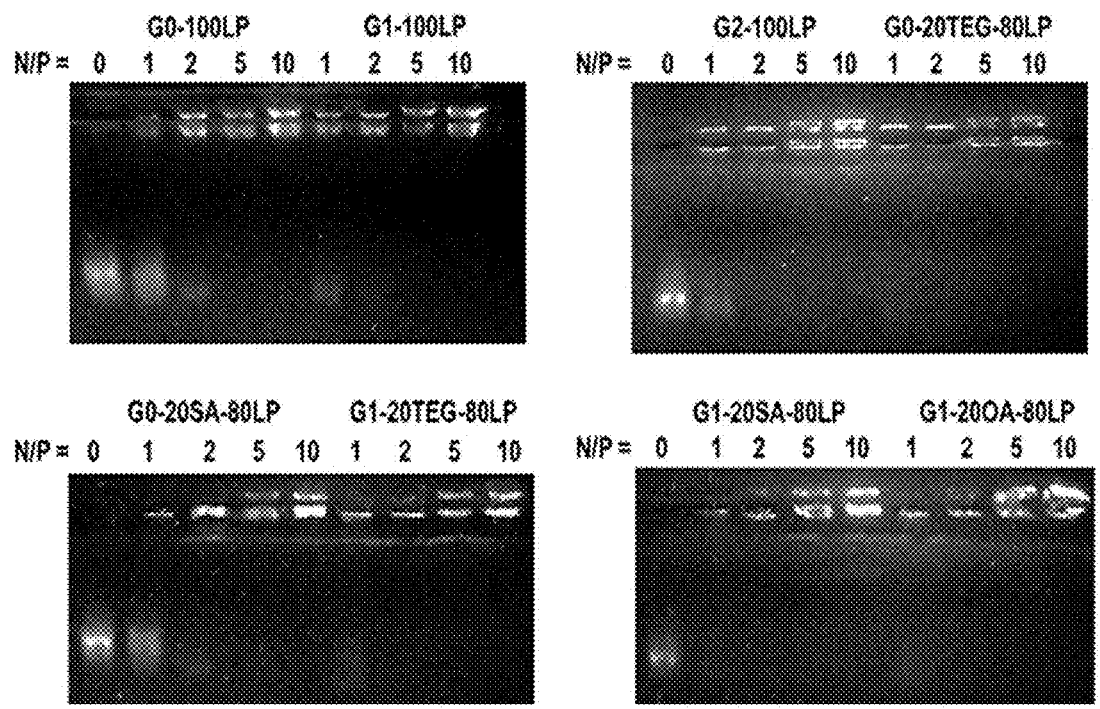
FIG. 6 presents a gel electrophoresis study of PFBP/mRNA complexation. All PFBPs surveyed bound mRNA by N/P=5.

Gel electrophoresis: The binding of siRNA or mRNA to PFBPs was studied by agarose gel electrophoresis. Both siRNA/mRNA and PFBPs were diluted with 10 mM of phosphate buffer (pH 7.4). Different amounts of PFBP solutions (10 mg/mL) were added to 5.0 μL of a 5 μM siRNA solution or 1.0 μL of a 0.5 μg/μL mRNA solution to achieve different N/P ratios (the molar ratio of primary amine groups from PFBPs and phosphate groups from siRNA/mRNA, imidazole groups of histidine residues were not counted because they are not protonated at pH 7.4). The same buffer was added to adjust the final volume to 10.0 μL, followed by a 10 min incubation at ambient temperature. 2 μL of a 6× gel loading dye was added to each sample and 10 μof the mixture was loaded to each well in 1% agarose gel with GelRed dye. The electrophoresis was run in TBE buffer (pH 7.9) at 60 V for 90 min and the gel was visualized under a UV transilluminator. Related results are shown in FIG. 5 and FIG. 6.

Figure 7A:
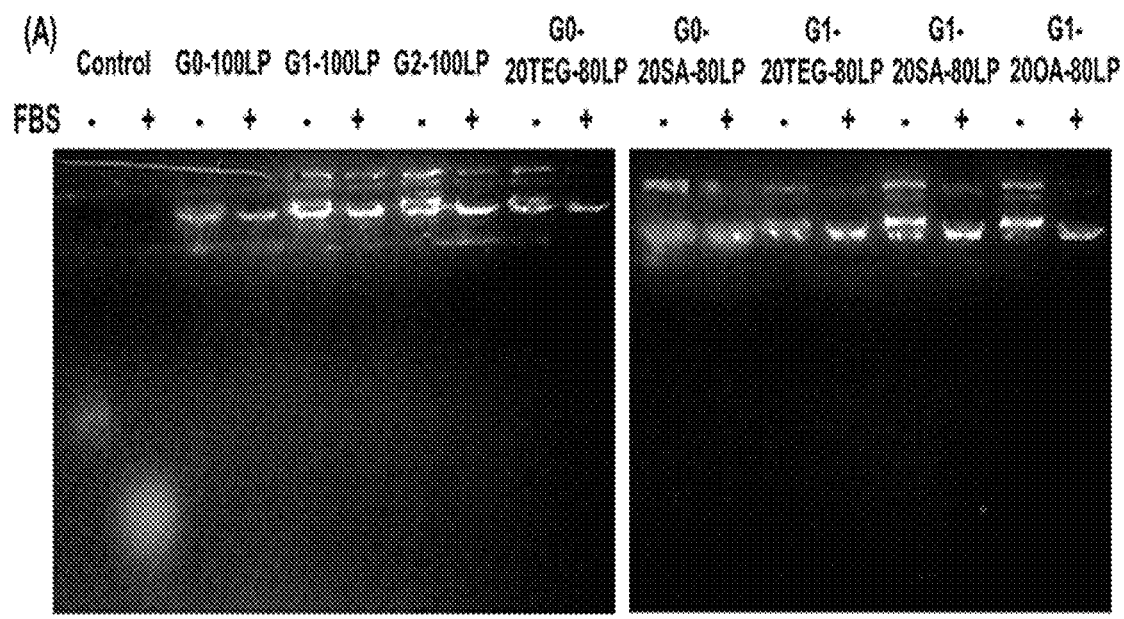
FIG. 7A-B presents a gel electrophoresis study of mRNA protection. (A) Gel binding assays of PFBP/mRNA complexes (N/P=10) with/without FBS incubation. Naked mRNA was fully degraded after FBS incubation, while mRNA in PFBP/mRNA complexes remained bounded and intact after FBS incubation. (B) Dextran sulfate competition (S/P=80) with different PFBP/mRNA complexes (N/P=10) after FBS incubation. The released RNA from PFBP/mRNA complexes was intact, while the blank RNA was fully degraded.
Figure 7B:
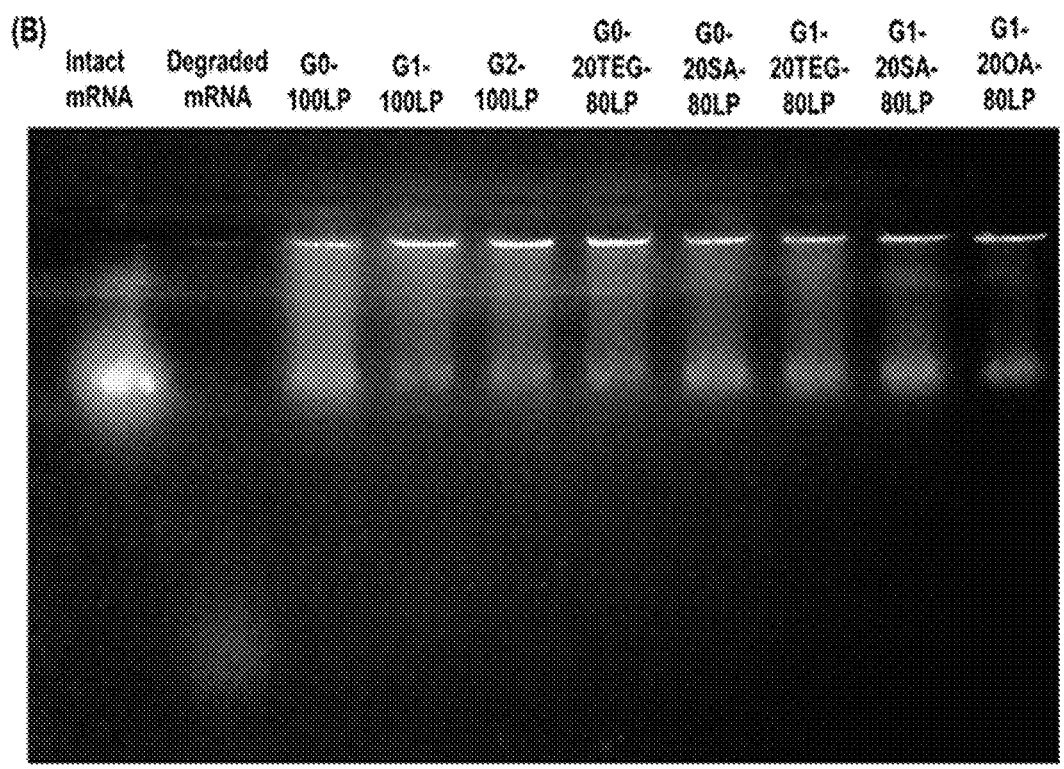

Gel electrophoresis study of mRNA protection: (1) Following the gel electrophoresis protocol mentioned above, different PFBPs were complexed with eGFP mRNA at N/P=10 in duplicate. Two naked mRNA solutions were used as controls. To one copy of each PFBP/mRNA complex solution and naked mRNA solutions, 0.5 μL FBS was added. The solutions were left to stand for 20 minutes at ambient temperature. The other copy of each PFBP/mRNA complex solution and naked mRNA solutions were used as negative controls. All solutions were subjected to agarose gel electrophoresis to examine the integrity of mRNA. As shown in FIG. 7A, naked mRNA was fully degraded into small species after FBS incubation, while no small species were detected from the PFBP/mRNA complex solutions. (2) Following the gel electrophoresis protocol mentioned above, different PFBPs were complexed with eGFP mRNA at N/P=10. FBS (0.5 μL) was added to each complex solution. The solutions were left to stand for 20 minutes at ambient temperature. 7 μL dextran sulfate (0.017 M) solution was added to each complex to achieve S/P=80 (the molar ratio of sulfate groups from DS and phosphate groups from mRNA) and incubated for 5 minutes. The samples were then subjected to agarose gel electrophoresis under the aforementioned condition. As shown in FIG. 7B, naked mRNA was fully degraded into small species after FBS incubation, while the RNA released from RNA-PFBP complexes was still intact.

DLS measurements. The size and zeta potential of PFBP/siRNA or PFBP/mRNA complexes were measured at 633 nm using Zetasizer (NanoZS) dynamic light scattering instrument (Malvern Instruments, Malvern, UK) at 25° C. with a detection angle of 173°. Both PFBP and siRNA/mRNA were diluted in nanopure water, followed by brief vortexing. After 10 min incubation at ambient temperature, a DLS measurement was recorded. The solution was then diluted with 600 ∞L PBS, and a zeta-potential measurement was recorded. At least three measurements were taken for each sample and the mean values were reported.

Biological Studies siRNA transfections: (1) PFBP/siRNA complex preparation. The TFA-salts of the various PFBPs were stored at −20° C. as 10 mg/mL solutions in nanopure water and prior to complexation the PFBPs, along with all buffers, were allowed to come to room temperature. Both negative control and targeted siRNA were diluted to 1.5 µM with nanopure water. The diluted siRNA was further diluted with OptiMEM and complexed with the appropriate amount of PFBP solution required to achieve the desired N/P ratio. The complex solutions were prepared at 5× the desired final concentration (60 nM) and with a final volume of 60 µL. 20 µL of the complex solution with 300 nM siRNA was added to each well containing 80 µL of OptiMEM to give a transfection media with 60 nM siRNA. Lipofectamine RNAiMAX was used as a positive control and prepared as instructed in the product manual.

Transfection in luciferase-expressing HEK-293 cells. Transfections were performed in triplicate in a cell culture treated clear-bottom 96-well plate (Corning). After passaging, the cells were plated in 96-well plates so that they were 40~50% confluent at the time of transfection. The 5×PFBP/siRNA complexes were prepared using the aforementioned protocol. The culture media was switched to 80 µL OptiMEM per well and 20 µL of the complex solution was added to each well. The cells were cultured for 48 hours prior to analysis.

Transfection analysis in luciferase-expressing HEK-293 cells. After 48 hours of incubation post-transfection, the culture media was removed and replaced with 100 µL of a 150 µg/mL solution of firefly D-luciferin in FluoroBrite™ DMEM. Without any further treatment, the cells were incubated at 37° C. for 5 minutes after which they were imaged using an IVIS lumina II camera. The normalized luciferase knockdown was determined by comparing the overall luminescence of the samples treated with complexes containing anti-luc siRNA to those treated with complexes containing negative control siRNA.

mRNA Transfections

PFBP/mRNA complex preparation. Before performing the mRNA transfections, the area was sterilized with bleach and RNAase ZAP (Ambion), and special care was taken to use RNAase free products when handling the mRNA. Lipofectamine MessengerMAX was used as a positive control and prepared as instructed in the product manual. mRNA was thawed and diluted to a concentration of 0.05 µg/µL with OptiMEM. Appropriate amount of PFBP solution was added to achieve the desired N/P ratio and the mixture was mixed by pipetting up and down 10 times. Finally, the mixture was diluted to 60 µL with OptiMEM so that 20 µL of the complex solution will contain 150 ng of mRNA. Then 1 µL of Insulin-Transferrin-Selenium (100×) was added. The mixture was then incubated at ambient temperature for 5 minutes.

Transfection in NIH 3T3 cells and BHK cells. Transfections were performed in triplicate in a cell culture treated clear-bottom 96-well plate (Corning). After passaging, the cells were plated in 96-well plates so that they were 60~70% confluent at the time of transfection. The PFBP/mRNA complex solutions were prepared using the aforementioned protocol. The culture media was switched to 80 µL OptiMEM per well and 20 µL of the complex solution was added to each well. The cells were cultured for 24 hours prior to analysis.

Transfection analysis of Fluc mRNA/Replicon mRNA (expressing Fluc) transfected cells. After 24 hours of incubation post-transfection, the culture media was removed and replaced with 100 µL of a 150 µg/mL solution of firefly D-luciferin in FluoroBrite™ DMEM. Without any further treatment, the cells were incubated at 37° C. for 5 minutes after which they were imaged using an IVIS lumina II camera and the luminescence was determined.

Transfection analysis of eGFP mRNA/Cy-5 labelled mRNA transfected cells and flow cytometry analysis. After 24 hours of incubation post-transfection, the culture media was removed and replaced with 30 µL trypsin and incubated at 37° C. for 5 minutes. 70 µL of complete media was added to the plate and the cells were transferred to a 96 well non-cell treated plate for flow cytometry. Fluorescence of the transfected cells was measured using a Becton-Dickinson LSR II flow cytometer with argon ion excitation laser. 5000 events were recorded per sample, and each value reported is the average of 3 samples.

Figure 15A:
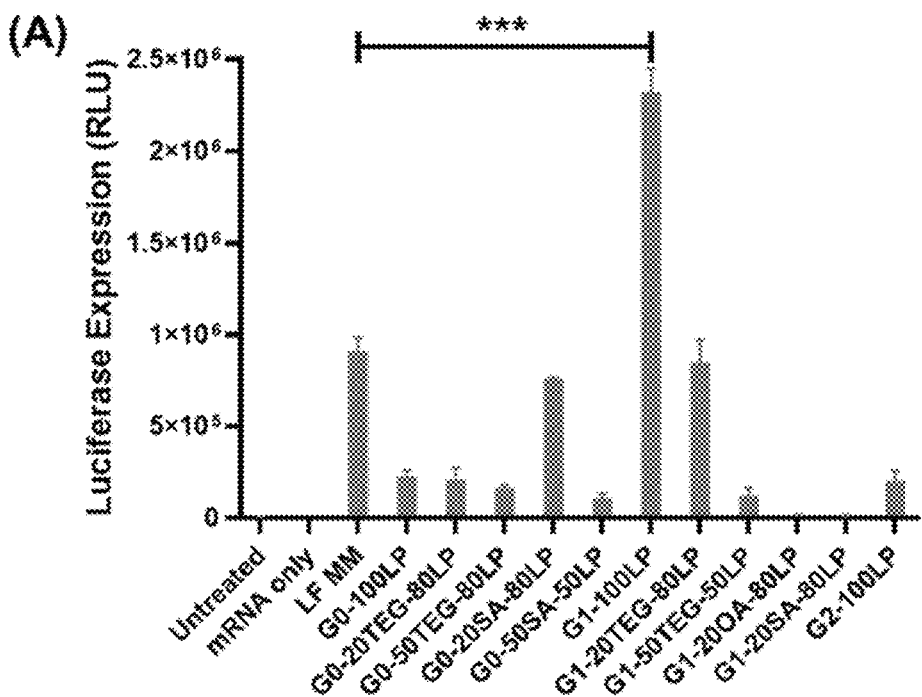
FIG. 15A-B shows mRNA transfection screening of different PFBPs at their optimal N/P ratios (N/P=10 for G0 series of PFBPs and N/P=15 for G1, G2 series of PFBPs) in NIH 3T3 cells. (150 ng mRNA per well) (A) Result summary of Fluc mRNA transfection. For RLU values, ***=P<0.001. (B) Result summary of eGFP mRNA transfection.
Figure 15B:
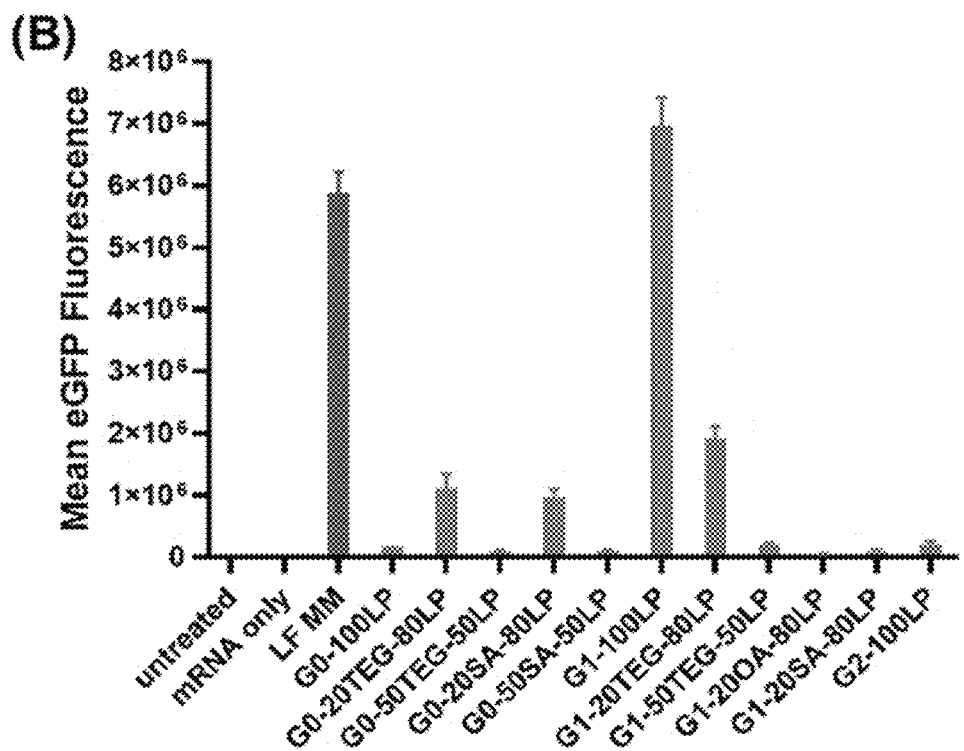

LDH cytotoxicity assay. NIH 3T3 cells were seeded in a 96 well plate treated with PFBP/mRNA complexes at an N/P ratio of 15, formulated as specified above. After 24 h incubation with the nanoparticle complexes, 50 µL of the supernatant was collected and the cytotoxicity was measured using a Pierce™ LDH Cytotoxicity Assay Kit (ThermoFisher) as directed in the manual. Related results are shown in FIG. 15.

Confocal microscopy studies. Confocal laser microscopy was used to track Cy-5 labeled mRNA in the transfected cells. Unmodified NIH 3T3 cells were seeded at a density of 15000 cells/well on an 8-well chamber slide (Lab-Tek, Rochester, N.Y.) 24 h before transfection. Cy-5 labeled mRNA was complexed with different PFBPs at an N/P of 15 and transfected to the cells under the aforementioned conditions. Confocal fluorescence spectroscopy was performed at 4 h post transfection. The nucleus was counter-stained with 1 µg/mL solution of Hoechst 33342. All confocal images were acquired using a Zeiss LSM 700 inverted laser-scanning confocal microscope. A 20× plan apochromatic numerical aperture of 0.8 DIC II objective was used for all experiments. A 639 nm laser and a 606-700 nm band-pass filter were used to obtain the images of Cy-5 labeled mRNA. A 405 nm laser and a 400-498 nm band-pass filter were used to obtain the images of the Hoechst 33342 counter-stained nuclei. The fluorescent images were scanned separately and overlaid together with the differential interference contrast image (DIC). The cells were scanned as a z-stack of two-dimensional images (1024×1024 pixels) and an image cutting approximately through the middle of the cellular height was selected to present the intracellular mRNA localization.

PFBP system and design considerations: For the PFBP system, a biodegradable polypeptide backbone was chosen to ensure the biodegradability and biocompatibility. The PFBP polypeptide backbone comprises an L-lysine-dicysteine peptide polymer. The disulfide linkages of the dicysteine in the polymer backbone are reduced in the cytoplasm, providing a stimuli-responsive intracellular disassembly of RNA-PFBP complexes and subsequent release of RNA cargos in cytosol. The L-lysine in the polymer backbone provides a free amine functional handle to graft CPPs and other functional side-chains to.

Three natural amino-acids were chosen to fabricate the CPP: L-Histidine (His), L-Lysine (Lys), and L-Tryptophan (Trp). Histidine enhances the endosomal escape of the particle through the buffering capacity provided by the pH-responsive nature of the imidazole ring. Lysine units were incorporated to provide free primary amines for sufficient cationic charge to promote RNA complexation. Tryptophan was incorporated to improve RNA binding through intercalation of the indole ring and enhance the cellular uptake. Facile peptide synthesis and polymer functionalization allows us to quickly synthesize and screen several initial PFBPs with different peptide sequences.

Based on the initial mRNA transfection results (FIG. 3), a short CPP, GHKHKHKW (SEQ ID NO:21), was chosen for the following study. Additionally, PFBPs were further functionalized with hydrophilic tetraethylene glycol (TEG) or hydrophobic fatty acids to tune the hydrophilicity and hydrophobicity of the PFBPs. TEG side-chains were incorporated to prevent aggregation and increase buffer stability, whereas fatty acids (stearic acid and oleic acid) were added to promote the self-assembly of RNA- PFBP complexes.

The functional linear peptides were synthesized through conventional solid-phase peptide synthesis and coupled to the polypeptide backbone to afford the final PFBPs (see SCHEME 2). For simplicity, the PFBPs were named using the dendron generation and the functionalization components with their corresponding percentages. For example, G1-20TEG-80LP represents a PFBP with multivalent first-generation dendrons which were functionalized by 20 mol % TEG and 80 mol % linear peptides (LP).

Determining the RNA binding capabilities of the PFBPs: RNA (siRNA or mRNA) was complexed with the PFBPs at various primary amine/RNA phosphate (N/P) molar ratios to determine the ratio at which all free RNA is complexed (see FIG. 5 and FIG. 6). All PFBPs were able to completely bind to both siRNA and mRNA at an N/P of 5.

RNAs, especially long RNAs such as Replicon RNA, are very susceptible to RNases and need to be sufficiently protected for successful delivery. After RNA was complexed with the PFBPs, the nanoparticle complexes were incubated with fetal bovine serum (FBS) for 20 minutes. FBS contains several compounds known to degrade RNA, including RNases. The complexes were then subjugated to gel electrophoresis to determine the integrity of the RNA. The subsequent competitive binding showed that the RNA from RNA-PFBP complexes was intact, while the blank RNA was fully degraded (see FIG. 7). The results demonstrate that the PFBPs protected the large mRNA molecules from RNases.

Figure 8:
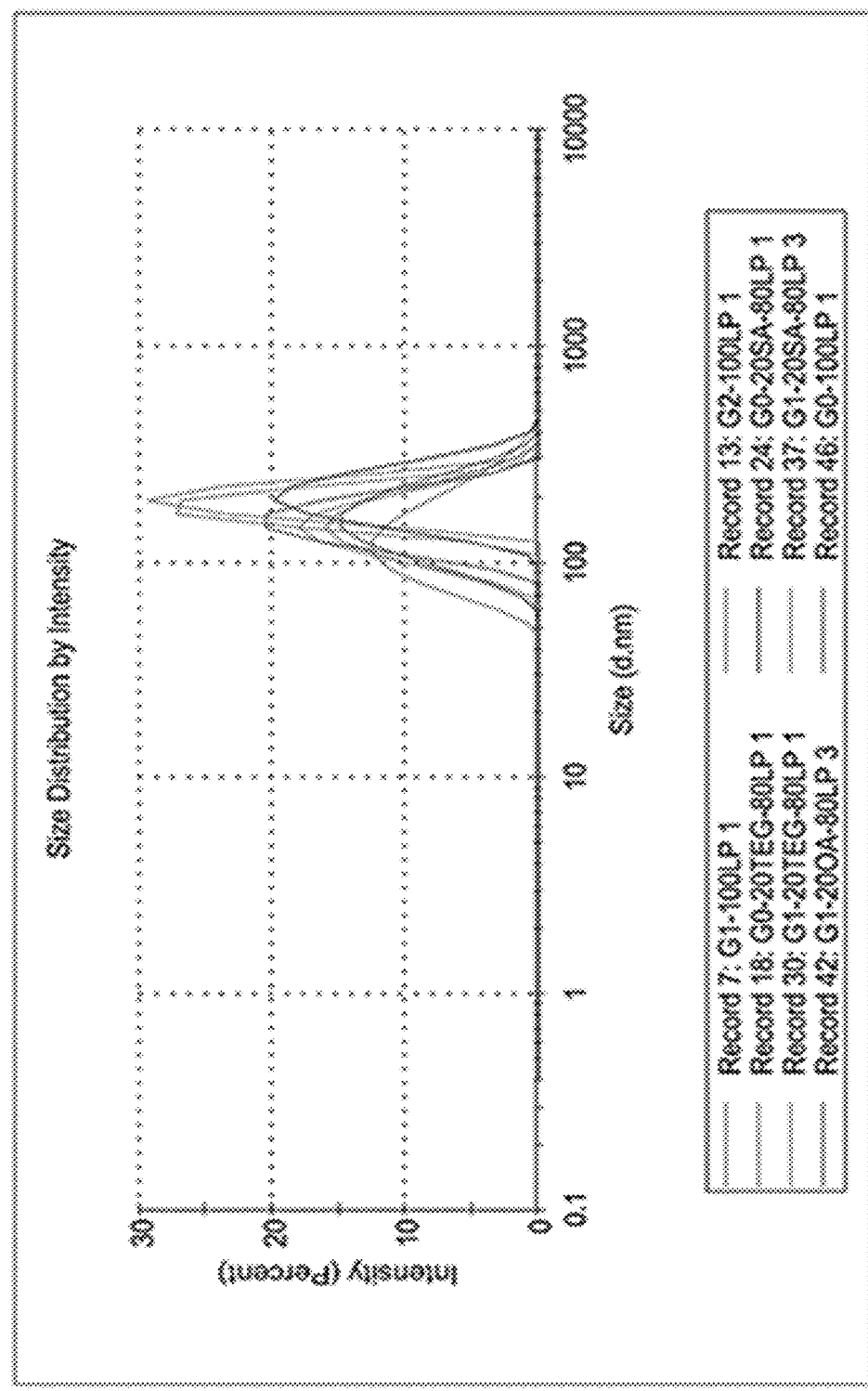
FIG. 8 provides for DLS measurements of different PFBP/siRNA complexes (N/P=10).
Figure 9:
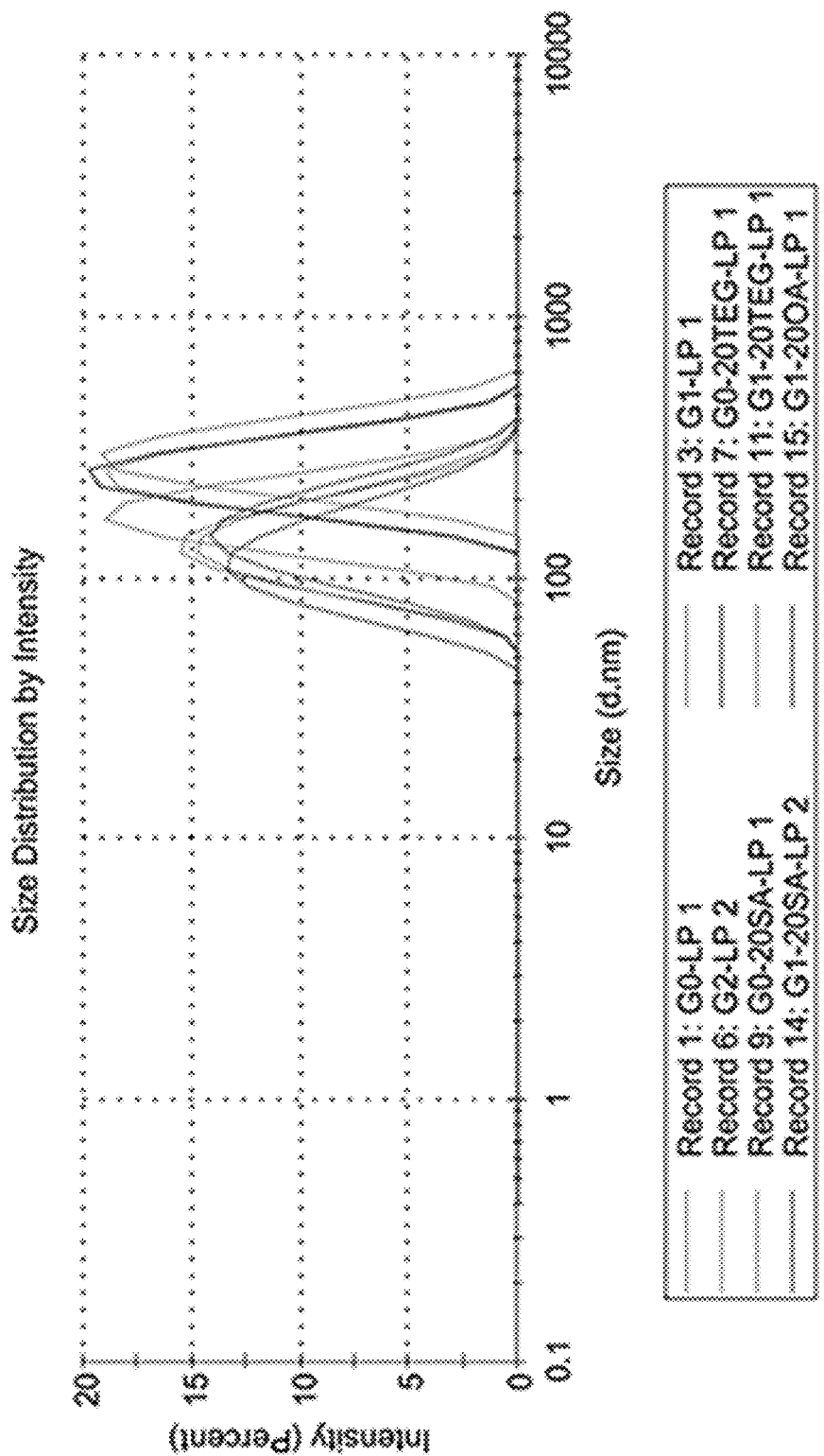
FIG. 9 provides for DLS measurements of different PFBP/mRNA complexes (N/P=10).

Investigating the size and zeta potential of RNA-PFBP nanoparticles. Next, dynamic light scattering (DLS) was used to investigate the size and zeta potential of the RNA-PFBP nanoparticles (see TABLE 1 and TABLE 2; see also FIG. 8 and FIG. 9).

TABLE 1

Size and Zeta potential of complexes between PFBPs and siRNA (N/P = 10).

| Sample | Z-Average Size (nm) | PDI | Zeta potential (mV) |
|---|---|---|---|
| G0-100LP | 170 ± 10 | 0.27 | 8.4 |
| G1-100LP | 140 ± 14 | 0.14 | 28.2 |
| G2-100LP | 133 ± 14 | 0.15 | 22.1 |
| G0-20TEG-80LP | 201 ± 6 | 0.12 | 4.2 |
| G0-20SA-80LP | 198 ± 9 | 0.17 | 5.4 |
| G1-20TEG-80LP | 186 ± 6 | 0.15 | 17.1 |
| G1-20SA-80LP | 137 ± 5 | 0.17 | 17.6 |
| G1-20OA-80LP | 143 ± 2 | 0.10 | 17.0 |

TABLE 2

Size and Zeta potential of complexes between PFBPs and mRNA (N/P = 10).

| Sample | Z-Average Size (nm) | PDI | Zeta potential (mV) |
|---|---|---|---|
| G0-100LP | 245 ± 11 | 0.06 | 26.5 |
| G1-100LP | 125 ± 2 | 0.11 | 25.4 |
| G2-100LP | 128 ± 2 | 0.12 | 28.0 |
| G0-20TEG-80LP | 245 ± 13 | 0.08 | 28.2 |
| G0-20SA-80LP | 281 ± 8 | 0.09 | 29.6 |
| G1-20TEG-80LP | 169 ± 4 | 0.08 | 26.0 |
| G1-20SA-80LP | 138 ± 3 | 0.12 | 28.4 |
| G1-20OA-80LP | 109 ± 3 | 0.15 | 30.0 |

Figure 10:
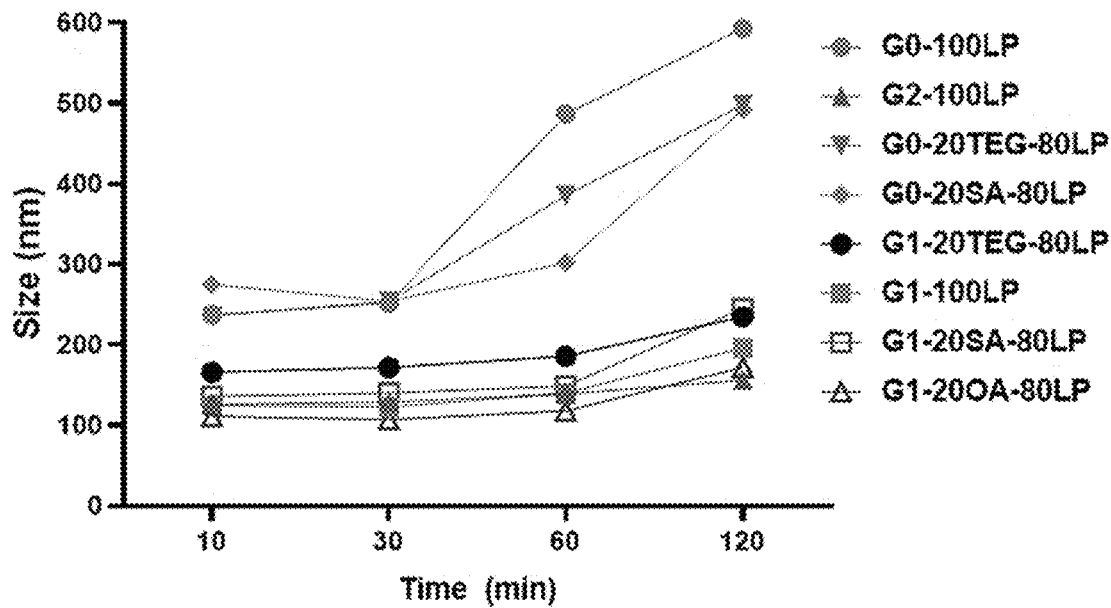
FIG. 10 demonstrates the stability of different PFBP/mRNA complexes in PBS buffer.

The DLS results demonstrated that all PFBPs formed nanoparticles between 100 and 250 nm with both siRNA and mRNA. Compared to G0 series of PFBPs, G1 and G2 PFBPs condense RNA into smaller nanoparticles with higher buffer stability due to the higher functional multivalency and charge density per polymer repeating unit (see FIG. 10).

Figure 11A:
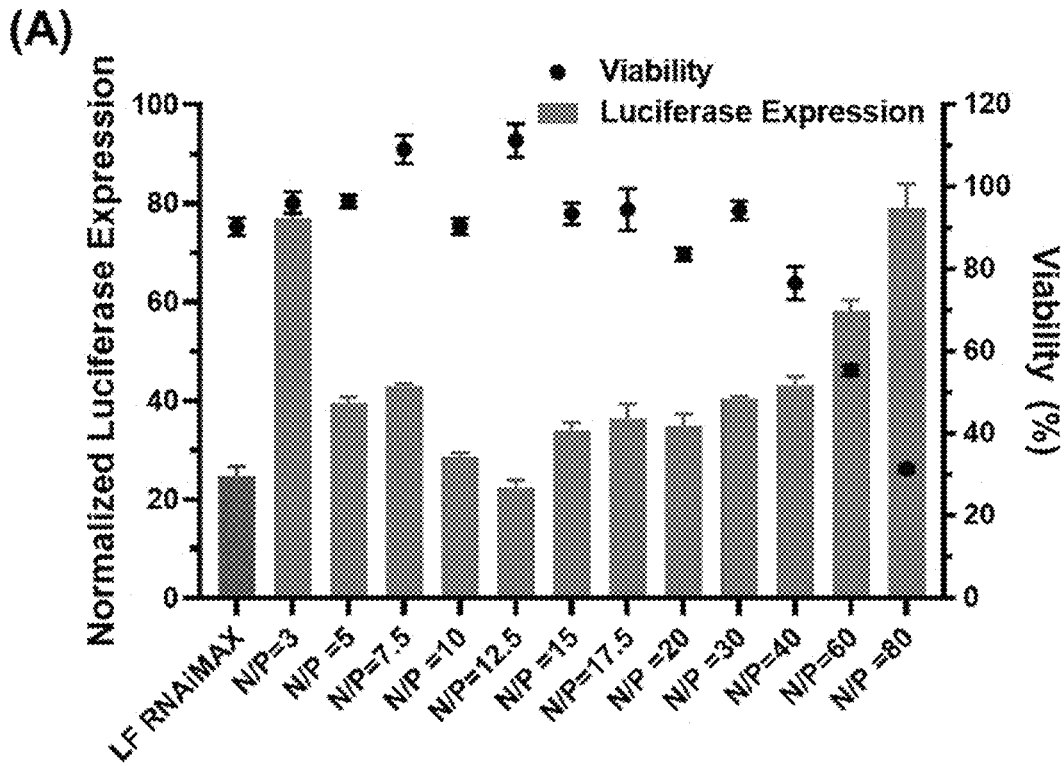
FIG. 11A-B presents the results of transfection screening of PFBPs in firefly luciferase-expressing HEK-293 cells. (A) Transfection results of G0-100LP/siRNA complexes at various N/P ratios (3-80) [siRNA]=60 nM. (B) Transfection screening of different PFBP/siRNA complexes at N/P=12.5 [siRNA]=60 nM.
Figure 11B:
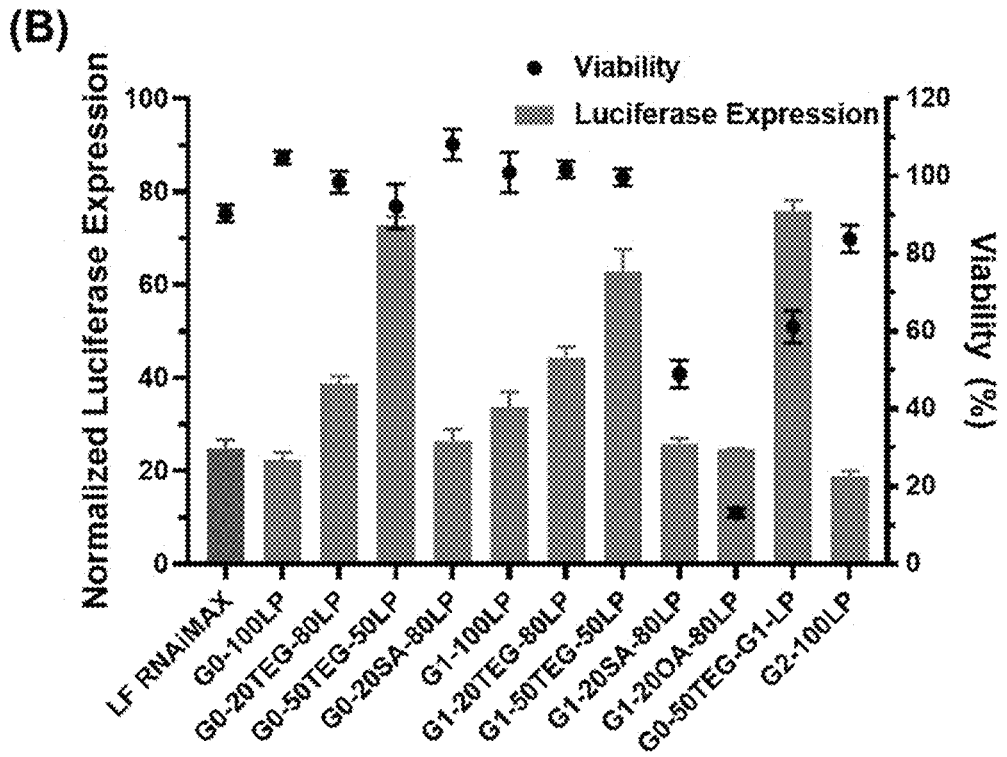
Figure 12A:
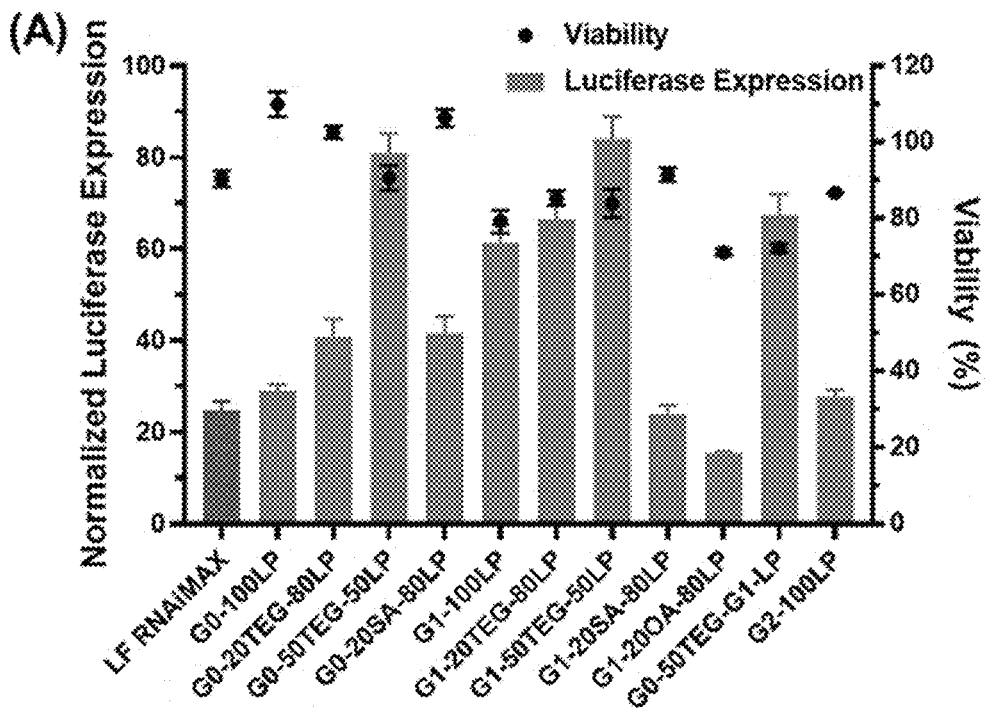
FIG. 12A-B presents the results of transfection screening of different PFBP/siRNA complexes in firefly luciferase-expressing HEK-293 cells. (A) N/P=10, [siRNA]=60 nM. (B) N/P=15, [siRNA]=60 nM.
Figure 12B:
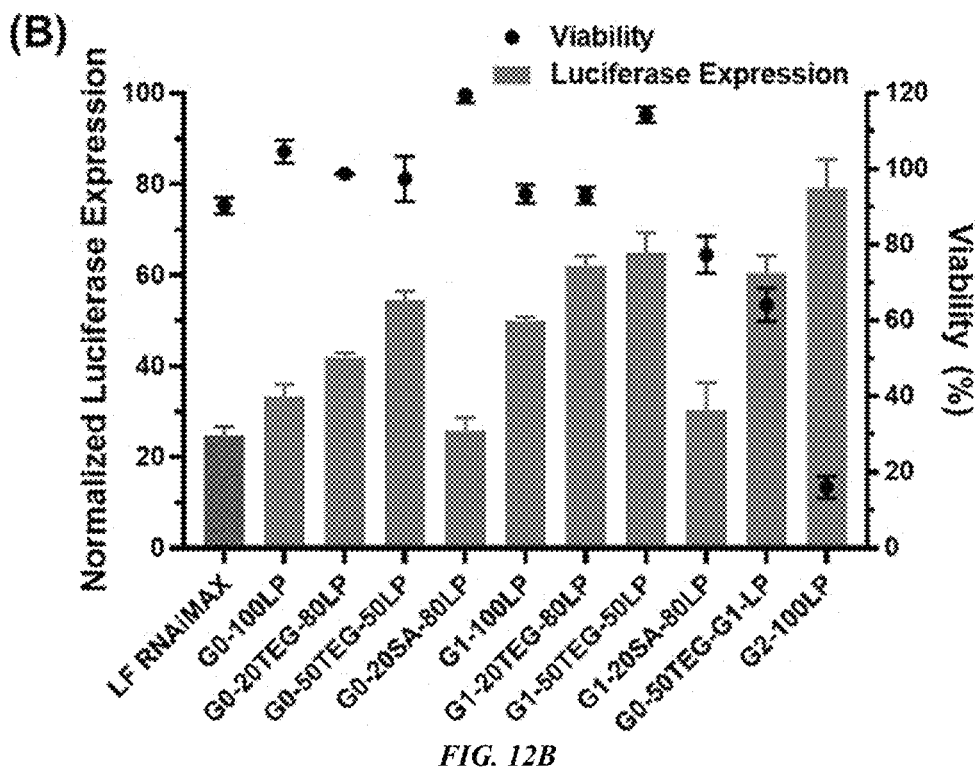

Screening the PFBPs for siRNA delivery efficiency. siRNAs all have the same size and structure: short length of 20-25 base pairs, rigid, and double stranded RNA. Anti-Luc siRNA was complexed with PFBPs at various N/P ratios (3-80), and were transfected into the HEK-293 cells expressing firefly luciferase (Luc). The transfected cells were assayed for luciferase activity after 48 h to determine gene silencing by the siRNAs (see FIG. 11A). After identifying optimal siRNA transfection conditions, the PFBPs were all tested to determine which PFBPs (see FIG. 11B). G0-series PFBPs, specifically G0-100LP and G0-20SA-80LP, reduced luciferase expression by over 75%. Compared to commercially available Lipofectamine RNAiMAX, they induced similar potent gene knockdown but with much lower cytotoxicity (cell viability>95%). Noticeably, G0-100LP and G0-20SA-80LP exhibited high gene silencing at remarkably low N/P ratios (N/P=10-15) (see FIG. 12), in contrast to other synthetic vectors for siRNA delivery where higher N/P ratios are needed.

Investigating whether PFBPs could deliver mRNAs of various sizes. Mammalian mRNAs vary greatly in size, with a median length of 1.4 kb. Because of the diverse nature of mRNAs, ideal delivery vectors should be universal and be able to deliver RNAs of various sizes. This is not a concern for siRNA delivery vehicles as all siRNAs are the same size and shape. In view thereof, studies were conducted to test the delivery efficacy of PFBPs with mRNAs of varying lengths in order to develop a universal delivery system for RNAs.

Figure 13:
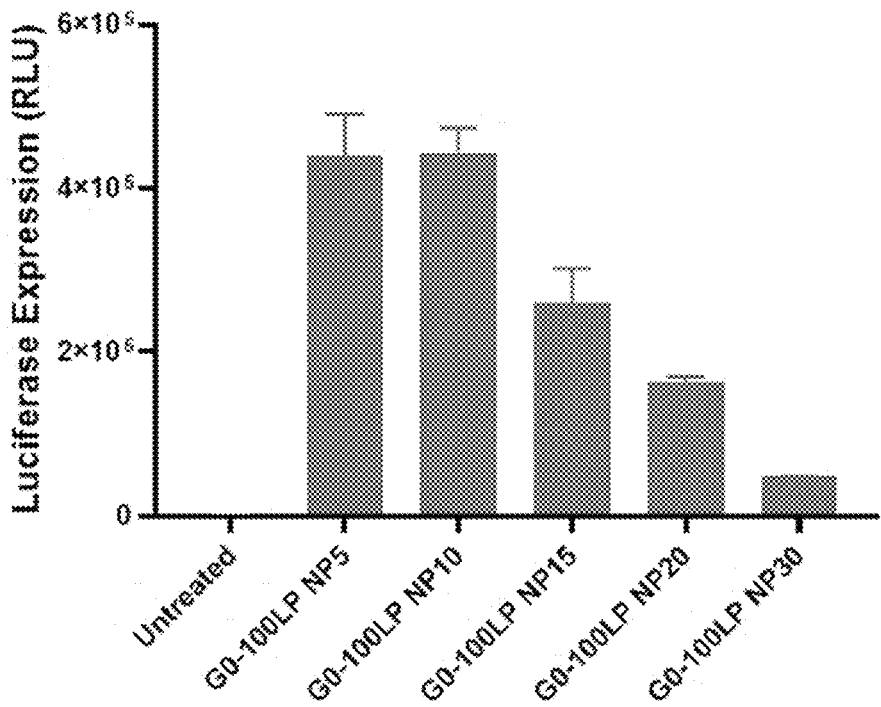
FIG. 13 presents the results of transfection screening of G0-100LP/Fluc mRNA complexes in NIH 3T3 cells at various N/P ratios (5-30) (150 ng mRNA per well).
Figure 14:
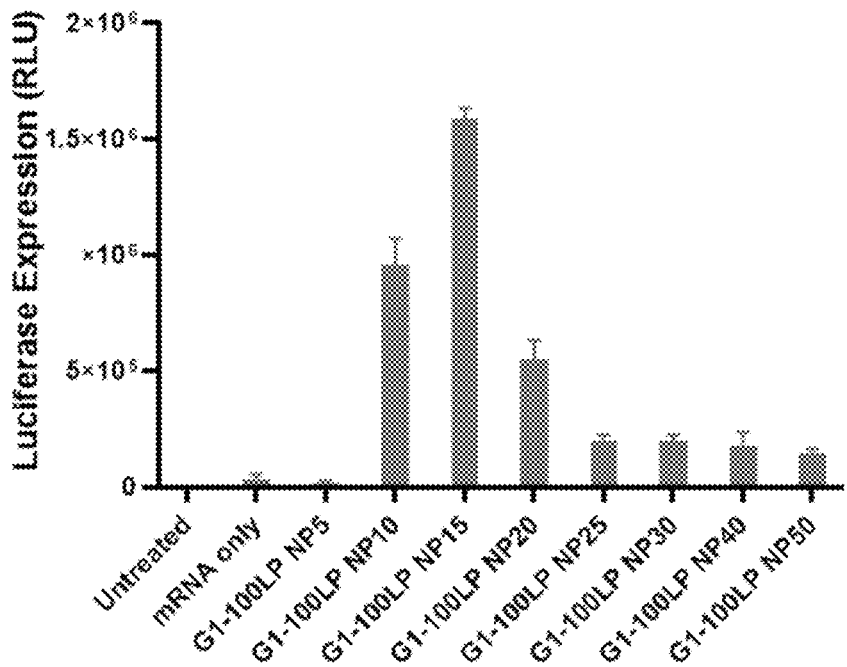
FIG. 14 presents the results of transfection screening of G1-100LP/Fluc mRNA complexes in NIH 3T3 cells at various N/P ratios (5-50) (150 ng mRNA per well).
Figure 16:
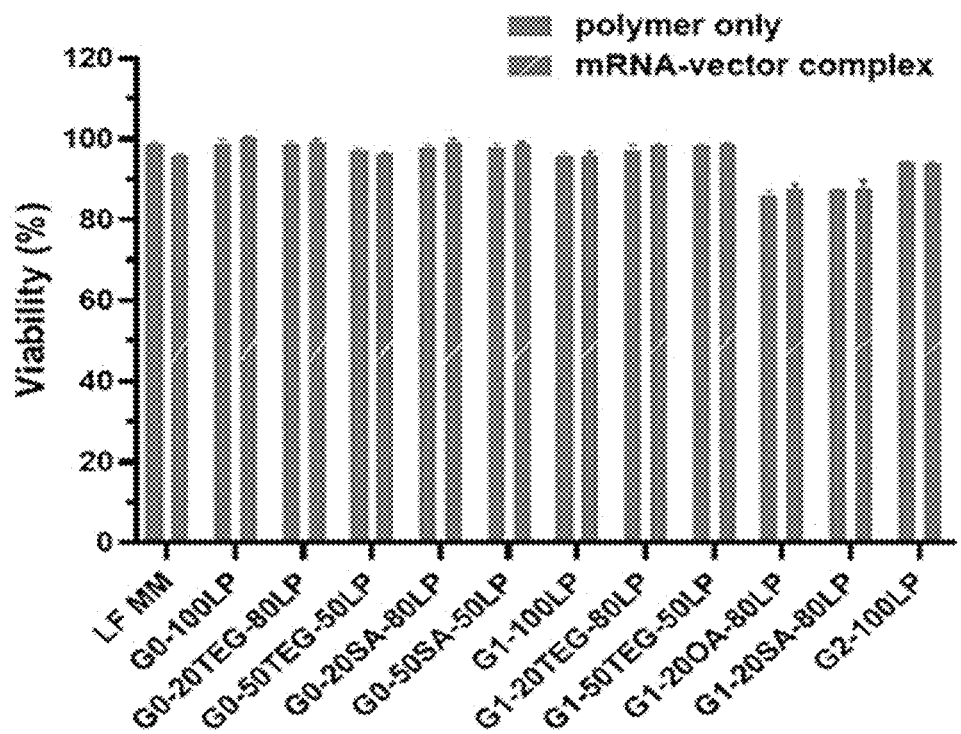
FIG. 16 demonstrates the cytotoxicity of the PFBP PFBPs against NIH 3T3 cells assayed using an LDH assay (150 ng Fluc mRNA per well, N/P=15).

Initially, the PFBPs were screened for the delivery of Fluc mRNA, a 1996 nucleotide long single stranded mRNA. To assay Fluc mRNA delivery, NIH 3T3 cells were treated with different mRNA/PFBP nanocomplexes. 24 hours after transfection, the luciferase activity was assayed by IVIS imaging. To determine the optimal mRNA transfection conditions, G0-100LP and G1-100LP were used as representative PFBPs in the initial transfection screening (see FIG. 13 and FIG. 14). The luminescence was the greatest for G0-100LP at N/P=10 and G1-100LP at N/P=15. After identifying the optimized mRNA transfection conditions, the PFBPs were all tested for Fluc mRNA delivery (see FIG. 15A). It was found that PFBP G1-100LP performed much better than G0-100LP, with double the luminescence in comparison to the positive control (Lipofectamine MessengerMAX). Most of the PFBPs displayed no cytotoxicity as measured via a lactate dehydrogenase (LDH) assay (see FIG. 16).

Additionally, to demonstrate that the PFBPs could delivery mRNA of differing sizes, eGFP mRNA delivery was also screened. eGFP mRNA is roughly half the size of Fluc mRNA (996 nucleotides). To assay eGFP mRNA delivery, NIH 3T3 cells were transfected with mRNA/PFBP nanocomplexes and eGFP expression was measured 24 hours post transfection via flow cytometry or confocal microscopy. Interestingly, the transfection results showed that the best PFBP, G1-100LP, is also effective for delivering eGFP mRNA into cells with comparable protein expression as the positive control (LF MM) (see FIG. 15B).

Figure 17:
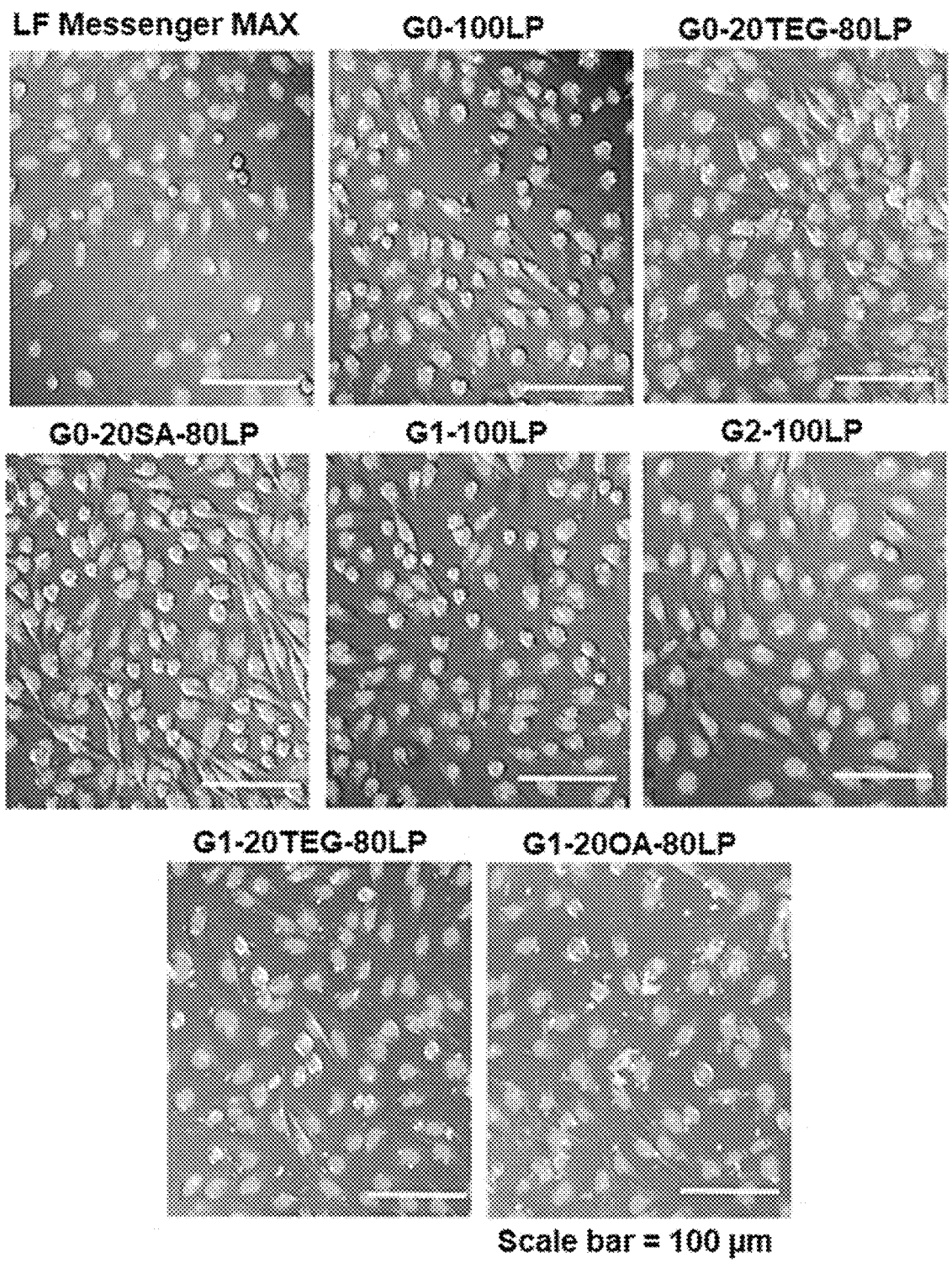
FIG. 17 presents the cellular uptake by intracellular trafficking for PFBP/Cy-5 Fluc mRNA complexes. Confocal florescence images of NIH 3T3 cells 4 h post- transfection (nuclei were stained blue with Hoechst 33342 indicated in gray, lysosome was stained with Lysotracker Deep Green indicated in medium gray, Cy-5 Fluc mRNA is indicated in light gray, scale bars 100 μm). Transfection conditions: 300 ng Cy-5 Fluc mRNA per well, N/P=15.
Figure 18:
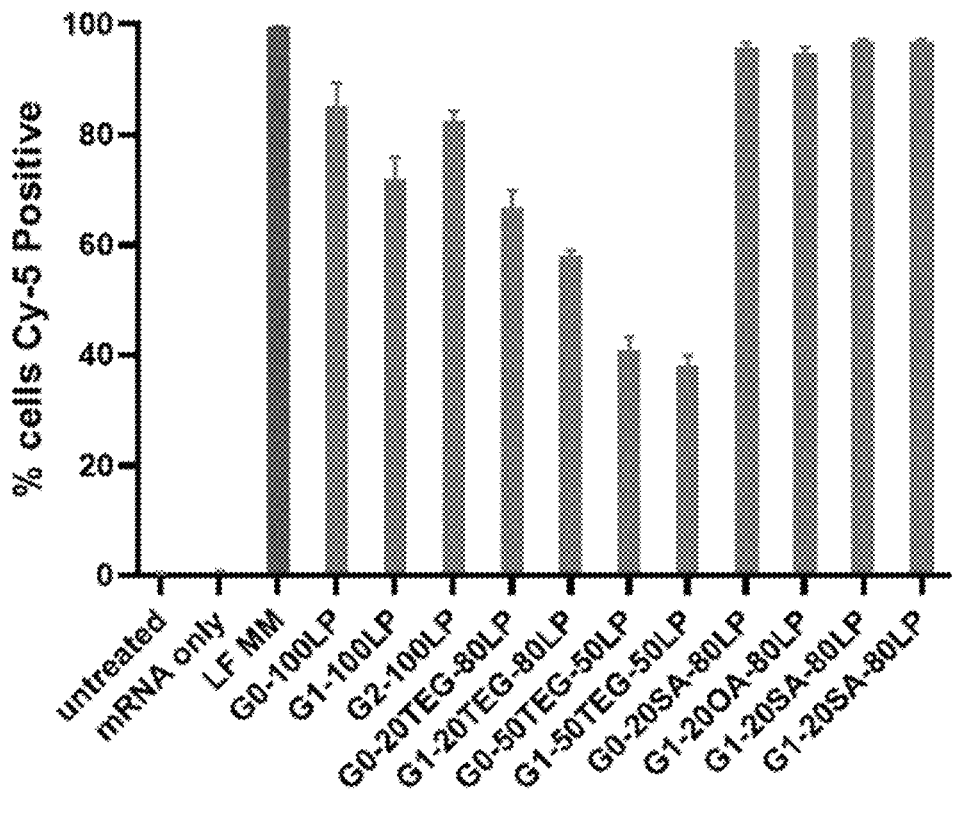
FIG. 18 provides for the cellular uptake of PFBP/Cy5-Fluc mRNA complexes in NIH 3T3 cells by flow cytometry. Fluorescence was measured 4 h post transfection using a flow cytometer. Transfection conditions: 300 ng Cy-5 Fluc mRNA per well, N/P=15.

Investigating the structure-property correlation of the PFBPs. confocal microscopy was employed to visualize the mRNA internalization and the eGFP protein expression. Cells were transfected with Cy-5 labeled mRNA and imaged to visualize the internalization of the PFBP/mRNA nanoparticles (see FIG. 17). Additionally, cellular uptake was quantified after 4 hours by flow cytometry (see FIG. 18). Most PBFP/mRNA complexes internalized into the cells efficiently (over 70% cells are Cy-5 positive). Increased TEG incorporation decreased the mRNA cellular uptake, which explains why the mRNA transfection efficacy decreased with the increasing amount of TEG side-chains. As shown in G0-series PFBPs, incorporation of appropriate amount fatty acids increased the delivery efficacy through enhanced cell internalization. However, the excess aliphatic chains may disrupt the cell membrane and induce toxicity as shown in the previous siRNA study (see FIG. 11B) and LDH assay (see FIG. 16). This causes the decreased delivery efficacy of high generation PFBPs with fatty acid functionalization.

Figure 19A:
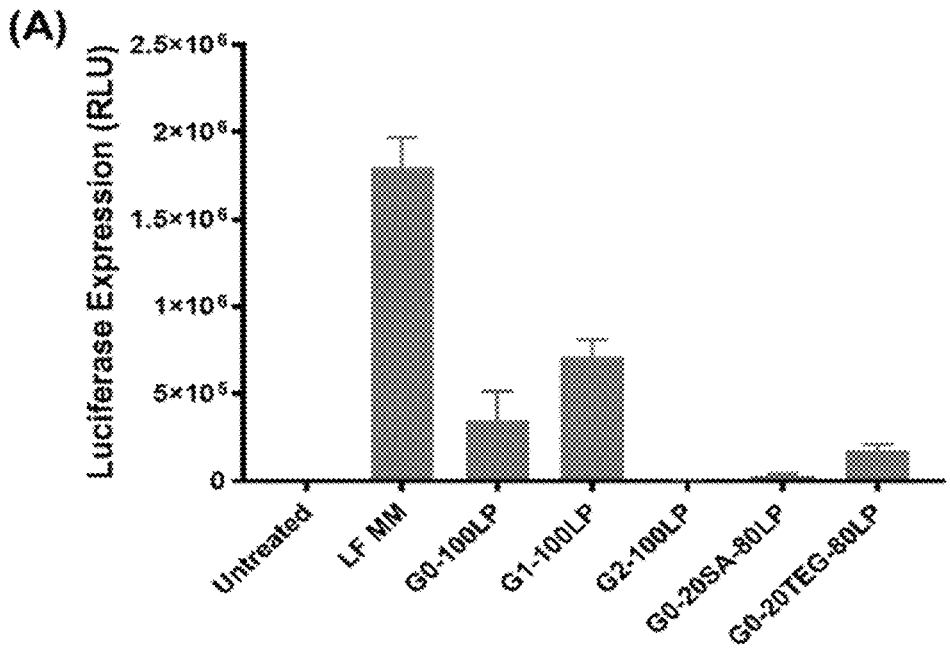
FIG. 19A-B provides for (A) Replicon mRNA transfection screening of different PFBPs at their optimal N/P ratios (N/P=10 for G0 series of PFBPs and N/P=15 for G1, G2 series of PFBPs) (150 ng mRNA per well). (B) Comparison of luciferase expression between replicon mRNA delivery and regular Fluc mRNA delivery.
Figure 19B:
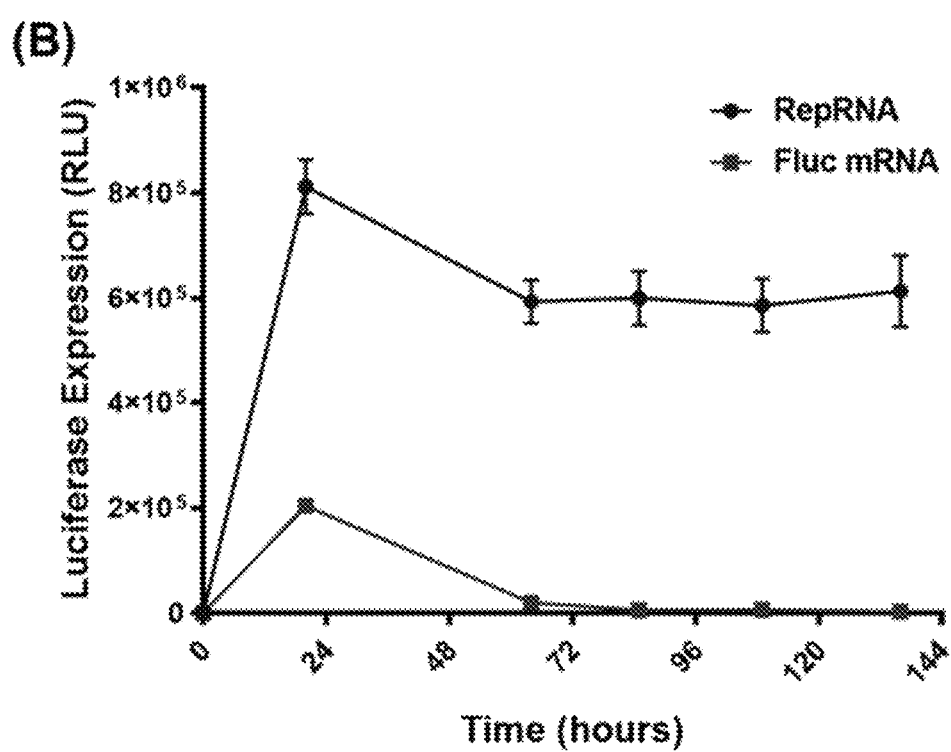

Investigating whether PFBPs could deliver replicon mRNA. Delivery of replicon RNA is of vital interest for the development of next generation vaccines. Replicon RNA is used in vaccines to express the protein antigen of interest in target cells to induce potent prolonged immune responses. Replicon RNA vaccines induce prolonged antigen expression, increasing the activity of the vaccines and reducing the need for booster shots. Efficient delivery of replicon mRNA is extremely challenging due to its remarkable large size ($\sim 10^4$ nt) and complicated secondary structure compared to other RNA species. The replicon mRNA expressing firefly luciferase was complexed with different PFBPs and then transfected into BHK cells. The best PFBP, G1-100LP, was demonstrated to be able to successfully deliver large replicon mRNA, with similar delivery efficiency as the positive control (LF MM) (see FIG. 19A). Prolonged luciferase expression was observed 72 hours post transfection, whereas regular Fluc mRNA transfection only provided transient luciferase expression after 24 hours post transfection (see FIG. 16B).

A number of embodiments have been described herein. Nevertheless, it will be understood that various modifications may be made without departing from the spirit and scope of this disclosure. Accordingly, other embodiments are within the scope of the following claims.

What is claimed is:

1. A peptide-functionalized biodegradable polymer (PFBP) that is biocompatible and can form a complex or polyplex with nucleic acids and release the nucleic acids within a cell, wherein the PFBP comprises the structure of Formula I(a):

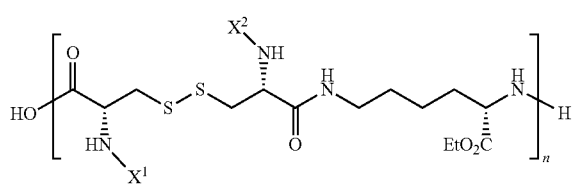

Formula I(a)

wherein,
n is an integer greater than 10;
$X^1$ and $X^2$ have the structure of Formula II:

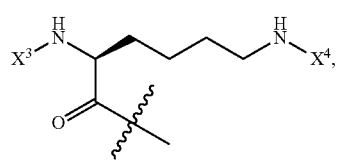

Formula II wherein,
$X^3$ and $X^4$ are independently selected from a cell penetrating peptide (CPP) consisting of the sequence of SEQ ID NO:21, a fatty acid, or a polyoxyalkylene polymer, wherein at least one of $X^3$ and $X^4$ is a CPP consisting of the sequence of SEQ ID NO:21.

2. The PFBP of claim 1, wherein $X^3$ and $X^4$ are CPPs consisting of the sequence of SEQ ID NO:21.

3. The PFBP of claim 1, wherein the PFBP further comprises complexed or polyplexed nucleic acids.

4. The PFBP of claim 3, wherein the nucleic acids are RNA.

5. The PFBP of claim 4, wherein the RNA is siRNA.

6. The PFBP of claim 4, wherein the RNA is ssRNA and/or mRNA.

7. The PFBP of claim 4, wherein the RNA is an RNA-based replicon.

8. The PFBP of claim 7, wherein the RNA-based replicon is an RNA- based replicon vaccine.

9. The PFBP of claim 4, wherein the molar ratio of protonated amines of the PFBP: phosphates of the RNA (N:P) is from 5 to 20.

10. A method for delivering RNA into a cell comprising:
contacting a cell with the PFBP of claim 4.

* * * * *